(12) United States Patent
Hakuta et al.

(10) Patent No.: US 10,373,599 B2
(45) Date of Patent: Aug. 6, 2019

(54) SOUNDPROOFING STRUCTURE, OPENING STRUCTURE, CYLINDRICAL STRUCTURE, WINDOW MEMBER, AND PARTITION MEMBER

(71) Applicant: FUJIFILM Corporation, Tokyo (JP)

(72) Inventors: Shinya Hakuta, Ashigarakami-gun (JP); Shogo Yamazoe, Ashigarakami-gun (JP); Hiroshi Komatsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/122,042

(22) Filed: Sep. 5, 2018

(65) Prior Publication Data

US 2019/0019489 A1      Jan. 17, 2019

Related U.S. Application Data

(63) Continuation of application No. PCT/JP2017/012267, filed on Mar. 27, 2017.

(30) Foreign Application Priority Data

Mar. 29, 2016  (JP) .................................. 2016-066246
Apr. 28, 2016  (JP) .................................. 2016-090510

(51) Int. Cl.
*E04B 1/84*      (2006.01)
*E04B 1/99*      (2006.01)
(Continued)

(52) U.S. Cl.
CPC .............. *G10K 11/162* (2013.01); *E04B 1/84* (2013.01); *G10K 11/16* (2013.01); *G10K 11/161* (2013.01);
(Continued)

(58) Field of Classification Search
CPC ........... G10K 11/172; E04B 2001/8433; E04B 1/8209; G03B 21/22
(Continued)

(56) References Cited

U.S. PATENT DOCUMENTS 6,598,701 B1      7/2003  Wood et al.
6,977,109 B1 *   12/2005  Wood ..................... G10K 11/16
                                                                  181/292
(Continued)

FOREIGN PATENT DOCUMENTS

EP      0889459 A2    1/1999
EP      2489856 A2    8/2012
(Continued)

OTHER PUBLICATIONS

International Search Report issued in PCT/JP2017/012267 (PCT/ISA/210), dated Jun. 20, 2017.
(Continued)

*Primary Examiner* — Jeremy A Luks
(74) *Attorney, Agent, or Firm* — Birch, Stewart, Kolasch & Birch, LLP

(57) ABSTRACT

An object is to provide a soundproofing structure which exhibits high soundproofing performance in a broad frequency band, can be miniaturized, can ensure ventilation properties, and has a light transmittance, and a cylindrical structure, a window member, and a partition member including this soundproofing structure. Provided is a soundproofing structure including: a soundproofing cell which includes a frame having a frame hole portion passing therethrough and a film that covers the frame hole portion and is fixed to the frame, in which the film has a plurality of through-holes passing therethrough in a thickness direction, an average opening diameter of the through-holes is in a range of 0.1 μm to 250 μm, and a vertical direction of a film surface is
(Continued)

disposed so as to be inclined with respect to a direction of a sound source to be soundproofed.

26 Claims, 25 Drawing Sheets

(51) Int. Cl.
*G10K 11/172* (2006.01)
*G10K 11/162* (2006.01)
*G10K 11/16* (2006.01)
*B32B 1/00* (2006.01)
*E04B 2/74* (2006.01)

(52) U.S. Cl.
CPC .............. *G10K 11/172* (2013.01); *B32B 1/00* (2013.01); *E04B 1/99* (2013.01); *E04B 2/7409* (2013.01); *E04B 2/7416* (2013.01); *E04B 2001/8433* (2013.01)

(58) Field of Classification Search
USPC .................................................. 181/291, 293
See application file for complete search history.

(56) References Cited

U.S. PATENT DOCUMENTS

| | | | | |
|---|---|---|---|---|
| 8,109,361 | B2* | 2/2012 | Tsugihashi | F04B 39/0027 181/207 |
| 8,371,419 | B2* | 2/2013 | Nonogi | B32B 3/266 181/290 |
| 8,469,145 | B2* | 6/2013 | Nonogi | B32B 3/266 181/291 |
| 2005/0161280 | A1* | 7/2005 | Furuya | F01N 1/003 181/225 |
| 2006/0289229 | A1* | 12/2006 | Yamaguchi | G10K 11/172 181/290 |
| 2009/0084627 | A1* | 4/2009 | Tsugihashi | B60J 5/00 181/290 |
| 2009/0283356 | A1 | 11/2009 | Tsugihashi et al. | |
| 2011/0100749 | A1* | 5/2011 | Nonogi | B32B 3/266 181/291 |
| 2011/0240402 | A1 | 10/2011 | Chou et al. | |

FOREIGN PATENT DOCUMENTS

| | | |
|---|---|---|
| JP | 3-40527 A | 2/1991 |
| JP | 2003-239226 A | 8/2003 |
| JP | 2005-112229 A | 4/2005 |
| JP | 2008-9014 A | 1/2008 |
| JP | 2009-139556 A | 6/2009 |
| JP | 2013-88794 A | 5/2013 |
| JP | 2015-152794 A | 8/2015 |

OTHER PUBLICATIONS

Written Opinion of the International Searching Authority issued in PCT/JP2017/012267 (PCT/ISA/237), dated Jun. 20, 2017.
Extended European Search Report, dated Mar. 26, 2019, for European Application No. 17774874.6.

* cited by examiner

SOUNDPROOFING STRUCTURE, OPENING STRUCTURE, CYLINDRICAL STRUCTURE, WINDOW MEMBER, AND PARTITION MEMBER

CROSS-REFERENCE TO RELATED APPLICATIONS

This application is a Continuation of PCT International Application No. PCT/JP2017/012267 filed on Mar. 27, 2017, which claims priority under 35 U.S.C § 119(a) to Japanese Patent Application No. 2016-066246 filed on Mar. 29, 2016 and Japanese Patent Application No. 2016-090510 filed on Apr. 28, 2016. Each of the above application(s) is hereby expressly incorporated by reference, in its entirety, into the present application.

BACKGROUND OF THE INVENTION

1. Field of the Invention

The present invention relates to a soundproofing structure, and an opening structure, a cylindrical structure, a window member, and a partition member having the soundproofing structure.

2. Description of the Related Art

In many cases, typical noise is over frequencies in a broadband, a low frequency sound is felt as a pressure, a sound in a mid range (approximately 1000 Hz to 4000 Hz) is felt loud since the structure of an ear is formed to be sensitive to the sound in that range, and a high frequency sound is felt to be harsh on ears. Accordingly, it is necessary to take countermeasures for broadband noise in a broadband.

For example, as an example of wind noise, there is a noise having a sound pressure from a low frequency range to a high frequency range, such as white noise, and thus it is necessary to take countermeasures for broadband noise. Particularly, in the countermeasures for a noise inside various devices (such as office equipment, an automobile, and an electric train), since the size of a device is limited, a soundproofing structure capable of soundproofing in a small space has been required.

In the related art, as typical soundproofing materials for a noise of frequencies in a broadband, urethane sponge, glass wool, and the like have been used. However, in a case where urethane sponge, glass wool, and the like are used as the soundproofing materials, there is a problem in that soundproofing performance cannot be sufficiently obtained in a case where the size of the material in a device is limited because the volume of the material needs to be increased in order to increase the absorbance. Further, there is another problem in that the material is not strong against the environment and deteriorates. In addition, since the material is fibrous, the environment is contaminated by fiber garbage. Accordingly, there are problems in that this material cannot be used in a clean room environment, an environment with precision equipment, or a manufacturing site where contamination becomes a problem and the material affects the duct fan and the like. Further, the holes of the urethane sponge and glass wool are three-dimensional pores, and thus the light transmittance is low, which is problematic.

As a soundproofing structure that absorbs a sound in a specific frequency band, a soundproofing structure utilizing film vibration and a soundproofing structure utilizing Helmholtz resonance may be exemplified.

Since sound absorption occurs at the resonance frequency of membrane vibration in the soundproofing structure utilizing membrane vibration, sound absorption is increased at the resonance frequency, but sound absorption is decreased at other frequencies. Therefore, it is difficult to widen the frequency band.

As described in JP2008-9014A, a soundproofing structure utilizing Helmholtz resonance has a configuration of a closed space where acoustically closed by disposing a shielding plate on a rear surface of a porous plate in which a plurality of through-holes have been formed.

Such a soundproofing structure utilizing Helmholtz resonance is a structure formed by connecting a part dominated by a motion equation in which, when an external sound enters through-holes, the air in the through-holes is moved by the sound with a part dominated by a spring equation in which the air in the closed space repeatedly expands and contracts. According to the respective equations, the movement of the air in the through-holes shows a coil-like behavior in which the pressure phase advances by 90 degrees further than the local velocity phase and the movement of the air in the closed space shows a capacitor-like behavior in which the pressure phase delays by 90 degrees further than the local velocity phase. Therefore, the Helmholtz resonance is a so-called LC series circuit as an equivalent circuit of a sound as a whole and has resonance to be determined by the area and the length of the through-holes and the volume of the closed space. At the time of this resonance, multiple sounds reciprocate through the through-holes and strong sound absorption occurs at a specific frequency due to the friction between the sounds and the through-holes during the reciprocation.

Further, JP2015-152794A describes, as a soundproofing structure having through-holes without a closed space, a soundproofing sheet which includes a sheet having a plurality of through-holes; and a sound collecting portion which has through-holes arranged such that the centers thereof substantially coincide with the through-holes of the sheet, has a shape in which the diameter increases along with an increase in distance from the sheet, and is provided outside the sheet.

JP2009-139556A discloses a sound absorbing body which is partitioned by a partition wall serving as a frame and closed by a rear wall (rigid wall) formed of a plate-like member and in which the front portion is covered by a film material (film-like sound absorbing material) that covers an opening portion of a cavity forming the opening portion, a pressure plate is placed thereon, and resonance holes for Helmholtz resonance are formed in a region (corner portion) within a range of 20% of the dimension of the surface of the film-like sound absorbing material from a fixed end of a peripheral edge of the opening portion which is a region where displacement due to sound waves of the film material is the least likely to occur. In this sound absorbing body, the cavity is blocked except for resonance holes. This sound absorbing body exhibits both a sound absorbing action using membrane vibration and a sound absorbing action using Helmholtz resonance.

SUMMARY OF THE INVENTION

In the configuration which is obtained by providing a closed space on the rear surface of a porous plate in which a plurality of through-holes have been formed and in which a sound is absorbed using the Helmholtz resonance, as described in JP2008-9014A, a shielding plate that does not allow a sound to pass through the rear surface of the porous plate becomes indispensable in order to prepare a closed space. Further, as a principle, it is difficult to widen the band in order to use resonance.

In order to solve such a problem, it has been attempted to provide a plurality of holes in a thickness direction or a horizontal direction or provide a plurality of spaces on the rear surface, but there are problems of an increase in size of the soundproofing structure because a plurality of cells need to be provided, complication of the structures or components because these need to be formed separately, and an increase in number of components.

Further, since a closed space is required to be provided on the rear side, there are problems in that the size of the volume of the closed space is increased and the ventilation properties or waste heat cannot be ensured.

Further, the soundproofing sheet described in JP2015-152794A is a sheet which shields a sound by reflecting the sound according to the mass law using the weight of the sheet itself. The through-hole portions do not contribute to soundproofing, and the performance as close to the sound insulation performance of the original sheet as possible is ensured even in a case where the through-holes are opened by devising the structures around the through-holes. Therefore, there are problems in that the soundproofing performance higher than the mass law cannot be obtained and a sound cannot be satisfactorily absorbed because the sound is reflected.

Further, in JP2009-139556A, the rear wall of the partition wall serving as a frame is blocked by the plate-like member since the sound absorbing action using membrane vibration needs to be carried out according to the sound absorbing action using the Helmholtz resonance. Therefore, similar to JP2008-9014A, since the partition wall does not have ability to pass wind and heat therethrough, heat tends to be accumulated. Accordingly, this partition wall is not suitable for insulating sound from a device, an automobile, and the like.

An object of the present invention is to solve the above-described problems of the techniques of the related art and to provide a soundproofing structure which exhibits high soundproofing performance in a broad frequency band, can be miniaturized, can ensure ventilation properties, and has a light transmittance, and a cylindrical structure, a window member, and a partition member including this soundproofing structure.

As the result of intensive examination conducted by the present inventors in order to achieve the above-described object, it was found that the above-described problems can be solved by providing a soundproofing structure including: a soundproofing cell which includes a frame having a frame hole portion passing therethrough and a film that covers the frame hole portion and is fixed to the frame, in which the film has a plurality of through-holes passing therethrough in a thickness direction, an average opening diameter of the through-holes is in a range of 0.1 µm to 250 µm, and a vertical direction of a film surface of the film is disposed so as to be inclined with respect to a direction of a sound source to be soundproofed, thereby completing the present invention.

In other words, it was found that the above-described object can be achieved with the following configurations.

[1] A soundproofing structure comprising: a soundproofing cell which includes a frame having a frame hole portion passing therethrough and at least one film that covers the frame hole portion and is fixed to the frame, in which the film has a plurality of through-holes passing therethrough in a thickness direction, an average opening diameter of the through-holes is in a range of 0.1 µm to 250 µm, and a vertical direction of a film surface of the film is disposed so as to be inclined with respect to a direction of a sound source to be soundproofed.

[2] The soundproofing structure according to [1], in which an inclination of the vertical direction of the film surface of the film with respect to the direction of the sound source to be soundproofed is 45° or greater.

[3] The soundproofing structure according to [1] or [2], in which a size of the frame hole portion of the frame is smaller than a wavelength of a sound which has the maximum length among sounds to be soundproofed.

[4] The soundproofing structure according to any one of [1] to [3], in which the film is fixed to the inside of the frame hole portion of the frame.

[5] The soundproofing structure according to [4], in which distances from the film to both end surfaces of the frame are different from each other.

[6] The soundproofing structure according to any one of [1] to [5], in which two or more sheets of the films are fixed to the frame.

[7] The soundproofing structure according to any one of [1] to [6], in which the film is fixed to both end surfaces of the frame hole portion of the frame.

[8] The soundproofing structure according to any one of [1] to [6], in which the film is fixed to one end surface of the frame hole portion of the frame.

[9] The soundproofing structure according to [8], in which the film is fixed to one end surface of the frame hole portion of the frame and the other end surface of the frame hole portion is open.

[10] The soundproofing structure according to any one of [1] to [9], in which a surface roughness Ra of an inner wall surface of the through-hole is in a range of 0.1 µm to 10.0 µm.

[11] The soundproofing structure according to any one of [1] to [9], in which an inner wall surface of the through-hole is formed in a shape of a plurality of particles, and an average particle diameter of projections formed on the inner wall surface is in a range of 0.1 µm to 10.0 µm.

[12] The soundproofing structure according to any one of [1] to [11], in which a material of forming the film is a metal.

[13] The soundproofing structure according to any one of [1] to [12], in which a material of forming the film is aluminum.

[14] The soundproofing structure according to any one of [1] to [13], in which a plurality of the soundproofing cells are provided.

[15] The soundproofing structure according to [14], in which the plurality of soundproofing cells are connected to one another.

[16] The soundproofing structure according to [15], in which the plurality of soundproofing cells are attachably and detachably connected to one another.

[17] The soundproofing structure according to any one of [1] to [16], in which the average opening diameter of the through-holes is in a range of 0.1 µm to 50 µm.

[18] The soundproofing structure according to any one of [1] to [17], in which at least some of the through-holes have a shape having a maximum diameter inside the through-holes.

[19] An opening structure comprising: the soundproofing structure according to any one of [1] to [18]; and an opening member which has an opening, in which the soundproofing structure is disposed in the opening of the opening member such that a vertical direction of a film surface of the film intersects with a direction perpendicular to an opening cross section of the opening member, and a region serving as a vent hole through which gas passes is provided in the opening member.

[20] The opening structure according to [19], in which the soundproofing structure is disposed within an opening end correction distance from an opening end of the opening member.

[21] A cylindrical structure comprising: the soundproofing structure according to any one of [1] to [18]; and a cylindrical member which has an opening, in which the soundproofing structure is disposed in the opening of the cylindrical member such that a vertical direction of a film surface of the film intersects with a direction perpendicular to an opening cross section of the cylindrical member, and a region serving as a vent hole through which gas passes is provided in the cylindrical member.

[22] The cylindrical structure according to [21], in which the soundproofing structure is disposed within an opening end correction distance from an opening end of the cylindrical member.

[23] The cylindrical structure according to [21] or [22], in which two or more of the soundproofing structures are provided in the opening of the cylindrical member.

[24] The cylindrical structure according to [23], in which two or more of the soundproofing structures are disposed by being separated from one another, and at least some of distances between the soundproofing structures adjacent to each other are at least twice the width of the frame in an arrangement direction of two or more of the soundproofing structures. [25] A window member comprising: the soundproofing structure according to any one of [1] to [18].

[26] A partition member comprising: the soundproofing structure according to any one of [1] to [18].

According to the present invention, it is possible to provide a soundproofing structure which exhibits high soundproofing performance in a broad frequency band, can be miniaturized, can ensure ventilation properties, and has a light transmittance, and a cylindrical structure, a window member, and a partition member including this soundproofing structure.

DESCRIPTION OF THE PREFERRED EMBODIMENTS

Hereinafter, the present invention will be described in detail.

The description of constituent elements below will be made based on representative embodiments of the present invention, but the present invention is not limited to such embodiments.

In the present specification, the numerical ranges shown using "to" indicate ranges including the numerical values described before and after "to" as the lower limits and the upper limits.

Further, in the present specification, for example, an angle of "45°", "parallel", "vertical", or "orthogonal" means that a difference between this angle and the exact angle is less than 5 degrees unless otherwise specified. The difference between this angle and the exact angle is preferably less than 4 degrees and more preferably less than 3 degrees.

[Soundproofing Structure]

A soundproofing structure of the present invention is a soundproofing structure including a soundproofing cell which includes a frame having a frame hole portion passing therethrough and a film that covers the frame hole portion and is fixed to the frame, in which the film has a plurality of through-holes passing therethrough in a thickness direction, the average opening diameter of the through-holes is in a range of 0.1 µm to 250 µm, and the vertical direction of a film surface of the film is disposed so as to be inclined with respect to a direction of a sound source to be soundproofed.

Further, according to a preferred embodiment, the soundproofing structure is disposed in the opening of the opening member having the opening such that the vertical direction of the film surface of the film is inclined with respect to a direction perpendicular to an opening cross section of the opening member, and a region serving as a vent hole through which gas passes is provided in the opening member.

The configuration of the soundproofing structure of the present invention will be described with reference to FIGS. 1 to 3.

Figure 4A:
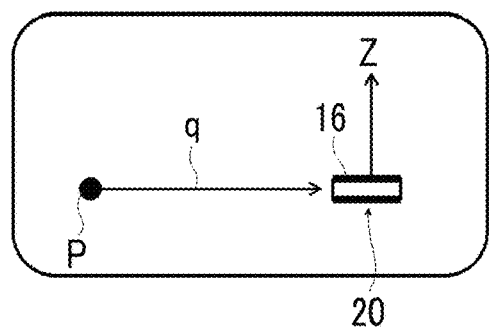
FIG. 4A is a schematic view for describing a direction of a noise source.

Here, the "direction of the sound source" is defined as follows. The "direction of the sound source" indicates a direction q in which the sound from a sound source P is directed toward to the film surface of the soundproofing structure of the present invention. In a free space, the "direction of the sound source" indicates a direction in which the sound actually generated from the sound source P is directed toward the soundproofing structure 20 (see FIG. 4A).

In short, a sound to be soundproofed in the present invention is defined as a sound expected to be erased by the soundproofing structure 20 of the present invention. For example, a sound to be soundproofed is so-called noise.

The definitions of "noise" by WHO or the dictionary are described below, and the sound to be soundproofed may include a sound intended to be erased in addition to the noise. For example, a conversation or the like of neighbors in a train can be selected as a sound to be soundproofed. Further, as a method of selecting a sound to be soundproofed, for example, in a situation in which a sound expected to hear is a conversation and another noise exists and in a case where the conversation of people has the highest sound pressure and a sound disturbing the conversation has a lower sound pressure than that of the conversation, the latter whose sound pressure is not the maximum can be selected as a sound to be soundproofed as the noise.

Figure 4B:
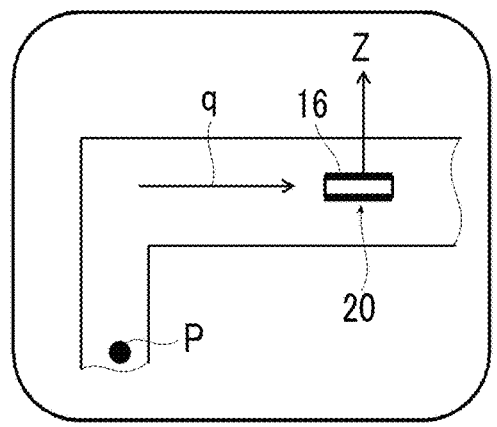
FIG. 4B is a schematic view for describing a direction of a noise source.

Further, in a space where the sound field is restricted, such as inside a duct, for example, a direction of a bent portion of a duct when seen from the soundproofing structure becomes a "direction q of a sound source" in a case where a traveling direction of the sound is bent such as an L-shaped duct, as illustrated in FIG. 4B. The position of a source P that generates a sound is not constantly the "direction q of a sound source". The source that generates a sound and the structure that restricts the sound field surrounding the source are regarded as a sound source, and a direction in which a sound advances toward the film surface is defined as the "direction q of a sound source".

Figure 5:
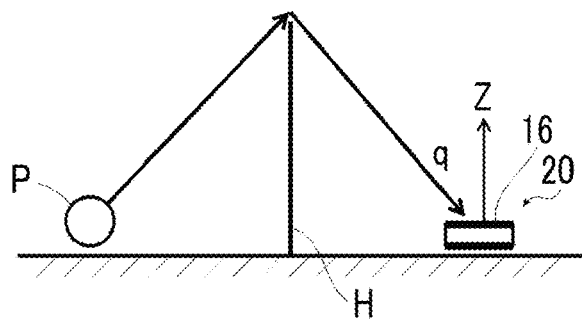
FIG. 5 is a schematic view for describing a direction of a noise source.

For example, as illustrated in FIG. 5, in a case where the line that linearly connects the sound source P with the soundproofing structure 20 is blocked by a fixed partition H or the like, the sound to be soundproofed reaches the soundproofing structure 20 by being diffracted without linearly reaching the soundproofing structure 20 from the sound source P. In such a case, the "direction q of the sound source" is not the linear direction from the sound source P to the soundproofing structure 20 but the direction in which the sound to be soundproofed moves toward the soundproofing structure 20, in FIG. 5, the direction q in which the sound moves toward the soundproofing structure 20 from the direction in which diffraction occurs at an upper portion of the partition H becomes the "direction q of the sound source".

In this manner, in a case of a structure in which the sound between the sound source P to be soundproofed and the arrangement position of the soundproofing structure 20 of the present invention is restricted by some reason, the "direction q of the sound source" is not a direction that linearly connects the position where the sound source P is disposed and the soundproofing structure 2 but the direction q in which the sound to be soundproofed moves toward the soundproofing structure 20. Therefore, in the present invention, a film is disposed by being inclined with respect to the "direction q of the sound source".

According to a method of measuring the "direction of the sound source", the direction of the sound source can be determined by measuring the phase information of the sound pressure or the particle speed at the same time with the amplitude information of the sound pressure using any of a microphone array, beamforming, or a PU probe. For example, the intensity of the sound pressure and the position can also be determined by using a three-dimensional intensity probe MI-6420 (manufactured by ONO SOKKI Co., Ltd.), a PU probe (sound pressure-particle speed probe) (manufactured by Microflown Technologies), or a microphone array system (manufactured by Bruel & Kjaer).

In a case where the three-dimensional intensity probe MI-6420 is used, four microphones are disposed on the top of a tetrahedron, the sound pressure is acquired by each microphone, the traveling direction of the sound is determined based on a difference in sound phase, and the traveling direction of the sound can be three-dimensionally achieved from the sound pressure and the phase. The actual processing is performed by the attached software, and the sound pressure and the traveling direction are mapped on an image acquired by the attached camera. Accordingly, the traveling direction of the sound can be determined for each frequency by scanning the circumference the soundproofing structure centering on the soundproofing structure of the present invention using MI-6420. In this manner, the "direction of the sound source" can be determined by investigating the frequency of the sound to be soundproofed. In a case where MI-6420 is used, the measurement can be simply carried out. Particularly at the time of determination of the direction of the sound source in a large area, the measurement can be efficiently carried out. However, since the frequency which can be acquired depends on the distance between microphones, MI-6420 needs to be increased in order to measure low frequencies and thus is not suitable for measurement in a small space. In this case, a PU probe can be used.

A PU probe (manufactured by Microflown Technologies) is a probe which is configured of a microphone for acquiring the sound pressure and two platinum lines for acquiring the particle speed and is capable of directly measuring two parameters of a sound pressure p and a local particle speed u. The measurement can be performed by acquiring the position of the microphone on a three-dimensional space using the attached camera and the attached software and scanning the sound pressure and the local particle speed at each point. The acoustic intensity (root mean square value (RMS)) can be acquired from the measured sound pressure and the particle speed, and the traveling direction of the sound can be determined using all scan points. Accordingly, the traveling direction of the sound source can be determined for each frequency by scanning the circumference of the soundproofing structure centering on the soundproofing structure of the present invention using the PU probe. Since a device for acquiring the particle speed in the PU probe is small, the space resolving power is excellent, and the actual size of the probe can be decreased. Therefore, the direction of the sound source can be measured using the PU probe in a case where the soundproofing structure of the present invention is disposed in a narrow space.

In the present invention, the arrangement position of the soundproofing structure of the present invention is determined, the sound pressure at the point above the film spaced by a distance of 5 mm is measured, and then the frequency information of the sound over the film is firstly measured. Thereafter, the sound to be soundproofed is determined.

For example, in a case where the sound that humans feel as the sound with the highest volume is set as a target to be soundproofed, an A characteristic which is a sensitivity curve is added from the frequency information of the sound and converted into [dBA], and the largest sound can be determined as a target to be soundproofed. The A characteristic weights the frequency in consideration of human's auditory sense, is an indicator used as a typical noise meter, and is determined in JIS C 1509-1:2005 and JISC 1509-2:2005. Therefore, by acquiring the frequency distribution of the sound over the film using an ordinary microphone or the like and combining the acquired distribution with the sensitivity curve of the A characteristic, the magnitude of the sound sensed by humans in an audible range is known for each frequency. Consequently, it is possible to know the frequency of the sound that affects humans the most. Therefore, it is possible to select the sound perceived by humans as the loudest noise, as an object to be soundproofed.

In addition, it is possible to optionally select the sound to be soundproofed in the present invention as the sound intended to be soundproofed.

Next, the direction of the sound source is determined. The intensity of the sound pressure and the position can be determined by using a three-dimensional intensity probe MI-6420 (manufactured by ONO SOKKI Co., Ltd.), a PU probe (sound pressure-particle speed probe) (manufactured by Microflown Technologies), or a microphone array system (manufactured by Bruel & Kjaer). It is desirable that a sound source for each frequency is determined from the entire space using a microphone array system in a case of a wide free space with a sufficient space, and a noise source can be determined using a small intensity probe or a PU probe in a case where the space is limited, for example, the inside of a duct.

For example, in an example of the present invention, since an acrylic transparent duct is used, the sound pressure and the particle speed inside the duct are measured using a PU probe PU match (manufactured by Microflown Technologies). Based on the results, the acoustic intensity is determined and then the direction of the sound source is determined. According to this method, even in a system in which the traveling direction of the sound is bent such as the L-shaped duct described above, since the direction of the sound moving toward the soundproofing structure of the present invention after the traveling direction is bent can be determined, the "direction of the sound source" can be determined.

The "direction of the sound source" is determined in the above-described manner.

Here, the "noise" is defined as "a generic name for unwanted sounds. There are many complaints concerning the noise in the complaints concerning pollution, and the form of such damage is divided into (1) a case where disorders such as physiological and organic hearing impairment, hypertension, and the like are caused by continuous generation of particularly strong sounds greater than 80 phons, (2) a case where sound sleep is disturbed and psychological disorders such as annoyance or anxiety are caused, (3) a case where the work or study is disturbed to cause a decrease in efficiency, and (4) a case where daily life such as conversation is disturbed" (Britannica International Encyclopedia, sub-item dictionary, Britannica Japan Co., Ltd., 2014). The noise is also defined as "sounds that are noisy and cause discomfort or sounds that become obstacles with respect to certain purposes" (Digital Daijisen, Shogakukan Inc.), and it is more desirable that such a noise is set as a target sound to be soundproofed. In a case where the direction of such a noise source is specified, the direction can be determined as described above. In other words, first, the frequency which becomes a noise on the film of the soundproofing structure of the present invention is determined using a spectrum analyzer, an oscilloscope, or a microphone application. Next, a direction q in which the sound of the noise frequency flows toward the soundproofing structure can be determined by investigating the sound source direction in the periphery of the soundproofing structure with respect to the noise frequency, using a microphone array, beamforming, a PU probe, and the like. By investigating the sound source direction in the periphery of the soundproofing structure, the direction of the noise source can be determined not by measuring a direction from the position of the sound source P itself linearly toward the soundproofing structure but by measuring the direction q in which the actual noise flows toward the soundproofing structure of the present invention in a case of a structure that restricts sounds such as the above-described L-shaped duct or a fixed partition.

Further, there is also a case where a sound to be soundproofed flows toward the soundproofing structure of the present invention from a plurality of directions. For example, there is also a case where a sound is reflected toward the soundproofing structure. Further, there is also a case where a plurality of sound sources to be soundproofed, which emit the same kinds of sounds to be soundproofed, are present. In this case, according to the above-described method of investigating a sound source, the sound pressure for each direction as well as the sound direction can be measured. First, by determining the frequency of the sound to be soundproofed is determined according to the above-described method, and performing investigation on the sound source in a space such as a PU probe, the direction q having the maximum sound pressure at frequencies of the sounds to be soundproofed is determined. Therefore, it is desirable that the soundproofing structure is disposed such that the film is inclined with respect to the direction q. Further, it is desirable that the soundproofing structure is disposed at an angle where the film surface of the soundproofing structure is inclined with respect to each of the noise source directions coming from a plurality of directions.

Further, as a noise level in a desirable living environment, 55 dBA or less is desirable (highly uncomfortable), 50 dBA or less is more desirable (slightly uncomfortable), 35 dBA or less is still more desirable, and 30 dBA or less is most desirable (based on the WHO Environmental Noise Guidelines (1999)). Therefore, since the sound sources with sound levels greater than these sound levels are felt as the noise, it is desirable to deal with these sound sources in a stepwise manner.

Further, the frequency band of a sound to be soundproofed is preferably in a range of 1000 Hz to 20000 Hz, more preferably in a range of 1500 Hz to 15000 Hz, and still more preferably in a range of 2000 Hz to 12000 Hz.

Figure 1:
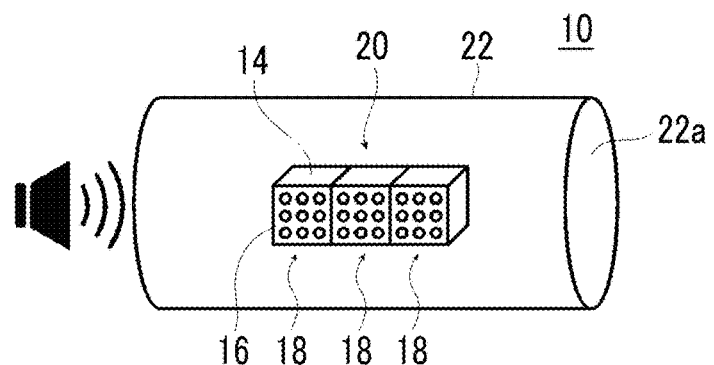
FIG. 1 is a perspective view schematically illustrating an example of a cylindrical structure obtained by using a soundproofing structure of the present invention.

FIG. 1 is a front view schematically illustrating an example of a preferred embodiment of a cylindrical structure formed by disposing the soundproofing structure of the present invention in a cylindrical member. FIG. 2 is a schematic perspective view illustrating a soundproofing cell of the soundproofing structure illustrated in FIG. 1, and FIG. 3 is a cross-sectional view of FIG. 2.

Figure 2:
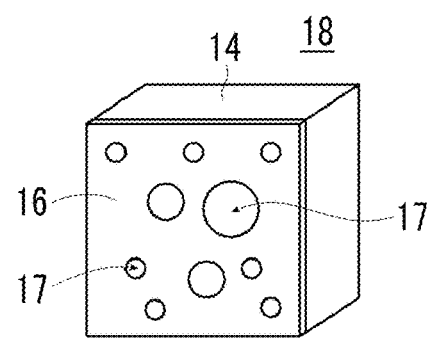
FIG. 2 is a perspective view schematically illustrating an example of a soundproofing cell.
Figure 3:
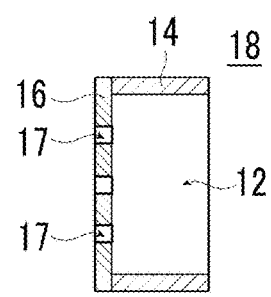
FIG. 3 is a cross-sectional view schematically illustrating an example of a soundproofing cell.

As illustrated in FIGS. 2 and 3, the soundproofing structure 20 includes one or more soundproofing cells 18 including a frame 14 having a frame hole portion 12 passing therethrough and a film 16 that covers one side of the frame hole portion 12 and is fixed to the frame 14. In the example illustrated in FIG. 1, three soundproofing cells are arranged in a row, and a plurality of through-holes 17 having an average opening diameter of 0.1 μm to 250 μm are formed in the film 16.

As illustrated in FIG. 1, the soundproofing structure 20 is disposed in a cylindrical member 22 having an opening 22a such that the film surface of the film 16 is inclined with respect to the opening cross section of the cylindrical member 22 and a region which becomes a vent hole through which gas passes is provided in the cylindrical member 22. In other words, the direction perpendicular to the film surface of the film 16 intersects with the direction perpendicular to the opening cross section of the cylindrical member 22.

Figure 6:
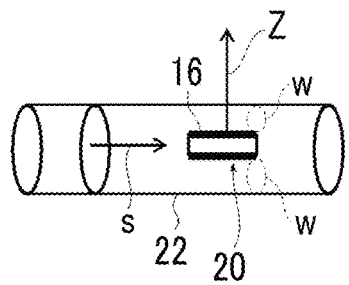
FIG. 6 is a schematic view for describing disposition of a soundproofing structure in an opening member.

The cylindrical member 22 is an opening member in the present invention. In a case where the opening member is a cylindrical member having a length such as a duct and a soundproofing structure is disposed in this cylindrical member, since the sound advances in the opening of the cylindrical member 22 in a direction substantially perpendicular to the opening cross section as illustrated in FIG. 6, and thus a direction s substantially perpendicular to the opening cross section becomes the direction of the sound source. Therefore, by disposing a vertical direction z of the film surface of a film 16 so as to be inclined with respect to a direction s perpendicular to the opening cross section of the cylindrical member 22, the vertical direction z of the film surface is disposed in a state of being inclined with respect to the direction of the sound source to be soundproofed. In other words, the soundproofing structure of the present invention absorbs a sound applied to the film surface in an inclined direction or in parallel without absorbing a sound applied to the film surface in a vertical direction.

Here, the soundproofing structure 20 of the present invention does not have a closed space on one surface side (hereinafter, also referred to as a rear surface) of the film. In other words, the soundproofing structure 20 does not use the principle in which the connection between an air layer inside a through-hole and an air layer inside a closed space is allowed to function as a mass spring to cause resonance for sound absorption.

As described above, in the configuration which is obtained by providing a closed space on one surface side (the rear surface) of the film in which a plurality of through-holes have been formed and in which a sound is absorbed using the Helmholtz resonance, a shielding plate that does not allow a sound to pass through the rear surface of the porous plate becomes indispensable in order to prepare a closed space. Further, as a principle, a frequency band which is capable of sound absorption since the resonance is used is narrow, and the band is difficult to widen.

In order to solve such a problem, it has been attempted to provide a plurality of holes in the thickness direction or the horizontal direction or provide a plurality of holes in the closed space on the rear surface, but there are problems of an increase in size of the holes because a plurality of cells need to be provided, complication of the structures or components because these need to be formed separately, and an increase in number of components.

Further, since a closed space is required to be provided on the rear surface, there is a problem in that the size of the volume of the closed space is increased. Particularly, the size of the volume needs to be increased because there is a necessity to increase the volume of the air layer of the closed space in order to absorb a low frequency sound.

Further, since a closed space is required to be provided on the rear surface, there is a problem in that the ventilation properties or waste heat cannot be ensured.

In a soundproofing structure having through-holes without a closed space, a structure with the performance as close to the sound insulation performance of the original sheet as possible even in a case where the through-holes are opened by devising the structures around the through-holes has been suggested, but there are problems in that higher soundproofing performance cannot be obtained and a sound cannot be satisfactorily absorbed because the sound is reflected.

The present inventors found that the sound absorbing effect can be obtained without a closed space on a rear side by providing a soundproofing structure including a soundproofing cell formed by fixing a film having a plurality of through-holes with an average opening diameter of 0.1 μm to 250 μm so as to cover a frame hole portion of a frame having a frame hole portion and by disposing this soundproofing structure such that the vertical direction of the film surface is inclined with respect to the direction of a sound source to be soundproofed.

The present inventors speculated that the mechanism for the sound absorption of the soundproofing structure of the present invention is a change from the sound energy to the thermal energy due to the friction between the air and the inner wall surface of each through-hole at the time of the sound passing through the fine through-holes formed in the film.

In a case where the average opening diameter of the through-holes is small, it is considered that the friction occurring on the inner wall surface or an edge portion of each through-hole can be increased because the ratio of the length of the edge of the through-hole to the opening area is increased, by comparing with a case where the opening ratio of the through-holes is the same, but the average opening diameter thereof is larger. By increasing the friction at the time of the sound passing through the through-holes, the sound energy is converted into the thermal energy so that the sound can be absorbed.

Here, it is assumed that the soundproofing structure is disposed in the opening member such that the direction perpendicular to the opening cross section of the opening member is parallel with the surface of the film. In a case where only a film without a frame is disposed in parallel with the direction perpendicular to the opening cross section of the opening member in the opening member, the sound pressure and the local speed in both surfaces of this film are perfectly the same as each other. In this case, since the same pressure is applied from both surfaces, a force (in other words, a force of the direction in which an element of a component perpendicular to the film) of the sound passing through fine holes and flowing toward the opposite surface is not operated. Therefore, it can be speculated that absorption does not occur in this case.

On the contrary, in the present invention, in a case where the distance from one surface of the film to a frame end is different from the distance from the other surface of the film to the frame end because the sound advances toward the frame surface and then wraps around due to the presence of the frame, an effect of providing a difference in phase for the sound field on both surfaces of the film, changing a local traveling direction of the sound due to the diffraction effect, and preparing a component in a direction perpendicular to the film is considered to be present, due to the difference in the distance of the wrapping sound to pass through from both sides of the frame. In other words, due to the presence of the frame, it becomes possible to change the phase in both surfaces of the film, make a state in which the sound pressure and the local speed are different from each other, and allow the air to pass through fine through-holes. Therefore, due to the friction between the air and the inner wall surface of each through-hole, the sound can be absorbed by allowing the sound energy to be converted into the thermal energy.

This mechanism is the characteristic only for through-holes since this mechanism is operated in a case where the size of the through-holes is small. Therefore, this mechanism is different from the mechanism operated by resonance such as the film resonance or Helmholtz resonance of the related art. In terms of the equivalent circuit, the resonance phenomenon such as film resonance or Helmholtz resonance of the related art is described in the series circuit (an LCR circuit including the resistance such as the viscosity of the film) of an inductance L and a capacitor C. Meanwhile, in the present invention, the resonance phenomenon is described in LR circuit only with R due to the friction with the inductance L of through-holes.

A path directly passing through the through-hole as the sound in the air has an extremely small impedance compared to a path that is radiated as a sound again after being converted into membrane vibration. Therefore, the sound easily passes through the path of through-holes finer than the membrane vibration. At the time of passing through these through-holes, the sound passes therethrough after being concentrated on a narrow area of the through-holes from a wide area on the entire film surface. Since the sound is collected in the through-holes, the local speed becomes extremely high. The friction inside the fine through-holes is increased and converted into heat in order to correlate with the speed.

As described above, in the mechanism for sound absorption of the present invention, it is important that the diameter of each through-hole is small, and the mechanism of the present invention does not depend on the material or the like of the film. Accordingly, the material of the film can be appropriately selected.

As described above, the soundproofing structure of the present invention does not need a closed space on the rear surface of the film and can function only with the film having through-holes. Therefore, the size of the structure can be reduced.

Further, as described above, in the soundproofing structure of the present invention, since sound absorption occurs using the friction at the time of the sound passing through the through-holes, the sound can be absorbed in a broadband regardless of the frequency band of the sound.

Further, since a closed space is not provided on the rear surface of the film and the soundproofing structure is disposed in a state in which a region serving as a vent hole through which gas passes is provided in an opening member, the ventilation properties can be ensured.

Further, since the through-holes are present, light can be transmitted while being scattered.

Further, since the soundproofing structure can function by forming fine through-holes, the degree of freedom for selecting the material is high and the material can be selected according to the environment by considering problems of the contamination of the surrounding environment and the performance of environmental resistance. Therefore, the problems can be reduced.

In addition, even in a case where a liquid such as water adheres to the film, water avoids the through-hole portions due to the surface tension so that the through-holes are not blocked because the film has fine through-holes, the sound absorption performance is unlikely to be degraded.

In the example illustrated in FIG. 1, the soundproofing structure 20 is disposed such that the vertical direction of the film surface of the film 16 intersects with the direction perpendicular to the opening cross section of the cylindrical member 22. However, the present invention is not limited to this example, and the soundproofing structure 20 may be disposed such that the vertical direction z of the film surface of the film 16 intersects with the direction s perpendicular to the opening cross section of the cylindrical member 22 as illustrated in FIG. 7.

From the viewpoints of improving the sound absorption performance and ventilation properties, in other words, increasing the vent hole, and reducing the amount of wind applied to the film surface in a case of a noise structure provided with a fan or the like for blowing wind, the angle between the direction s perpendicular to the opening cross section of the cylindrical member 22 and the vertical direction z of the film surface of the film 16 of the soundproofing structure 22 is preferably 15 degrees or greater, more preferably 45 degrees or greater, and still more preferably 75 degrees or greater.

Figure 7:
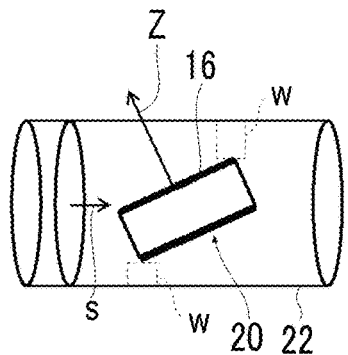
FIG. 7 is a schematic view for describing disposition of a soundproofing structure in an opening member.

As illustrated in FIGS. 6 and 7, the soundproofing structure 20 is disposed in a state in which a region w serving as a vent hole through which gas passes is provided between the inner wall surface of the opening of the cylindrical member 22 and the soundproofing structure 20.

In the example illustrated in FIG. 1, the configuration in which the soundproofing structure 20 is disposed in the opening 22a of the cylindrical member 22 is employed. However, the present invention is not limited to thereto, and a configuration in which the soundproofing structure 20 is disposed in a position protruding from an end surface of the cylindrical member 22 may be employed. Specifically, it is preferable that the soundproofing structure 20 is disposed within an opening end correction distance from an opening end of the cylindrical member 22. In a case of using the cylindrical member 22, the antinode of stationary wave protrudes to the outside the opening 22a of the cylindrical member 22 by an opening end correction distance, and thus the soundproofing performance can be provided even in a case where the soundproofing structure is disposed outside the cylindrical member 22. Further, the opening end correction distance in a case of the cylindrical member 22 having a cylindrical shape is approximately "0.61×radius of tube".

Here, the soundproofing structure 20 in the example illustrated in FIG. 1 is formed of a plurality of, that is, three soundproofing cells 18. However, the present invention is not limited thereto, and the soundproofing structure 20 may be formed of one soundproofing cell 18 including one frame 14 having one frame hole portion 12 and one film 16; formed of two soundproofing cells 18; or formed of four or more soundproofing cells 18.

In the present invention, it is preferable that the opening member has an opening formed in a region of an object that blocks the passage of gas and also preferable that an opening is provided in a wall that separates two spaces from each other.

Here, the object that has a region in which an opening is formed and blocks the passage of gas indicates a member separating two spaces from each other or a wall. Examples thereof include members such as a tubular body and a cylindrical member; and walls, for example, a fixed wall constituting a structure of a building such as a house, an office building, or a factory, a fixed wall such as a fixed partition (partition) that is disposed in a building room and partitions the inside the room, and a movable wall (partition) such as a movable partition that is disposed in a building room and partitions the inside of the room.

The opening member of the present invention is a member having an open portion for the purpose of ventilation, heat dissipation, or movement of a substance, such as a window frame, a door, a doorway, a ventilation hole, a duct portion, or a louver portion. In other words, the opening member may be a tubular body such as a duct, a hose, a pipe, or a conduit or a cylindrical member; a ventilation hole portion for attaching a louver or a louver portion; a wall having an opening for attaching a window or the like; a portion formed of a partition upper portion, a ceiling, and a wall; or a window member such as a window frame to be attached to a wall. In other words, it is preferable that a portion surrounded by a closed curve is an opening portion and the soundproofing structure of the present invention is disposed therein.

In a case where the soundproofing structure is attached to a window member or a partition and a sound source is not positioned in the vertical direction of the film, a sound traveling vector tends to be bent due to a wall member or the sound tends to advance at an angle close to the horizontal direction of the film due to a diffraction phenomenon at an edge portion. Therefore, in a case where the soundproofing structure is used for a wall or the like in a space, the structure is disposed such that the sound passes on the film so that the broadband absorption effect of the present invention is exhibited.

Further, in a case of a cylindrical member such as a duct, a duct itself functions as an acoustic tube that guides only a plane sound wave particularly with respect to a low frequency sound. For example, a sound at a frequency of approximately 4000 Hz or less in a mode other than the plane wave cannot exist in a cylinder having an inner diameter of 40 mm because the sound is being cut off from the cylinder, and the only wave which can be guided inside the cylindrical member becomes the plane wave. Accordingly, the sound traveling vector is easily determined in the case of the cylindrical member such as a duct, and the soundproofing structure of the present invention may be disposed such that the vertical direction of the film surface is inclined with respect to the direction of the traveling vector.

Further, the cross-sectional shape of the opening of the opening member according to the present invention is a circle in the example illustrated in FIG. 1, but is not particularly limited as long as the soundproofing cell, that is, the soundproofing structure of the present invention can be disposed inside the opening. Examples of the shape include a square, a rectangle, a diamond, and other rectangles such as a parallelogram; a triangle such as an equilateral triangle, an isosceles triangle, or a right triangle; a polygon including a regular polygon such as a regular pentagon or a regular hexagon; an ellipse, and an amorphous shape.

Further, the material of the opening member of the present invention is not limited, and examples of the material include various metals such as aluminum, titanium, magnesium, tungsten, iron, steel, chromium, chromium molybdenum, nichrome molybdenum, and alloys of these; resin materials such as an acrylic resin, polymethyl methacrylate, polycarbonate, polyamideimide, polyarylate, polyetherimide, polyacetal, polyether ether ketone, polyphenylene sulfide, polysulfone, polyethylene terephthalate, polybutylene terephthalate, polyimide, and triacetyl cellulose; carbon fiber reinforced plastics (CFRP), carbon fiber, glass fiber reinforced plastics (GFRP), and wall materials such as concrete similar to the wall material of a building, mortar, and wood.

Figure 8:
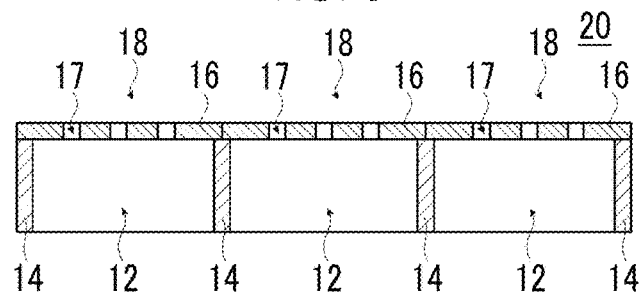
FIG. 8 is a cross-sectional view schematically illustrating an example of a soundproofing structure.

In the soundproofing structure 20 illustrated in FIG. 1, a plurality (3) of frame hole portions 12 are provided in a rod member having a rectangular parallelepiped shape with a constant thickness and the frame 14 of each soundproofing cell 18 is formed by a portion surrounding each frame hole portion 12, as illustrated in FIG. 8. In other words, the plurality of frames 14 are integrally formed as one frame body.

In the example illustrated in FIG. 8, the soundproofing structure is configured to have three frame hole portions, but the present invention is not limited thereto. The soundproofing structure may be configured to have two frame hole portion or configured to have four or more frame hole portions. Alternatively, the soundproofing structure may be configured to have one frame hole portion. In other words, the frame 14 may be configured such that one frame hole portion 12 is provided in a rod member having a rectangular parallelepiped shape with a constant thickness.

Further, in the example illustrated in FIG. 1, the plurality of frames 14 may be arranged in a row. However, the present invention is not limited thereto and the frames may be two-dimensionally arranged.

Figure 9:
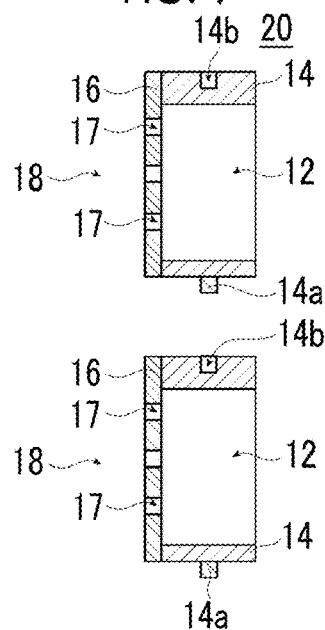
FIG. 9 is a cross-sectional view schematically illustrating another example of a soundproofing structure.

In the example illustrated in FIG. 8, the configuration in which three soundproofing cells 18 are connected by using a member obtained by integrally forming the frames 14 is employed. However, the present invention is not limited thereto and a configuration in which independent soundproofing cells 18 (frames 14) are connected to one another using pressure sensitive adhesive tape or an adhesive may be employed. Alternatively, as illustrated in FIG. 9, a configuration in which each soundproofing cell 18 has a projection 14a on one side surface of the frame 14 and a depression 14b in the other side surface, and one projection 14a of one soundproofing cell 18 to be connected to another soundproofing cell 18 is fitted to the depression 14b of the other soundproofing cell 18 so that these cells are connected to each other may be employed.

By employing a configuration in which independent soundproofing cells 18 are connected to each other, the soundproofing cells 18 can be attached and detached from each other and the number of soundproofing cells 18 can be changed depending on the purpose thereof.

[Frame]

The frame 14 is formed to surround the frame hole portion 12 passing therethrough and fixes and supports the film 16 such that the film 16 covers one end surface of the frame hole portion 12. The frame 14 has higher rigidity than the film 16. Specifically, it is preferable that both of the mass and the rigidity of the frame 14 per unit area are high.

Further, it is preferable that the frame 14 has a continuous shape which is capable of fixing the film 16 such that the entire circumference of the film 16 can be suppressed. However, the present invention is not limited thereto, the frame 14 may have a shape which is partially disconnected and discontinued as long as the film 16 can be suitably fixed.

Further, the cross-sectional shape perpendicular to the penetration direction of the frame hole portion 12 through the frame 14 is a square in the example illustrated in FIG. 1. However, the present invention is not particularly limited, and examples thereof include a rectangle, a diamond, and other rectangles such as a parallelogram; a triangle such as an equilateral triangle, an isosceles triangle, or a right triangle; a polygon including a regular polygon such as a regular pentagon or a regular hexagon; an ellipse, and an amorphous shape. In addition, the frame hole portion 12 of the frame 14 passes through the frame 14 in the thickness direction.

In the description below, the size of the frame 14 is the size of the frame hole portion 12 thereof in a plan view. The size of the frame hole portion 12 in a plan view is defined as the diameter of the frame hole portion 12 in a cross section perpendicular to the penetration direction of the frame hole portion 12, in other words, the opening diameter of the frame hole portion 12. Further, in a case where the shape of the cross section perpendicular to the penetration direction of the frame hole portion 12 is a shape other than a circle, such as a polygon, an ellipse, or an amorphous shape, the size of the frame hole portion 12 is defined by a circle equivalent diameter. In the present invention, the circle equivalent diameter is a diameter in a case where the shape is converted into a circle having the same area as that of the shape.

Further, in the soundproofing structure 20 of the present embodiment, the size of the frame hole portion 12 of the frame 14 may be constant in all frame hole portions 12, but frames with different size (including a case where frames have different shapes) may be included. In this case, the average size of the frame hole portions 12 may be used as the size of the frame hole portion 12.

The size of the frame hole portion 12 of the frame 14 is not particularly limited and may be set according to the object to be soundproofed to which the opening member of the soundproofing structure 20 of the present invention is applied, for example, a copying machine, a blower, an air conditioning machine, a ventilator, pumps, a generator, a duct, industrial equipment, for example, various kinds of manufacturing devices emitting a sound such as a coater, a rotating machine, and a carrier machine, transportation equipment such as an automobile, an electric train, and an aircraft, and general household equipment such as a refrigerator, a washing machine, a dryer, a television, a copier, a microwave oven, a game machine, an air conditioner, a fan, a personal computer, a vacuum cleaner, and an air cleaner.

Further, this soundproofing structure 20 can be used as a partition to block sounds from a plurality of noise sources. Even in this case, the size of the frame 14 can be selected from the frequencies of the target noise.

The size of the frame hole portion 12 is not particularly limited. However, in a case where the size of the frame is greater than the wavelength of the sound to be soundproofed, from the viewpoint that distribution of positive and negative sound pressures are formed on the surface of the frame 14, complicated membrane vibration or sound flow is excited, and thus flat soundproofing characteristics with respect to a change of the frequency are not obtained in some cases, it is preferable that the size of the frame is smaller than the wavelength of the sound to be soundproofed.

For example, the size thereof is preferably in a range of 0.5 mm to 300 mm, more preferably in a range of 1 mm to 100 mm, and most preferably in a range of 10 mm to 50 mm.

Further, in a case where frames 14 with different size are provided, the size of the frame 14 is the average size.

Further, the frame thickness of the frame 14 and the thickness (hereinafter, also referred to as the height of the frame 14) of the frame hole portion 12 in the penetration direction are not particularly limited as long as the film 16 can be reliably fixed and the film 16 can be reliably supported, but can be set according to the size of the frame hole portion 12.

Figure 61:
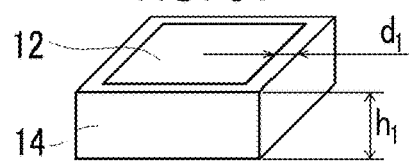
FIG. 61 is a schematic perspective view for describing the shape of a frame.

Here, as illustrated in FIG. 61, the frame thickness of the frame 14 is a thickness $d_1$ of the thinnest portion in the opening surface of the frame 14. In addition, the height of the frame 14 is a height $h_1$ of the frame hole portion in the penetration direction.

For example, in a case where the size of the frame hole portion 12 is in a range of 0.5 mm to 50 mm, the frame thickness of the frame 14 is preferably in a range of 0.5 mm to 20 mm, more preferably in a range of 0.7 mm to 10 mm, and most preferably in a range of 1 mm to 5 mm.

In a case where the ratio of the frame thickness of the frame 14 to the size of the frame 14 is extremely large, there is a concern that the area ratio of the frame 14 in the entire area is increased so that the device becomes heavy. On the contrary, in a case where the ratio thereof is extremely small, the film is unlikely to be strongly fixed by the frame 14 using an adhesive or the like.

Further, in a case where the size of the frame hole portion 12 is greater than 50 mm and 300 mm or less, the frame thickness of the frame 14 is preferably in a range of 1 mm to 100 mm, more preferably in a range of 3 mm to 50 mm, and most preferably in a range of 5 mm to 20 mm.

In addition, the height of the frame 14, that is, the thickness of the frame hole portion 12 in the penetration direction is preferably in a range of 0.5 mm to 200 mm, more preferably in a range of 0.7 mm to 100 mm, and most preferably in a range of 1 mm to 50 mm.

In a case where the frame thickness and the height of each frame 14 vary, it is preferable that the frame thickness and the height of the frame 14 are respectively the average thickness and the average height.

The number of the frames 14, that is, the number of the frame hole portions 12 of the soundproofing structure 20 of the present invention are not particularly limited and may be set according to the above-described object to be soundproofed in the soundproofing structure 20 of the present invention. Alternatively, since the size of the frame hole portion 12 described above is set according to the above-described object to be soundproofed, the number of the frame hole portions 12 of the frames 14 may be set according to the size of the frame hole portion 12.

For example, in a case where the noise is shielded (reflection and/or absorption) in equipment, the number of the frames 14 is preferably in a range of 1 to 10000, more preferably in a range of 2 to 5000, and most preferably in a range of 4 to 1000.

Since the size of general equipment is determined, it is necessary that noise is frequently shielded by a frame body obtained by combining a plurality of soundproofing cells 18 in order to set to size of one soundproofing cell 18 to a size suitable for the sound volume and the frequency of the noise. This is because the weight of the frame 14 with respect to the total weight is increased in a case where the number of soundproofing cells 18 is extremely increased. Meanwhile, in a structure such as a partition whose size is not restricted, the number of frames 14 can be freely selected according to the size of the entire body to be required.

In addition, since one soundproofing cell 18 has one frame 14 as a constitutional unit, the number of frames 14 of the soundproofing structure 20 of the present embodiment can be set as the number of the soundproofing cells 18.

The material for forming the frame 14 is not particularly limited as long as the frame 14 is capable of supporting the film 16, has a suitable strength when applied to the object to be soundproofed, and has resistance to the soundproofing environment of the object to be soundproofed, and the material can be selected according to the object to be soundproofed and the soundproofing environment. Examples of the material of the frame 14 include various metals such as aluminum, titanium, magnesium, tungsten, iron, steel, chromium, chromium molybdenum, nichrome molybdenum, and alloys of these; resin materials such as an acrylic resin, polymethyl methacrylate, polycarbonate, polyamideimide, polyarylate, polyetherimide, polyacetal, polyether ether ketone, polyphenylene sulfide, polysulfone, polyethylene terephthalate, polybutylene terephthalate, polyimide, triacetyl cellulose, and ABS resins (acrylonitrile, butadiene, and a styrene copolymerized synthetic resin); carbon fiber reinforced plastics (CFRP), carbon fiber, glass fiber reinforced plastics (GFRP).

Further, a plurality of these materials of the frame 14 may be used in combination.

Figure 62:
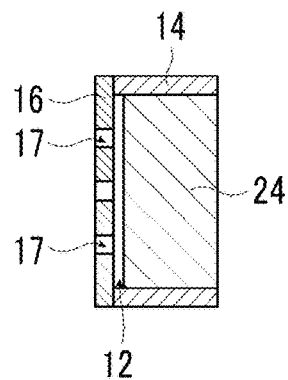
FIG. 62 is a cross-sectional view schematically illustrating another example of a soundproofing structure.

Further, a sound absorbing material 24 may be disposed in the frame hole portion 12 of the frame 14 as illustrated in FIG. 62.

By disposing a sound absorbing material, the sound insulation characteristics can be further improved due to the sound absorbing effect from the sound absorbing material.

The sound absorbing material is not particularly limited, and a known sound absorbing material of the related art can be appropriately used. Various known sound absorbing materials, for example, foam materials such as urethane foam, glass wool, and non-woven fabric such as microfibers (THINSULATE, manufactured by 3M Company) can be used.

At this time, in order not to disturb the mechanism for a sound passing through the through-holes and generating the friction, it is desirable that the sound absorbing material is disposed by being separated from the film surface of the film 16 by a distance of 3 mm or greater. Meanwhile, the membrane vibration can be suppressed by disposing the sound absorbing material so as to be brought into contact with the film. In a configuration in which the membrane vibration easily occurs, for example, in a case where the opening ratio is small, the size of the frame is small, or the like, the effect of sound absorption caused by the sound passing through the through-holes resulting from the membrane vibration cannot be sufficiently exhibited in some cases. On the contrary, the effect of sound absorption caused by the sound passing through the through-holes can be sufficiently exhibited in a case where the sound absorbing material is disposed by being brought into contact with the film for the purpose of suppressing the membrane vibration.

In addition, the soundproofing structure of the present invention may be put into an opening member including a tubular body such as a duct, together with various known sound absorbing materials, for example, foam materials such as urethane foam, glass wool, and non-woven fabric such as microfibers (THINSULATE, manufactured by 3M Company).

As described above, by combining known sound absorbing materials with the soundproofing structure or in the soundproofing structure of the present invention, both of the effect resulting from the soundproofing structure of the present invention and the effect resulting from the known sound absorbing materials can be obtained.

[Film Having Plurality of Through-Holes]

The film 16 has a plurality of through-holes 17 in the thickness direction and is fixed to the frame 14 so as to be suppressed by the frame and to cover the frame hole portion 12 of the frame 14. The average opening diameter of the plurality of through-holes formed in the film 16 is in a range of 0.1 μm to 250 μm.

According to the examination of the present inventors, it was found that an optimum ratio for the average opening ratio of the through-holes is present and the absorbance is increased as the average opening ratio is decreased particularly in a case where the average opening diameter is approximately 50 μm or greater, which is relatively large. While the sound passes through each of the plurality of through-holes in a case where the average opening ratio is large, the amount of the sound passing through one through-hole becomes large since the number of through-holes is reduced in a case where the average opening ratio is small, the local speed of the air at the time of passing through the through-holes is further increased, and thus the friction occurring on the inner wall surface or an edge portion of each through-hole can be increased.

From the viewpoint of the sound absorption performance, the upper limit of the average opening diameter of the through-holes is 250 μm or less, preferably 100 μm or less, more preferably 80 μm or less, still more preferably 70 μm or less, particularly preferably 50 μm or less, and most preferably 30 μm or less. The reason for this is that the friction is likely to occur because the ratio of the length of the edge of through-holes contributing to the friction in the through-holes to the opening area of the through-holes is increased as the average opening diameter of the through-holes is decreased.

The lower limit of the average opening diameter is preferably 0.5 μm or greater, more preferably 1 μm or greater, and still more preferably 2 μm or greater. In a case where the average opening diameter is extremely small, the viscous resistance is extremely high at the time of the sound passing through the through-holes, and thus the sound cannot sufficiently pass through the through-holes. Therefore, the sound absorbing effect cannot be sufficiently obtained even in a case where the opening ratio is increased.

The average opening ratio of through-holes can be appropriately selected, but the sound absorption performance tends to be improved in a case where the average opening diameter is small. Here, in a case where the average opening ratio is extremely small, the film easily vibrates and this leads to a decrease in absorption effects.

Therefore, the average opening ratio of the through-holes is preferably in a range of 0.5% to 15%, more preferably in a range of 1% to 12%, and still more preferably in a range of 2% to 10%.

The average opening diameter of the through-holes is obtained by imaging one surface of the film at a magnification of 200 times using a high-resolution scanning electron microscope (SEM) from one surface of the film, twenty through-holes whose surroundings are connected in a ring shape are extracted from the obtained SEM photo, the opening diameters are read, and an average value of these obtained values is calculated as an average opening diameter. In a case where the number of through-holes is less than 20 in one SEM photo, other surrounding positions are imaged to obtain other SEM photos until the number of through-holes becomes 20.

Further, after the areas of the through-hole portions are respectively measured, the through-holes are replaced with circles having the same areas as those of the through-holes, and the opening diameter is evaluated using the diameter (circle equivalent diameter) of a circle at the time of replacement. In other words, since the shape of the opening portion of a through-hole is not limited to a substantially circular shape, in a case where the shape of the opening portion is a non-circular shape, the opening diameter is evaluated with the diameter of a circle having the same area as the through-hole. Therefore, in a case of through-holes having a shape in which two or more through-holes are integrated, these through-holes are regarded as one through-hole and the circle equivalent diameter of the through-holes is set as the opening diameter.

Through this process, all the circle equivalent diameter, the opening ratio, and the like can be calculated by "Analyze Particles" using, for example, "Image J" (https://imagej.nih.gov/ij/).

Further, the average opening ratio is obtained by imaging the surface of the film from directly above at a magnification of 200 times using a high-resolution scanning electron microscope (SEM), binarizing the visual fields (five sites) having a size of 30 mm×30 mm of the obtained SEM photo using image analysis software or the like to observe through-hole portions and non-through-hole portions, calculating the ratio (opening area/geometric area) from the total opening area of the through-holes and the area (geometric area) of the visual fields, and setting the average value in each visual field (5 sites) as an average opening ratio.

Here, in the soundproofing structure of the present invention, a plurality of through-holes may be regularly arranged or randomly arranged. From the viewpoints of the productivity of fine through-holes, robustness of sound absorption characteristics, and suppression of sound diffraction, it is preferable that the through-holes are randomly arranged. Further, the robustness of the sound absorption characteristics indicates that the sound absorption characteristics are unlikely to be changed in a case where unevenness occurs in the arrangement, the opening diameter, or the like at the time of preparation or production. Particularly, it is preferable that the arrangement is set to be random from the beginning from the viewpoint that the sound absorption characteristics are not affected by the unevenness in arrangement.

In regard to sound diffraction, a sound diffraction phenomenon occurs according to the cycle of through-holes in a case where the through-holes are periodically arranged, and there is a concern that the sound is bent due to the diffraction and the direction in which the noise advances is divided into a plurality of directions. The random arrangement indicates arrangement which does not have periodicity such as perfect alignment and in which the sound absorbing effect from each through-hole is exhibited and the diffraction phenomenon due to a minimum distance between through-holes does not occur.

Further, samples are also prepared by performing an etching treatment during a continuous treatment in a roll shape in the examples of the present invention. However, since mass production can be more easily made by performing a surface treatment or the like to form a random pattern at once rather than the process of preparing a periodic arrangement, it is preferable that the through-holes are randomly arranged from the viewpoint of the productivity.

In the present invention, random arrangement of through-holes is defined as follows.

Strongly diffracted light appears in a case of a perfectly periodic structure. Further, even in a case where only a small part of the periodic structure has a different position, diffracted light appears due to the remaining structure. Since diffracted light is a wave formed by superimposing scattered light from basic cells of the periodic structure, the mechanism for diffracted light is that the diffracted light is generated by interference of the remaining structure even in a case where only some basic cells are disturbed.

Therefore, as the number of basic cells disturbed from the periodic structure is increased, the intensity of the scattered light that interferes such that the diffracted light intensifies each other is decreased, and thus the intensity of diffracted light is decreased.

In the present invention, the term "random" indicates a state in which at least 10% of through-holes from among all through-holes are deviated from the periodic structure. Based on the description above, since it is desirable that the number of basic cells deviated from the periodic structure is increased in order to suppress diffracted light, a structure in which 50% of through-holes from among all through-holes are deviated is preferable, a structure in which 80% of through-holes from among all through-holes are deviated is more preferable, and a structure in which 90% of through-holes from among all through-holes are deviated is still more preferable.

As a verification of the deviation, it is possible to perform analysis on an image having 5 or more through-holes. As the number of through-holes is increased, the analysis can be performed with higher precision. An image in which the positions of a plurality of through-holes can be recognized using an optical microscope, an SEM, or the like can be used.

In a captured image, by focusing on one through-hole, the distances of the through-hole and other through-holes around the through-hole are measured. The nearest distance is set as a1, the second nearest distance is set as a2, the third nearest distance is set as a3, and the fourth nearest distance is set as a4. At this time, in a case where two or more distances from among a1 to a4 match to one another (for example, the matched distance is set as b1), the through-holes can be determined as holes having a periodic structure with respect to the distance b1. Meanwhile, in a case where any distances from among a1 to a4 do not match to each other, the through-holes can be determined as through-holes deviated from the periodic structure. This operation is performed on all through-holes on an image for determination.

Here, in a case where the hole diameter of the focused through-hole is set as $\Phi$, up to the deviation by $\Phi$ is set to be included in the range of the above-described "match". In other words, in a relationship of "$a2-\Phi<a1<a2+\Phi$", a2 and a1 are set to match to each other. This is because scattering is considered to occur in a range of the hole diameter $\Phi$ because scattered light from each through-hole is considered as diffracted light.

Next, for example, the number of "through-holes having a periodic structure with respect to the distance b1" is counted and the ratio of the number of the through-holes to the number of all through-holes on an image is acquired. In a case where the ratio is set to c1, the ratio c1 is a ratio of the through-holes having a periodic structure, and 1-c1 is a ratio of the through-holes deviated from the periodic structure, and 1-c1 is a numerical value determining the above-described "random". In a case where a plurality of distances, for example, "through-holes having a periodic structure with respect to the distance b1" and "through-holes having a periodic structure with respect to the distance b2" are present, the distance b1 and the distance b2 are separately counted. In a case where the ratio of the periodic structure with respect to the distance b1 is set as c1 and the ratio of the periodic structure with respect to the distance b2 is set as c2 and both of (1-c1) and (1-c2) are 10% or greater, this structure is a "random" structure.

Further, in a case where any of (1-c1) or (1-c2) is less than 10%, the structure has a periodic structure and is not "random". In this manner, in a case where the condition for being "random" is satisfied with respect to any of the ratios c1, c2, . . . , the structure thereof is defined as "random".

Further, a plurality of through-holes may be formed of through-holes having one opening diameter or formed of through-holes having two or more opening diameters. From the viewpoints of the productivity and the durability, it is preferable that the plurality of through-holes are formed of through-holes having two or more opening diameters.

In terms of the productivity, similar to the random arrangement, the productivity is improved in a case where the opening diameter is allowed to vary from the viewpoint of performing a large number of etching treatments. From the viewpoint of the durability, since the size of dust or dirt varies depending on the environment, in a case where the through-holes are formed of through-holes having one opening diameter and the size of main dirt approximately matches the opening diameter of each through-hole, all through-holes are affected by the dirt. Therefore, a soundproofing structure which can be used in various environments can be obtained by providing through-holes with a plurality of different opening diameters.

According to the production method of WO2016/060037A or the like, it is possible to form a through-hole in which the hole diameter is increased therein and which has a maximum diameter therein. Due to this shape, dirt (dust, a toner, non-woven fabric, or a foam which becomes separated) having an approximately same size as that of a through-hole is unlikely to be clogged inside of the through-hole and the durability of the film having the through-hole is improved.

Dirt having a larger diameter than the diameter of the outermost surface of a through-hole cannot enter the inside of the through-hole, and dirt having a smaller diameter than the diameter thereof can pass through the through-hole since the diameter of the inside of the through-hole is increased.

In consideration of the opposite shape in which the inside of a through-hole has a smaller diameter than the diameter of the surface thereof, dirt having passed through the outermost surface of the through-hole is clogged at a portion inside having a smaller diameter, and thus the dirt is likely to remain therein. Compared to this, it was found that the shape in which the inside has a maximum diameter functions advantageously from the viewpoint of suppressing clogging of dirt.

Further, in a case of a so-called tapered shape, any one surface of a film has a maximum diameter and the inner diameter decreases substantially monotonically, in a case where dirt satisfying the relationship of "the maximum diameter>the size of dirt>the diameter of the other surface" enters from a side having a maximum diameter, the shape of the inside functions as a slope, and thus the possibility of the dirt being clogged therein becomes increased.

Figure 19:
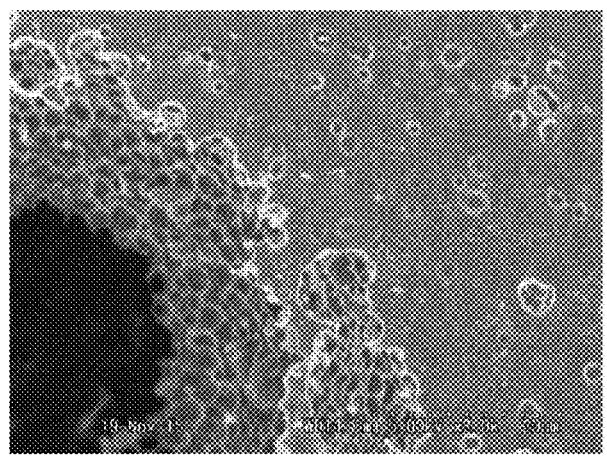
FIG. 19 is an image obtained by imaging an inner wall surface of a through-hole.

From the viewpoint of further increasing the friction at the time of the sound passing through the through-holes, it is preferable that the inner wall surface of a through-hole is roughened (see FIG. 19). Specifically, the surface roughness Ra of the inner wall surface of a through-hole is preferably 0.1 µm or greater, more preferably in a range of 0.1 µm to 10.0 µm, still more preferably in a range of 0.15 µm to 1.0 µm, and particularly preferably in a range of 0.2 µm to 1.0 µm.

Here, the surface roughness Ra can be obtained by measuring the inside of a through-hole using an atomic force microscope (AFM). As the AFM, for example, SPA300 (manufactured by High-Tech Science Corporation) can be used. The measurement can be performed using OMCL-AC200TS as a cantilever in a dynamic force mode (DFM).

Since the surface roughness of the inner wall surface of a through-hole is approximately several microns, it is preferable to use an AFM from the viewpoints of the measurement range of several microns and the precision.

Further, FIG. 19 is an SEM photo obtained by imaging the sample of Example 1 described below.

Further, by regarding each projection of a depression in a through-hole from the SEM image showing the inside of a through-hole as a particle, the average particle diameter of projections can be calculated.

Specifically, an SEM image captured at a magnification of 2000 times is taken in Image J, binarized into white and black so that the projections are shown as white to acquire the area of each projection using Analyze Particles. By assuming circles with the same areas as the areas of the projections to acquire the circle equivalent diameter of each projection, an average value of the obtained values is calculated as an average particle diameter. The imaging range of this SEM image is approximately 100 µm×100 µm.

For example, the particle diameters of Example 1 described below are distributed approximately in a range of 1 to 3 µm, and the average is approximately 2 µm. The average particle diameter of projections is preferably in a range of 0.1 µm to 10.0 µm and more preferably in a range of 0.15 µm to 5.0 µm.

In the simulation corresponding to the present invention is formed into a model and calculated using an acoustic module of "COMSOL ver. 5.1" (manufactured by COMSOL Inc.) serving as analysis software of a finite element method.

The speed inside a through-hole is calculated after calculation through the simulation desired to correspond to Example 1 described below. The speed inside a through-hole is $5\times10^{-2}$ (m/s) in a case where the sound pressure is 1 [Pa] (=94 dB) and the speed therein is $1\times10^{-3}$ (m/s) in a case where the sound pressure is 60 dB.

At the time of absorption of a sound at a frequency of 2500 Hz, the local moving speed of a medium that mediates sound waves is known based on the local speed. Based on this, the moving distance is acquired by assuming that particles of through-holes vibrate in the penetration direction. Since the sound vibrates, the distance amplitude thereof becomes the distance at which the sound can move within half a circle. At a frequency of 2500 Hz, since one cycle is $\frac{1}{2500}$ seconds, half the time can be the same direction. The maximum movement distance (acoustic movement distance) at the sound wave half cycle acquired from the local speed is 10 µm at 94 dB and 0.2 µm at 60 dB. Accordingly, since the friction increases in a case where the inner wall surface has the surface roughness to the extent of this acoustic movement distance, the above-described range of the surface roughness Ra and the above-described range of the average particle diameter of the projections are preferable.

Here, in a case where the average opening diameter of the through-holes is 0.1 µm or greater and less than 100 µm and in a case where the average opening diameter is set as phi (µm) and the thickness of the film is set as t (µm), it is preferable that the average opening ratio rho of the through-holes falls in a range where a center is $\text{rho\_center}=(2+0.25\times t)\times\text{phi}^{-1.6}$, a lower limit is $\text{rho\_center}-(0.085\times(\text{phi}/20)^{-2})$, and an upper limit is $\text{rho\_center}+(0.35\times(\text{phi}/20)^{-2})$. Further, the average opening ratio rho is more preferably in a range of $(\text{rho\_center}-0.24\times(\text{phi}/10)^{-2})$ to $(\text{rho\_center}+0.57\times(\text{phi}/10)^{-2})$ and still more preferably in a range of $(\text{rho\_center}-0.185\times(\text{phi}/10)^{-2})$ to $(\text{rho\_center}+0.34\times(\text{phi}/10)^{-2})$. This point will be described in detail based on the following simulation.

Further, in a case where the average opening diameter of the through-holes is in a range of 100 μm to 250 μm, the average opening ratio rho of the through-holes is preferably in a range of 0.005 to 0.010. This point will be described in detail based on the following examples.

Here, from the viewpoint of the visibility of through-holes, the average opening diameter of a plurality of through-holes formed in the film is preferably 100 μm or less, more preferably 50 μm or less, and still more preferably 20 μm or less.

In a case where the film having fine through-holes used for the soundproofing structure of the present invention is disposed on a surface of a wall or a place which can be seen, the designability is degraded because the through-holes are seen and the appearance of holes makes people uneasy, and thus it is desirable that through-holes are not seen. It is a problem to see through-holes in various places such as a soundproofing wall inside a room, an articulation wall, a soundproofing panel, an articulation panel, and an exterior portion of a machine.

First, the visibility of one through-hole will be examined.

Hereinafter, a case where the resolving power of the human eye is a visual acuity 1 will be described.

Figure 63:
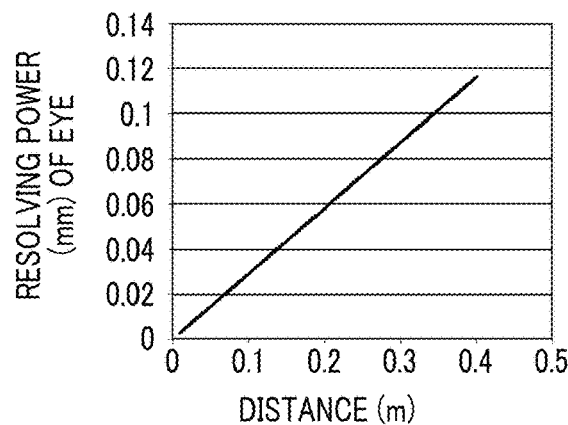
FIG. 63 is a graph showing the relationship between the distance and the resolving power of the eye.

The definition of the visual acuity 1 is that an object is seen by resolving 1 arc minute. This indicates that an opening diameter of 87 μm can be resolved at a distance of 30 cm. The relationship between the distance and the resolving power in a case of the visual acuity 1 is shown in FIG. 63.

Whether the through-holes are seen is strongly related to the above-described visual acuity. As in a case of the visual acuity test performed based on the recognition of a gap portion of the Landolt ring, whether a gap between two points and/or two lines is seen depends on the resolving power. In other words, it is difficult to see a through-hole having an opening diameter less than the resolving power of the eye because the distance between edges of a through-hole cannot be resolved by the eye. Meanwhile, the shape of a through-hole having an opening diameter greater than or equal to the resolving power of the eye can be seen.

In a case of the visual acuity 1, a through-hole having an opening diameter of 100 μm can be resolved from a distance of 35 cm, but a through-hole having an opening diameter of 50 μm and a through-hole having an opening diameter of 20 μm cannot be resolved by the eye unless approaching a distance of 18 cm and a distance of 7 cm respectively. Accordingly, in a case of a through-hole having an opening diameter of 100 μm, the through-hole can be seen and made people feel uneasy. However, by using a through-hole having an opening diameter of 20 μm, the through-hole cannot be seen unless approaching a ⅕ distance which is extremely close. Therefore, it is advantageous that the opening diameter becomes smaller from the viewpoint of the concealment of through-holes. The distance between a soundproofing structure and an observer is usually several tens of centimeters in a case where the soundproofing structure is used on a wall or in a car, the boundary of the opening diameter in this case is approximately 100 μm.

Next, light scattering occurring due to through-holes will be described. Since the wavelength of visible light is approximately in a range of 400 nm to 800 nm (0.4 μm to 0.8 μm), the opening diameter of several tens of micrometers described in the present invention is sufficiently larger than the optical wavelength. In this case, the scattering cross-sectional area (the amount indicating that how strongly an object is scattered, the unit is the area) in visible light substantially coincides with the geometric cross-sectional area, that is, the cross-sectional area of a through-hole in this case. In other words, the size of scattering of visible light is proportional to the square of the radius of a through-hole (half of the circle equivalent diameter). Accordingly, as the size of the through-hole becomes larger, the intensity of light scattering is increased by the square of the radius of the through-hole. Since the visibility of a single through-hole is proportional to the amount of light to be scattered, the visibility is increased in a case where each through-hole is large even in a case where the average opening ratio is the same.

Finally, a difference between a periodic arrangement and a random arrangement in which the arrangement of through-holes does not have periodicity will be examined. In the periodic arrangement, a light diffraction phenomenon occurs according to the cycle. In a case where white light to be transmitted, white light to be reflected, or light with a wide spectrum comes into contact with the arrangement, the light is seen to have different colors so that the pattern becomes conspicuous for various reasons, for example, the light is diffracted and is seen to have different colors like a rainbow, the light is strongly reflected at a specific angle, or the like. In Example 37 described below, a plurality of through-holes are periodically formed with respect to nickel, but the spreading of colors due to diffracted light can be seen in a case where this nickel film is seen through using fluorescent light.

Meanwhile, the above-described diffraction phenomenon does not occur in a case where the through-holes are randomly arranged. It was confirmed that color change due to diffracted light is not seen in all aluminum films, prepared in the following example, in which fine through-holes have been formed, even in a case where the films are seen through using fluorescent light. Further, it was confirmed that the appearance has the same metallic gloss as typical aluminum foil even in a case of viewing the film by preparing the through-holes in a reflection arrangement and diffraction reflection does not occur.

Figure 10:
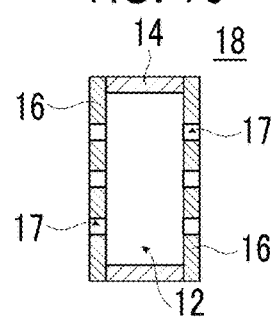
FIG. 10 is a cross-sectional view schematically illustrating another example of a soundproofing cell.
Figure 11:
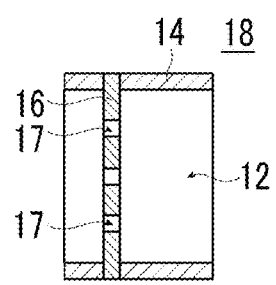
FIG. 11 is a cross-sectional view schematically illustrating still another example of a soundproofing cell.

In the example illustrated in FIG. 3, the configuration in which the film 16 is fixed to one end surface of the frame hole portion 12 is employed. However, the present invention is not limited thereto, the configuration in which the film 16 is fixed to both end surfaces of the frame hole portion 12 as illustrated in FIG. 10 may be employed. Alternatively, as illustrated in FIG. 11, the configuration in which the film 16 is fixed inside the frame hole portion 12 so as to block the frame hole portion 12 may be employed. Further, in a case where the configuration in which the film 16 is fixed inside the frame hole portion 12 is employed, it is preferable that the distance from the film 16 to one end of the frame 14 is different from the distance from the film 16 to the other end of the frame 14, in other words, the arrangement position is provided at a position deviated from the central position inside the frame in the direction perpendicular to the surface of the film 16.

Figure 12:
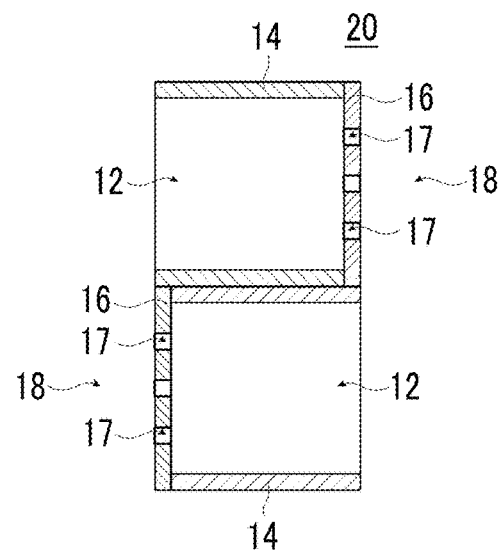
FIG. 12 is a cross-sectional view schematically illustrating still another example of a soundproofing structure.
Figure 13:
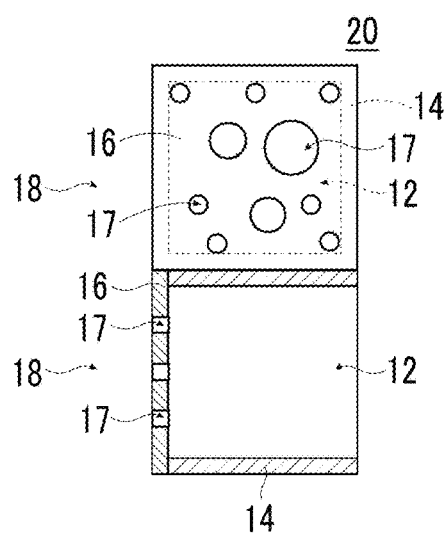
FIG. 13 is a cross-sectional view schematically illustrating even still another example of a soundproofing structure.

In the example illustrated in FIG. 8, the configuration in which each surface on a side where the film 16 of each soundproofing cell 18 is fixed is arranged toward the same direction such that the film 16 of each soundproofing cell 18 is arranged on the same plane is employed. However, the present invention is not limited thereto as illustrated in FIG. 12, and the films 16 of two soundproofing cells 18 may be fixed to the surfaces of the frames 14 on sides opposite to each other. In other words, the soundproofing cells 18 may be arranged such that the surfaces to which the films 16 are fixed are provided on sides opposite to each other. Alternatively, as illustrated in FIG. 13, the films 16 of two soundproofing cells 18 may be fixed to surfaces of the frames 14 which are deviated by 90°. In other words, the soundproofing cells 18 may be arranged such that the surfaces to which the films 16 are fixed are deviated by 90°.

Since the sound absorption is considered to occur due to the friction generated when sound waves pass through fine through-holes using the soundproofing structure of the present invention, sound absorption can occur by appropriately applying each soundproofing cell 18 in addition to using the configuration in which each film 16 of a plurality of soundproofing cells 18 is arranged on the same plane.

Further, although the thickness of the film is not limited, it is considered that the sound absorption performance is further improved due to an increase in friction energy at the time of the sound passing through the through-holes as the thickness of the film is larger. Further, in a case where the thickness of the film is extremely thin, since the plate is difficult to handle, it is preferable that the film is thick enough to be held. In addition, from the viewpoints of miniaturization, ventilation properties, reduction in weight, and the light transmittance, it is preferable that the film is thin. In a case where etching or the like is used as the method of forming through-holes, since it takes time to prepare the film as the thickness thereof is increased, it is desirable that the film is thin from the viewpoint of productivity.

From the viewpoints of the sound absorption performance, the miniaturization, the ventilation properties, and the light transmittance, the thickness of the film is preferably in a range of 5 μm to 500 μm, more preferably in a range of 10 μm to 300 μm, and particularly preferably in a range of 20 μm to 100 μm.

A method of fixing the film 16 to the frame 14 is not particularly limited, and examples thereof include a method of fixing the film using an adhesive and a method of fixing the film using a physical fixture.

According to the method of fixing the film using an adhesive, the surface (end surface) surrounding the frame hole portion 12 of the frame 14 is coated with an adhesive, the film 16 is placed thereon, and the film 16 is fixed to the frame 14 using the adhesive. Examples of the adhesive include an epoxy-based adhesive (ARALDITE (registered trademark) (manufactured by NICHIBAN CO., LTD.), a cyanoacrylate-based adhesive (Aron Alpha (registered trademark) (manufactured by TOAGOSEI CO., LTD.), and an acrylic adhesive.

As the method of fixing the film using a physical fixture, a method of interposing the film 16 disposed so as to cover the frame hole portion 12 of the frame 14 between the frame 14 and a fixing member such as a rod and fixing the fixing member to the frame 14 using a fixture such as a thread or a screw can be exemplified.

Further, double-sided tape (for example, tape manufactured by Nitto Denko Corporation or tape manufactured by 3M Company) is cut according to the size of the frame hole portion of the frame, and then the film 16 can be fixed thereonto.

The material of the film is not limited, and examples of the material which can be used include various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride, polyethylene, polyvinyl chloride, polymethylpentene, a cycloolefin polymer (COP), polycarbonate, ZEONOA, polyethylene naphthalate (PEN), polypropylene, and polyimide. Further, other examples thereof include glass materials such as thin film glass; and fiber reinforced plastic materials such as carbon fiber reinforced plastics (CFRP) and glass fiber reinforced plastics (GFRP).

From the viewpoint that the Young's modulus is high, vibration is unlikely to occur even in case where the thickness is small, and the effect of sound absorption using the friction at fine through-holes is easily obtained, it is preferable to use metallic materials. Among these, from the viewpoints of being lightweight, easily forming fine through-holes through etching or the like, availability, and the cost, it is preferable to use aluminum.

In a case where a metallic material is used, from the viewpoint of suppressing rust, metal plating may be applied to the surface.

Further, by applying metal plating to at least the inner surface of a through-hole, the diameter of the through-hole may be adjusted to be in a range smaller than the average opening diameter.

By using a material, which has a conductivity and is not charged, such as a metallic material as the material of the film, it is possible to suppress degradation of sound absorption performance due to clogging of dust, dirt, and the like in the through-holes of the film without attraction of fine dust, dirt, and the like to the film due to static electricity.

Further, the heat resistance can be increased by using a metallic material as the material of the film. In addition, ozone resistance can be increased.

By using a metallic material as the material of the film, the metallic material functions as a heat insulating material that prevents heat transfer due to radiant heat because the metallic material has a large reflectivity with respect to radiant heat due to far infrared rays. At this time, a plurality of through-holes are formed in the film, but the opening diameter of the through-holes is small. Therefore, the film functions as a reflective film.

It is known that a structure in which a plurality of fine through-holes are formed in a metal functions as a high pass filter of a frequency. For example, a window with metal mesh of a microwave oven has a property of blocking microwaves used for a microwave oven while passing high-frequency visible light therethrough. In a case where the hole diameter of a through-hole is set as $\Phi$ and the wavelength of an electromagnetic wave is set as $\lambda$, the window functions as a filter that does not allow a long wavelength component satisfying a relationship of "$\Phi<\lambda$" to pass through and allows a short wavelength component satisfying a relationship of "$\Phi>\lambda$" to pass through.

Here, the radiant heat is described. The radiant heat is a heat transfer mechanism in which far infrared rays are emitted from an object according to an object temperature and the emitted rays are transmitted to another object. According to the Wien's radiation law, it is known that the radiant heat in an environment at room temperature is distributed about $\lambda=10$ μm and contributes to effectively transferring heat through radiation up to a wavelength (up to 30 μm) three times the wavelength on the long wavelength side. In consideration of the relationship between the hole diameter $\Phi$ and the wavelength $\lambda$ of the high pass filter, a component satisfying a relationship of "$\lambda>20$ μm" is strongly shielded in a case of $\Phi=20$ μm. Further, in a case of $\Phi=50$ μm, the radiant heat propagates after passing through the through-holes because the relationship of "$\Phi>\lambda$" is satisfied. In other words, it is found that the propagation performance of radiant heat greatly varies depending on a difference in hole diameter $\Phi$ since the hole diameter $\Phi$ is several tens of micrometers, and the structure functions well as a radiant heat cut filter as the hole diameter Φ, that is, the average opening diameter becomes smaller. Accordingly, from the viewpoint of functioning as a heat insulating material that prevents heat transfer due to radiant heat, the average opening diameter of the through-holes to be formed in the film is preferably 20 μm or less.

In a case where the entire soundproofing structure is required to have transparency, a resin material or a glass material that is capable of making the structure transparent can be used. For example, among resin materials, since a PET film has a relatively high Young's modulus, is available, and has high transparency, a suitable film can be obtained by forming through-holes using this material.

Further, the durability of the film can be improved by appropriately performing a surface treatment (such as a plating treatment, an oxide film treatment, or surface coating (fluorine or ceramic)) on the film according to the material thereof. For example, in a case where aluminum is used as the material of the film, an oxide film can be formed on the surface of the film by performing an alumite treatment (an anodic oxidation treatment) or a boehmite treatment thereon. The corrosion resistance, the abrasion resistance, and the scratch resistance can be improved by forming an oxide film on the surface thereof. Further, the color resulting from optical interference can be adjusted by adjusting the treatment time to adjust the thickness of the oxide film.

Further, the film can be colored, decorated, and designed. As methods of performing these, methods may be appropriately selected depending on the material of the film or the state of the surface treatment. For example, printing or the like according to an ink jet method can be used. Further, in a case where aluminum is used as the material of the film, coloring with high durability can be performed by carrying out a color alumite treatment. The color alumite treatment is a treatment of performing an alumite treatment on the surface, permeating a dye thereinto, and performing a sealing treatment on the surface. In this manner, a film with high designability in which the presence of metallic gloss or the color can be designed can be obtained. Further, by performing the alumite treatment after the through-holes are formed, an anodic oxide film is formed only on the aluminum portion, a dye covers the through-holes so that decoration can be performed without degrading the sound absorption characteristics.

The film can be colored and designed in various manners by matching the alumite treatment.

Further, a configuration in which the frame 14 and the film 16 are formed of the same material and integrally formed may be employed.

The configuration in which the frame 14 and the film 16 are integrally formed can be prepared by performing a simple step such as compression forming, injection forming, imprinting, scraping processing, or a processing method using a three-dimensional shape forming (3D) printer.

<Aluminum Substrate>

An aluminum substrate used as a film is not particularly limited, and known aluminum substrates with alloy No. 1085, 1N30, 3003, and the like described in JIS Standard H 4000 can be used. Further, an aluminum substrate is an alloy plate containing aluminum as a main component and containing a trace amount of foreign elements.

The thickness of the aluminum substrate is not particularly limited, but is preferably in a range of 5 μm to 1000 μm, more preferably in a range of 5 μm to 200 μm, and particularly preferably in a range of 10 μm to 100 μm.

<Method of Producing Film Having Plurality of Through-Holes>

Next, an example of using an aluminum substrate will be described as a method of producing the film having a plurality of through-holes.

The method of producing a film using an aluminum substrate includes a film forming step of forming a film containing aluminum hydroxide as a main component on the surface of the aluminum substrate; a through-hole forming step of performing a through-hole forming treatment after the film forming step to form through-holes; and a film removing step of removing the aluminum hydroxide film after the through-hole forming step.

In a case where the method includes the film forming step, the through-hole forming step, and the film removing step, through-holes having an average opening diameter of 0.1 μm to 250 μm can be suitably formed.

Next, after description of each step according to the method of producing the film having a plurality of through-holes with reference to FIGS. 14A to 14E, each step will be described in detail.

FIGS. 14A to 14E are cross-sectional views illustrating an example of a suitable embodiment for the method of producing the film using an aluminum substrate.

Figure 14A:
FIG. 14A is a cross-sectional view for describing a method of producing a film.
Figure 14B:
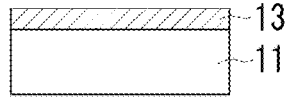
FIG. 14B is a cross-sectional view for describing a method of producing the film.
Figure 14C:
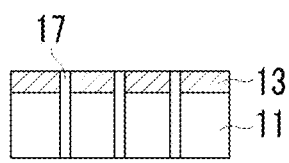
FIG. 14C is a cross-sectional view for describing a method of producing the film.
Figure 14D:
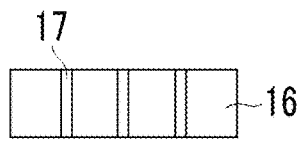
FIG. 14D is a cross-sectional view for describing a method of producing the film.

As illustrated in FIGS. 14A to 14E, the method of producing the film is a production method including a film forming step of performing a film forming treatment on one principal surface of an aluminum substrate 11 to form an aluminum hydroxide film 13 (FIGS. 14A and 14B); a through-hole forming step of performing an electrodissolution treatment after the film forming step to form through-holes 17 and forming through-holes in the aluminum substrate 11 and the aluminum hydroxide film 13 (FIGS. 14B and 14C), and a film removing step of removing an aluminum hydroxide film 13 after the through-hole forming step to prepare a film 16 having the through-holes 17 (FIGS. 14C and 14D).

Figure 14E:
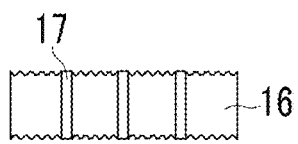
FIG. 14E is a cross-sectional view for describing a method of producing the film.

In addition, it is preferable that the method of producing the film includes a roughening treatment step of performing an electrochemical roughening treatment on the film 16 having the through-holes 17 after the film removing step so that the surface of the film 16 is roughened (FIGS. 14D and 14E).

Since small holes are likely to be formed in an aluminum hydroxide film, through-holes having an average opening diameter of 0.1 μm to 250 μm can be formed by performing an electrodissolution treatment in the through-hole forming step to form through-holes after the film forming step of forming an aluminum hydroxide film.

[Film Forming Step]

In the present invention, the film forming step included in the method of producing a plate-like member is a step of performing a film forming treatment on the surface of the aluminum substrate to form an aluminum hydroxide film.

<<Film Forming Treatment>>

The film forming treatment is not particularly limited, and the same treatment as a known treatment of forming an aluminum hydroxide film of the related art can be performed.

As the film forming treatment, the conditions or devices described in paragraphs [0013] to [0026] of JP2011-201123A can be appropriately employed.

In the present invention, the conditions for the film forming treatment greatly vary depending on the electrolytic solution to be used and cannot be unconditionally determined. However, as the suitable conditions, typically, the concentration of the electrolytic solution is in a range of 1% to 80% by mass, the liquid temperature is in a range of 5° C. to 70° C., the current density is in a range of 0.5 to 60

A/dm$^2$, the voltage is in range of 1 to 100 V, and the electrolysis time is in a range of 1 second to 20 minutes, and the conditions are adjusted to obtain a desired amount of a film.

In the present invention, it is preferable that an electrochemical treatment is performed using nitric acid, hydrochloric acid, sulfuric acid, phosphoric acid, oxalic acid, or mixed acids of two or more of these acids as an electrolytic solution.

In a case where the electrochemical treatment is performed in an electrolytic solution containing nitric acid and hydrochloric acid, direct current or alternating current may be applied to a space between the aluminum substrate and a counter electrode. In a case where direct current is applied to the aluminum substrate, the current density is preferably in a range of 1 to 60 A/dm$^2$ and more preferably in a range of 5 to 50 A/dm$^2$. In a case where the electrochemical treatment is continuously performed, it is preferable that the treatment is performed according to a liquid supply system that supplies power to the aluminum substrate through an electrolytic solution.

In the present invention, the amount of the aluminum hydroxide film to be formed by the film forming treatment is preferably in a range of 0.05 to 50 g/m$^2$ and more preferably in a range of 0.1 to 10 g/m$^2$.

[Through-Hole Forming Step]

The through-hole forming step is a step of performing an electrodissolution treatment after the film forming step to form through-holes.

<<Electrodissolution Treatment>>

The electrodissolution treatment is not particularly limited, and an acidic solution is used as an electrolytic solution using direct current or alternating current. Among the above-described acids, it is preferable to perform the electrochemical treatment using at least one of nitric acid or hydrochloric acid and more preferable to perform the electrochemical treatment using mixed acids of at least one of sulfuric acid, phosphoric acid, or oxalic acid in addition to these acids.

In the present invention, as the acidic solution serving as an electrolytic solution, electrolytic solutions described in each specification of U.S. Pat. Nos. 4,671,859, 4,661,219, 4,618,405, 4,600,482, 4,566,960, 4,566,958, 4,566,959, 4,416,972, 4,374,710, 4,336,113, and 4,184,932 can be used in addition to the above-described acid.

The concentration of the acidic solution is preferably in a range of 0.1% to 2.5% by mass and particularly preferably in a range of 0.2% to 2.0% by mass. Further, the liquid temperature of the acidic solution is preferably in a range of 20° C. to 80° C. and more preferably in a range of 30° C. to 60° C.

An aqueous solution mainly containing the acid can be used by adding at least one of a nitric acid compound having a nitrate ion such as aluminum nitrate, sodium nitrate, or ammonium nitrate, a hydrochloric acid compound having a hydrochloride ion such as aluminum chloride, sodium chloride, or ammonium chloride, or a sulfuric acid compound having a sulfate ion such as aluminum sulfate, sodium sulfate, or ammonium sulfate to an aqueous solution containing an acid with a concentration of 1 to 100 g/L until saturation occurs from an amount of 1 g/L.

Further, metals contained in an aluminum alloy such as iron, copper, manganese, nickel, titanium, magnesium, and silica may be dissolved in an aqueous solution mainly containing the acid. It is preferable that a liquid to which aluminum chloride, aluminum nitrate, or aluminum sulfate has been added is used such that the amount of aluminum ions in an aqueous solution having an acid with a concentration of 0.1% to 2% by mass is in a range of 1 to 100 g/L.

In an electrochemical dissolution treatment, the direct current is mainly used. In a case where the alternating current is used, the AC power supply wave thereof is not particularly limited, and a sine wave, a square wave, a trapezoidal wave, or a triangular wave is used. Among these, a square wave or a trapezoidal wave is preferable and a trapezoidal wave is particularly preferable.

(Nitric Acid Electrolysis)

In the present invention, through-holes having an average opening diameter of 0.1 µm to 250 µm can be easily formed by performing an electrochemical dissolution treatment (hereinafter, simply referred to as a "nitric acid dissolution treatment") using an electrolytic solution mainly containing nitric acid.

Here, from the viewpoint of easily controlling the dissolution point for forming through-holes, it is preferable that the nitric acid dissolution treatment is an electrolytic treatment performed under conditions of an average current density of 5 A/dm$^2$ or greater and an electric quantity of 50 C/dm$^2$ or greater using the direct current. Further, the average current density is preferably 100 A/dm$^2$ or less and the electric quantity is preferably 10000 C/dm$^2$ or less.

The concentration and the temperature of the electrolytic solution in the nitric acid electrolysis are not particularly limited. For example, the electrolysis can be performed in a temperature range of 30° C. to 60° C. using a nitric acid electrolytic solution having a nitric acid concentration of 15% to 35% by mass, which is a high concentration, and the electrolysis can be performed at 80° C. or higher, which is a high temperature, using a nitric acid electrolytic solution having a nitric acid concentration of 0.7% to 2% by mass.

Further, the electrolysis can be performed using an electrolytic solution obtained by mixing at least one of sulfuric acid, oxalic acid, or phosphoric acid having a concentration of 0.1% to 50% by mass with the above-described nitric acid electrolytic solution.

(Hydrochloric Acid Electrolysis)

In the present invention, through-holes having an average opening diameter of 1 µm to 250 µm can be easily formed by performing an electrochemical dissolution treatment (hereinafter, simply referred to as a "hydrochloric acid dissolution treatment") using an electrolytic solution mainly containing nitric acid.

Here, from the viewpoint of easily controlling the dissolution point for forming through-holes, it is preferable that the hydrochloric acid dissolution treatment is an electrolytic treatment performed under conditions of an average current density of 5 Å/dm$^2$ or greater and an electric quantity of 50 C/dm$^2$ or greater using the direct current. Further, the average current density is preferably 100 A/dm$^2$ or less and the electric quantity is preferably 10000 C/dm$^2$ or less.

The concentration and the temperature of the electrolytic solution in the hydrochloric acid electrolysis are not particularly limited. For example, the electrolysis can be performed in a temperature range of 30° C. to 60° C. using a hydrochloric acid electrolytic solution having a hydrochloric acid concentration of 10% to 35% by mass, which is a high concentration, and the electrolysis can be performed at 80° C. or higher, which is a high temperature, using a hydrochloric acid electrolytic solution having a hydrochloric acid concentration of 0.7% to 2% by mass.

Further, the electrolysis can be performed using an electrolytic solution obtained by mixing at least one of sulfuric acid, oxalic acid, or phosphoric acid having a concentration of 0.1% to 50% by mass with the above-described hydrochloric acid electrolytic solution.

[Film Removing Step]

The film removing step is a step of removing an aluminum hydroxide film by performing a chemical dissolution treatment.

In the film removing step, an aluminum hydroxide film can be removed by performing, for example, an acid etching treatment or an alkali etching treatment described below.

<<Acid Etching Treatment>>

The dissolution treatment is a treatment of dissolving an aluminum hydroxide film using a solution (hereinafter, referred to as an "aluminum hydroxide dissolving solution") that preferentially dissolves aluminum hydroxide rather than aluminum.

Here, as the aluminum hydroxide dissolving solution, an aqueous solution containing at least one selected from the group consisting of nitric acid, hydrochloric acid, sulfuric acid, phosphoric acid, oxalic acid, a chromium compound, a zirconium compound, a titanium compound, a lithium salt, a cerium salt, a magnesium salt, sodium silicofluoride, zinc fluoride, a manganese compound, a molybdenum compound, a magnesium compound, a barium compound, and a halogen simple substance is preferable.

Specifically, examples of the chromium compound include chromium (III) oxide and chromic anhydride (VI).

Examples of the zirconium compound include zirconium ammonium fluoride, zirconium fluoride, and zirconium chloride.

Examples of the titanium compound include titanium oxide and titanium sulfide.

Examples of the lithium salt include lithium fluoride and lithium chloride.

Examples of the cerium salt include cerium fluoride and cerium chloride.

Examples of magnesium salt include magnesium sulfide.

Examples of the manganese compound include sodium permanganate and calcium permanganate.

Examples of the molybdenum compound include sodium molybdate.

Examples of the magnesium compound include magnesium fluoride-pentahydrate.

Examples of the barium compound include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, and hydrates of these.

Among these barium compounds, barium oxide, barium acetate, or barium carbonate is preferable and barium oxide is particularly preferable.

Examples of the halogen simple substance include chlorine, fluorine, and bromine.

Among these, it is preferable that the aluminum hydroxide dissolving solution is an aqueous solution containing an acid. Examples of the acid include nitric acid, hydrochloric acid, sulfuric acid, phosphoric acid, and oxalic acid, and a mixture of two or more kinds of acids may be used.

The acid concentration is preferably 0.01 mol/L or greater, more preferably 0.05 mol/L or greater, and still more preferably 0.1 mol/L or greater. The upper limit thereof is not particularly limited, but is preferably 10 mol/L or less and more preferably 5 mol/L or less.

The dissolution treatment is performed by bringing the aluminum substrate on which an aluminum hydroxide film is formed into contact with the above-described dissolving solution. The method of bringing the substrate into contact with the solution is not particularly limited, and examples thereof include an immersion method and a spray method. Among these, an immersion method is preferable.

The immersion method is a treatment of immersing the aluminum substrate on which an aluminum hydroxide film is formed in the above-described dissolving solution. From the viewpoint of performing the treatment without unevenness, it is preferable that the dissolving solution is stirred during this immersion treatment.

The time for the immersion treatment is preferably 10 minutes or longer, more preferably 1 hour or longer, and still more preferably 3 hours or longer or 5 hours or longer.

<<Alkali Etching Treatment>>

The alkali etching treatment is a treatment of dissolving the surface layer by bringing the aluminum hydroxide film into contact with an alkali solution.

Examples of the alkali used in the alkali solution include a caustic alkali and an alkali metal salt. Specific examples of the caustic alkali include sodium hydroxide (caustic soda) and caustic potash. Further, examples of the alkali metal salt include alkali metal silicate such as sodium metasilicate, sodium silicate, potassium metasilicate, and potassium silicate; alkali metal carbonate such as sodium carbonate and potassium carbonate; alkali metal aluminate such as sodium aluminate and potassium aluminate; alkali metal aldonate such as sodium gluconate and potassium gluconate; and alkali metal hydrogen phosphate such as disodium phosphate, dipotassium phosphate, trisodium phosphate, and tripotassium phosphate. Among these, from the viewpoints of a high etching speed and low cost, a solution containing a caustic alkali or a solution containing both of a caustic alkali and alkali metal aluminate is preferable. Further, an aqueous solution containing sodium hydroxide is preferable.

The concentration of the alkali solution is preferably in a range of 0.1% to 50% by mass and more preferably in a range of 0.2% to 10% by mass. In a case where aluminum ions are dissolved in an alkali solution, the concentration of the aluminum ions is preferably in a range of 0.01% to 10% by mass and more preferably in a range of 0.1% to 3% by mass. The temperature of the alkali solution is preferably in a range of 10° C. to 90° C. The treatment time is preferably in a range of 1 to 120 seconds.

Examples of the method of bringing an aluminum hydroxide film into contact with an alkali solution include a method of allowing an aluminum substrate on which an aluminum hydroxide film is formed to pass through a bath to which an alkali solution has been added, a method of immersing an aluminum substrate on which an aluminum hydroxide film is formed in a bath to which an alkali solution has been added, and a method of spraying an alkali solution to the surface (aluminum hydroxide film) of an aluminum substrate on which an aluminum hydroxide film has been formed.

[Roughening Treatment Step]

In the present invention, an optional roughening treatment step which may be included in the method of producing the film is a step of performing an electrochemical roughening treatment (hereinafter, also simply referred to as an "electrolytic roughening treatment") on an aluminum substrate from which an aluminum hydroxide film has been removed to roughen the front surface or the rear surface of the aluminum substrate.

Further, according to the embodiment, the configuration on which the roughening treatment is performed after the through-holes are formed is employed, but the present invention is not limited thereto, and a configuration in which the through-holes are formed after the roughening treatment may be employed.

In the present invention, the surface can be easily roughened by performing an electrochemical roughening treatment (hereinafter, also simply referred to as a "nitric acid electrolysis") using an electrolytic solution mainly containing nitric acid.

Alternatively, the surface can be roughened by performing an electrochemical roughening treatment (hereinafter, also simply referred to as "hydrochloric acid electrolysis") using an electrolytic solution mainly containing hydrochloric acid.

[Metal Coating Step]

In the present invention, from the viewpoint that the average opening diameter of the through-holes formed by the above-described electrodissolution treatment can be adjusted to be in a small range of 0.1 μm to 20 μM, it is preferable that the method of producing the film includes a metal coating step of coating a part or the entirety of the surface of the aluminum substrate having at least the inner walls of the through-holes with a metal other than aluminum.

Here, the expression "coating a part or the entirety of the surface of the aluminum substrate having at least the inner walls of the through-holes with a metal other than aluminum" means that at least the inner walls of the through-holes in the entire surface of the aluminum substrate having the inner walls of the through-holes are coated with a metal, and the surface other than the inner walls may not be coated or a part or the entirety of the surface may be coated after the film removing step described above.

The metal coating step is carried out by performing a substitution treatment and a plating treatment described below on the aluminum substrate having through-holes.

<<Substitution Treatment>>

The substitution treatment is a treatment of performing substitution plating on a part or the entirety of the surface of the aluminum substrate having at least the inner walls of the through-holes with zinc or a zinc alloy.

As a substitution plating liquid, a mixed solution of 120 g/L of sodium hydroxide, 20 g/L of zinc oxide, 2 g/L of iron (III) chloride, 50 g/L of Rochelle salt, and 1 g/L of sodium nitrate may be exemplified.

Further, commercially available Zn or a Zn alloy plating liquid may be used, and examples thereof include SUBSTR Zn-1, Zn-2, Zn-3, Zn-8, Zn-10, Zn-111, Zn-222, and Zn-291 (all manufactured by OKUNO CHEMICAL INDUSTRIES CO., LTD.) can be used.

The time of immersing such a substitution plating liquid in an aluminum substrate is preferably in a range of 15 seconds to 40 seconds and the immersion temperature is preferably in a range of 20° C. to 50° C.

<<Plating Treatment>>

In a case where a zinc film is formed by performing the above-described substitution treatment on the surface of the aluminum substrate for substitution plating of zinc or a zinc alloy, for example, it is preferable to perform a plating treatment of substituting the zinc film with nickel through electroless plating described below and allowing various metals to be deposited through electrolytic plating described below.

(Electroless Plating Treatment)

Commercially available products can be widely used as a nickel plating liquid used for the electroless plating treatment, and an aqueous solution containing 30 g/L of nickel sulfate, 20 g/L of sodium hypophosphite, and 50 g/L of ammonium citrate is exemplified.

Further, examples of the nickel alloy plating liquid include a Ni—P alloy plating liquid containing a phosphorus compound as a reducing agent and a Ni—B plating liquid containing a boron compound as a reducing agent.

The time of immersion in such a nickel plating liquid or a nickel alloy plating liquid is preferably in a range of 15 seconds to 10 minutes and the immersion temperature is preferably in a range of 30° C. to 90° C.

(Electrolytic Plating Treatment)

In an electrolytic plating treatment, as a plating liquid in a case of electrolytic plating Cu, a plating liquid obtained by adding 60 to 110 g/L of Cu sulfate, 160 to 200 g/L of sulfuric acid, and 0.1 to 0.15 mL/L of hydrochloric acid to pure water and adding 1.5 to 5.0 mL/L of TOP LUCINA SF base WR, 0.5 to 2.0 mL/L of TOP LUCINA SF-B, and 3.0 to 10 mL/L of TOP LUCINA SF LEVELER (manufactured by OKUNO CHEMICAL INDUSTRIES CO., LTD.) as additives is exemplified.

The time of immersion in such a copper plating liquid is not particularly limited since the time depends on the thickness of the Cu film. However, in a case where a Cu film having a thickness of 2 μm is formed, it is preferable that the Cu film is immersed at a current density of 2 Å/dm$^2$ for approximately 5 minutes and the immersion temperature is preferably in a range of 20° C. to 30° C.

[Water Washing Treatment]

In the present invention, it is preferable that a water washing treatment is performed after each treatment step described above is completed. For the water washing treatment, pure water, well water, or tap water can be used. A nip device may be used to prevent carry-on of a treatment liquid to the next step.

The soundproofing structure may be produced using a cut sheet-like aluminum substrate or according to a roll-to-roll (hereinafter, also referred to as RtoR) system.

As is well known, RtoR is a production method of drawing a raw material from a roll formed by winding a long raw material, transporting the material in the longitudinal direction, performing various treatments such as a surface treatment, and winding the treated raw material in a roll shape again.

According to the production method of forming through-holes in the aluminum substrate as described above, through-holes having an opening diameter of approximately 20 can be easily and efficiently formed using RtoR.

Further, the method of forming through-holes is not limited to the above-described method, and through-holes may be formed according to a known method depending on the material for forming the film.

For example, in a case where a resin film such as a PET film is used as a film, through-holes can be formed according to a processing method of absorbing energy such as laser processing; or a machining method using physical contact such as needle processing.

Here, in the example illustrated in FIG. 1, the configuration in which one soundproofing structure 20 having three soundproofing cells 18 is disposed in the opening 22a of the cylindrical member 22 is employed. However, the present invention is not limited thereto, and the configuration in which two or more soundproofing structures 20 are disposed in the opening 22a of the cylindrical member 22 may be employed.

Figure 15:
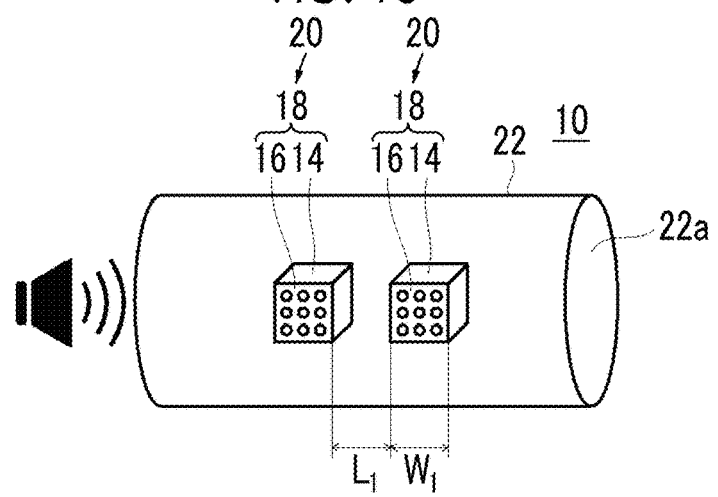
FIG. 15 is a perspective view schematically illustrating another example of a cylindrical structure obtained by using the soundproofing structure of the present invention.

A cylindrical structure 10 illustrated in FIG. 15 has a configuration in which two soundproofing structures 20 having one soundproofing cell 18 are disposed in the opening 22a of the cylindrical member 22. As illustrated in FIG. 15, two soundproofing structures 20 are disposed by being separated from each other in an axis direction (a direction perpendicular to the opening cross section) of the opening 22a.

Further, the arrangement direction of two or more soundproofing structures 20 is not particularly limited, and the soundproofing structures may be arranged in a direction orthogonal to the axis direction of the opening 22a or randomly arranged.

Further, the distance between two soundproofing structures 20 is not limited, but it is preferable that a distance $L_1$ between two soundproofing structures 20 is at least two times the width $W_1$ of the frame 14 as illustrated in FIG. 15.

As described above, in the soundproofing structure of the present invention, the sound field passing through the through-holes is considered to be prepared by allowing the frame to wrap around the sound field and allowing both surface sides of the film to have a pressure difference. In other words, the frame plays a role of disturbing the sound field. In a case where soundproofing cells are connected, the disturbance of the sound field due to the frame portion can affect the first soundproofing cell and the second and the subsequent soundproofing cells.

However, in a case where two soundproofing structures are arranged in a direction perpendicular to the opening cross section, since the sound field is inserted into a gap between two soundproofing structures so that the traveling direction is changed, the influence on the soundproofing cells of the second soundproofing structure is reduced in some cases. Here, by disposing two soundproofing structures 20 in a state of being separated from each other such that the distance $L_1$ therebetween becomes at least two times the width (the width of the frame) $W_1$ of the soundproofing cell, the sound field generated due to diffraction is sufficiently returned to the original state and the disturbance of the sound field caused by the frame portion of the second soundproofing structure becomes the same as in the state in which the soundproofing cells are connected. In this manner, the sound absorption effect resulting from the second soundproofing structure can be sufficiently exhibited.

Further, it is preferable that the soundproofing structure is disposed in an opening of the opening member in a state in which the surface on a side where the film of the soundproofing structure is provided is not in contact with other structures such as an opening member. Further, it is preferable that the opening surface of the frame hole portion of the frame is not in contact with an opening member or other structures.

By setting a state in which the surface on which the film is provided and the opening surface of the frame hole portion are not in contact with other structures such as an opening member and disposing the surface and the opening surface so as not to be blocked by other structures such as an opening member, the sound can appropriately pass through the through-holes of the film and the sound absorption effect can be sufficiently exhibited.

Hereinafter, the physical properties or characteristics of a structural member which can combine with a soundproofing member having the soundproofing structure of the present invention will be described.

[Flame Retardancy]

In a case where a soundproofing member having the soundproofing structure of the present invention is used as a building material or a soundproofing material in equipment, flame retardancy is required.

Accordingly, it is preferable that the film is flame retardant. In a case where a resin is used as the film, for example, LUMIRROR (registered trademark) non-halogen flame retardant type ZV series (manufactured by Toray Industries, Inc.) which is a flame retardant PET film, TEIJIN TETORON (registered trademark) UF (manufactured by Teijin Limited), and/or DIALAMY (registered trademark) (manufactured by Mitsubishi Plastics, Inc.) which is a film retardant polyester film may be used.

Further, it is preferable that the frame is formed of a flame retardant material, and examples of the material include metals such as aluminum, nickel, tungsten, inorganic materials such as ceramics, glass materials, and flame retardant plastics such as flame retardant polycarbonate (PC-MUPY610 (manufactured by Takiron Co., Ltd.)) and/or flame retardant acryl (for example, ACRYLITE (registered trademark) FR1 (manufactured by MITSUBISHI RAYON CO., LTD.)).

Further, preferred examples of the method of fixing the film to the frame include a method of using a flame retardant adhesive (Three Bond 1537 Series (manufactured by ThreeBond Holdings Co., Ltd.)), a bonding method of performing soldering, and a mechanical fixing method of interposing a plate-like member between two frames so as to be fixed therebetween.

[Heat Resistance]

Since there is a concern that the soundproofing characteristics resulting from expansion and contraction of the structural member of the soundproofing structure of the present invention may change due to the environmental temperature change, it is preferable that the material constituting the structural member is heat-resistant and low heat shrinkable.

It is preferable that a TEIJIN TETORON (registered trademark) film SLA (manufactured by Teijin Limited), a TEONEX (registered trademark) (manufactured by Teijin DuPont Films Co., Ltd.) PEN film, and/or a LUMIRROR (registered trademark) off annealing low contraction type (manufactured by Toray Industries, Inc.) film is used as the film. Further, it is also preferable to use a metal film such as an aluminum film typically having a smaller thermal expansion coefficient than that of a plastic material.

Further, it is preferable to use heat-resistant plastics such as a polyimide resin (TECASINT 4111 (manufactured by Ensinger Japan Co., Ltd.)), and/or a glass fiber reinforced resin (TECAPEEK GF30 (manufactured by Ensinger Japan Co., Ltd.)), and/or metals such as aluminum, inorganic materials such as a ceramic, or glass materials as the frame.

Further, it is preferable to use a heat-resistant adhesive (TB3732 (manufactured by ThreeBond Holdings Co., Ltd.)), superheat resistant one-component shrinkable RTV silicone adhesive sealant (manufactured by Momentive Performance Materials Inc.), and/or heat-resistant inorganic adhesive Aron Ceramic (registered trademark) (manufactured by TOAGOSEI CO., LTD.) as the adhesive. In a case where the plate-like member or the frame is coated with any of these adhesives, it is preferable that the amount of expansion and contraction can be reduced by adjusting the thickness thereof to 1 µm or less.

[Weather Resistance and Light Resistance]

In a case where a soundproofing member having the soundproofing structure of the present invention is disposed in outdoors or in a place where light comes in, the weather resistance of the structural member becomes problematic.

Accordingly, it is preferable to use a weather resistant film such as a special polyolefin film (ART PLY (registered trademark) (manufactured by Mitsubishi Plastics, Inc.)), an acrylic resin film (ACRYPRENE (manufactured by MITSUBISHI RAYON CO., LTD.)), and/or a Scotchcal (registered trademark) film (manufactured by 3M Company) as the film.

Further, it is preferable to use plastics having high weather resistance such as polyvinyl chloride or polymethyl (meth) acrylate, metals such as aluminum, inorganic materials such as ceramics, and/or glass materials as the frame member.

Further, it is preferable to use an adhesive having high weather resistance such as an epoxy resin-based adhesive and/or DRY FLEX (manufactured by Repair Care International) as the adhesive.

In regard to the moisture resistance, it is preferable to select a film, a frame, and an adhesive having a high moisture resistance, as appropriate. Further, related to water-absorbing properties and chemical resistance, it is preferable to select a film, a frame, and an adhesive as appropriate.

[Dirt]

In the use for a long period of time, there is a possibility that dirt adheres to the surface of the film and affects the soundproofing characteristics of the soundproofing structure of the present invention. Therefore, it is preferable to prevent adhesion of dirt or remove adhered dirt.

As a method of preventing dirt, it is preferable to use a film formed of a material to which dirt is unlikely to adhere. For example, by using a conductive film (FLECLEAR (registered trademark) (manufactured by TDK Corporation)) and/or NCF (manufactured by NAGAOKA SANGYOU CO., LTD.), the film is not charged, and thus adhesion of dirt due to the plate-like member being charged can be prevented. In addition, adhesion of dirt can be suppressed even by using a fluorine resin film (DINOC film (registered trademark) (manufactured by 3M Company)) and/or a hydrophilic film (Miraclean (manufactured by Lifeguard)), RIVEX (manufactured by RIKEN TECHNOS CORPORATION), and/or SH2CLHF (manufactured by 3M Company). Further, contamination of the film can be prevented by using a photocatalyst film (Laclean (manufactured by KIMOTO CO., LTD.)). The same effects can be obtained by applying a spray having conductivity, hydrophilicity, and/or photocatalytic properties and/or a spray having a fluorine compound to the film.

In addition to the use of the above-described special films, stain can be prevented by proving a cover on the film. As the cover, a thin film material (Saran Wrap (registered trademark)), a mesh having a network with a size that does not allow dirt to pass through, non-woven fabric, urethane, aerogel, or a porous film can be used.

Figure 45:
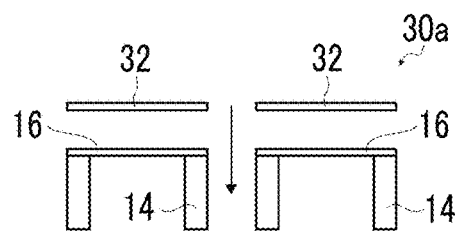
FIG. 45 is a schematic cross-sectional view illustrating an example of a soundproofing member having the soundproofing structure of the present invention.
Figure 46:
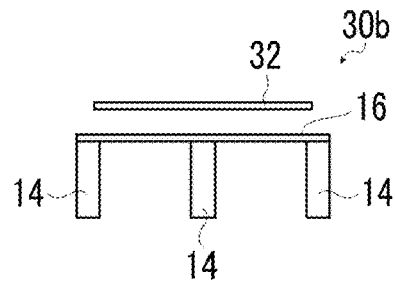
FIG. 46 is a schematic cross-sectional view illustrating another example of a soundproofing member having the soundproofing structure of the present invention.

For example, it is possible to prevent wind or dirt from being directly applied to the film 16 by disposing a cover 32 on the film 16 so as to cover the plate-like material in a state in which the film 16 and the cover 32 are separated by a predetermined distance as in soundproofing members 30a and 30b illustrated in FIGS. 45 and 46. Further, it is preferable that at least a part of the cover is fixed to the frame. Further, a cover having a gap such as a mesh with a large network may be disposed by being directly attached to the film using spray glue or the like. This makes it difficult for the film to break.

As a method of removing adhered dirt, dirt can be removed by emitting a sound of a resonance frequency to the film and strongly vibrating the film. Further, the same effect can be obtained in a case of using a blower or wiping.

[Wind Pressure]

In a case where strong wind is applied to the film, since the film is in a state of being pressured, the resonance frequency may be changed. Therefore, the influence of wind can be suppressed by covering the film with non-woven fabric, urethane, and/or a film. Further, similar to the case of dirt, it is preferable that the cover 32 is provided on the film 16 so that wind is not directly applied to the film 16 as in the soundproofing members 30a and 30b respectively illustrated in FIGS. 45 and 46.

Figure 47:
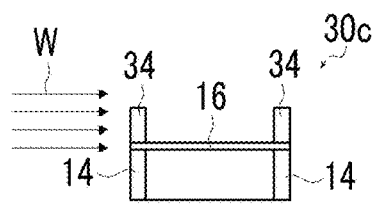
FIG. 47 is a schematic cross-sectional view illustrating still another example of a soundproofing member having the soundproofing structure of the present invention.

Further, as in a case of a soundproofing member 30c illustrated in FIG. 47, it is preferable that a wind prevention frame 34 used for preventing wind W from being directly applied to the film 16 is provided on the upper portion of the film 16 in the structure in which the film is inclined with respect to sound waves.

Figure 48:
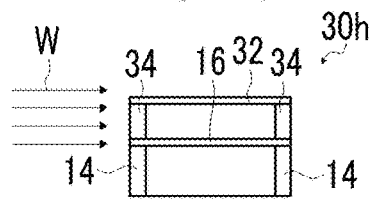
FIG. 48 is a schematic cross-sectional view illustrating even still another example of a soundproofing member having the soundproofing structure of the present invention.

Further, as the most desirable wind shield form, the cover 32 is provided on the film 16 as illustrated in FIG. 48, and the space between the film 16 and the cover 32 is surrounded by the wind prevention frame 34 so as to block the space. In this manner, the wind applied to the film 16 from the vertical direction and the wind from the parallel direction can be prevented.

Figure 49:
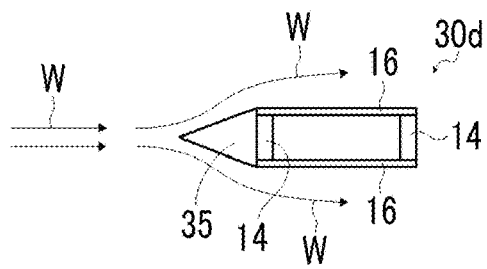
FIG. 49 is a schematic cross-sectional view illustrating even still another example of a soundproofing member having the soundproofing structure of the present invention.

In addition, as in a case of a soundproofing member 30d illustrated in FIG. 49, in order to suppress the influence (the wind pressure applied to the film or wind noise) due to the generation of turbulence caused by blocking the wind W by the side surfaces of the soundproofing member, it is preferable that a rectification mechanism 35 such as a rectifier used for rectifying the wind W applied to the side surfaces of the soundproofing member is provided.

[Combination of Unit Cells]

As described above, in a case where a plurality of soundproofing cells are provided, a configuration in which a plurality of frames 14 are formed by a continuous one frame body or a configuration having a plurality of soundproofing cells as unit cells, each of which includes one frame and one film attached to the frame member may be employed. In other words, the soundproofing member having the soundproofing structure of the present invention is not necessarily formed of one continuous frame body, a soundproofing cell having a frame structure and a film attached to the frame structure may be used as a unit cell, and such a unit cell may be independently used or a plurality of unit cells may be used by being connected to one another.

A method of connecting a plurality of unit cells will be described below, but a plurality of unit cells may be combined by attaching Velcro tape (registered trademark), a magnet, a button, a sucker, and/or an uneven portion to a frame body portion or a plurality of unit cells may be connected using tape or the like.

[Disposition]

Figure 50:
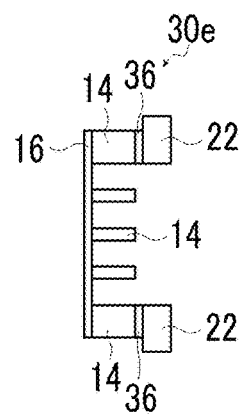
FIG. 50 is a schematic cross-sectional view illustrating an example of a state in which the soundproofing member having the soundproofing structure of the present invention is attached to a wall.
Figure 51:
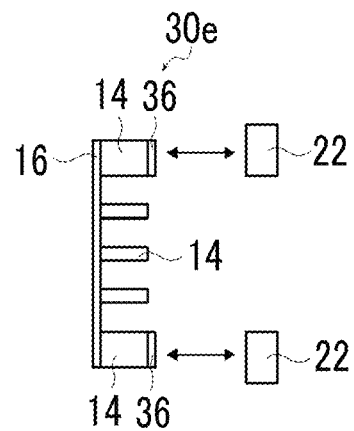
FIG. 51 is a schematic cross-sectional view illustrating an example of a state in which the soundproofing member illustrated in FIG. 50 is detached from the wall.

It is preferable that a desorption mechanism formed of a magnetic material, Velcro tape (registered trademark), a button, or a sucker is attached to the soundproofing member such that the soundproofing member having the soundproofing structure of the present invention is easily attached to a wall or the like and can be detached therefrom. For example, as illustrated in FIG. 50, a desorption mechanism 36 may be attached to the bottom surface of the frame 14 outside the frame member of the soundproofing member (soundproofing cell unit) 30e, the desorption mechanism 36 attached to the soundproofing member 30e is attached to the cylindrical member 22, and the soundproofing member 30e may be disposed in the cylindrical member 22. Alternatively, as illustrated in FIG. 51, the desorption mechanism 36 attached to the soundproofing member 30e may be detached from the cylindrical member 22 so that the soundproofing member 30e is separated from the cylindrical member 22.

Figure 52:
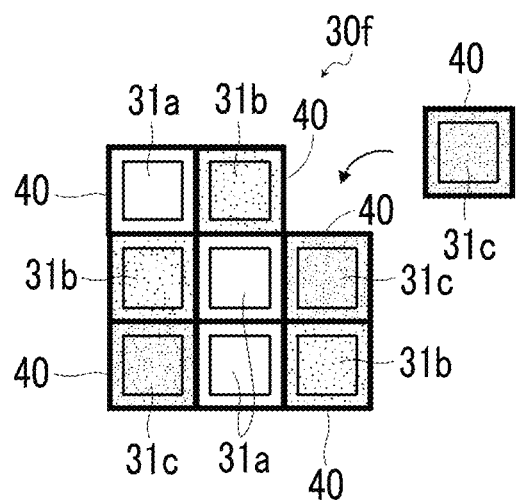
FIG. 52 is a plan view illustrating attachment and detachment of a unit cell according to another example of a soundproofing member having the soundproofing structure of the present invention.

Further, in a case where soundproofing cells with different resonance frequencies, for example, soundproofing cells 31a, 31b, and 31c are combined as illustrated in FIG. 52 to adjust the soundproofing characteristics of the soundproofing member 30f, it is preferable that the desorption mechanism 40 such as a magnetic material, Velcro tape (registered trademark), a button, or a sucker is attached to each of the soundproofing cells 31a, 31b, and 31c so as to easily combine the soundproofing cells 31a, 31b, and 31c.

Figure 53:
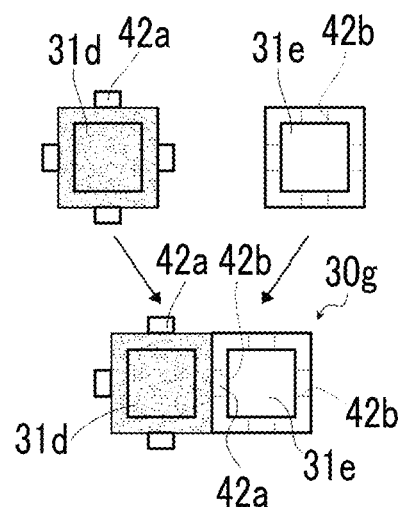
FIG. 53 is a plan view illustrating attachment and detachment of a unit cell according to still another example of a soundproofing member having the soundproofing structure of the present invention.

Further, an uneven portion is provided for a soundproofing cell. For example, as illustrated in FIG. 53, a projection 42a is provided on the soundproofing cell 31d, a depression 42b is provided in the soundproofing cell 31e, and the projection 42a and the depression 42b are engaged with each other to perform desorption between the soundproofing cell 31d and the soundproofing cell 31e. In a case where a plurality of soundproofing cells can be combined, both of a projection and a depression may be provided for one soundproofing cell.

In addition, attachment and detachment of soundproofing cells may be performed by combining the desorption mechanism 40 illustrated in FIG. 52 and the projection 42a and the depression 42b illustrated in FIG. 53.

[Mechanical Strength of Frame]

As the size of the soundproofing member having the soundproofing structure of the present invention is increased, the frame easily vibrates and the function of the frame as a fixed end with respect to the membrane vibration is degraded. Accordingly, it is preferable to increase the height of the frame to increase the frame rigidity. However, the mass of the soundproofing member is increased in a case where the height of the frame is increased, and thus the advantage of the present soundproofing member which is lightweight is decreased.

Figure 54:
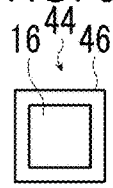
FIG. 54 is a plan view illustrating an example of a soundproofing cell in the soundproofing structure of the present invention.
Figure 55:
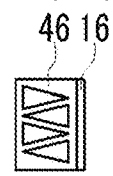
FIG. 55 is a side view of the soundproofing cell illustrated in FIG. 54.
Figure 56:
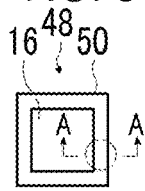
FIG. 56 is a plan view illustrating an example of a soundproofing cell in the soundproofing structure of the present invention.
Figure 57:
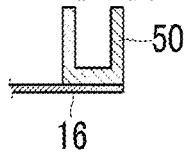
FIG. 57 is a schematic cross-sectional view taken along the arrow A-A of the soundproofing cell illustrated in FIG. 56.

For this reason, it is preferable to form holes or grooves in the frame so that an increase in mass is suppressed while high rigidity thereof remains. For example, both of high rigidity and lightness can be achieved by using a truss structure illustrated in the side view of FIG. 55 for the frame 46 of the soundproofing cell 44 illustrated in FIG. 54 or by using a frame structure illustrated in an arrow view taken along line A-A of the FIG. 56 in FIG. 57 for the frame 50 of the soundproofing cell 48 illustrated in FIG. 56.

Figure 58:
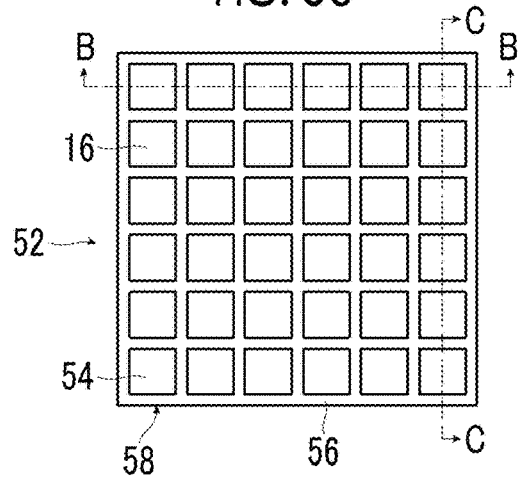
FIG. 58 is a plan view illustrating another example of a soundproofing member having the soundproofing structure of the present invention.
Figure 59:
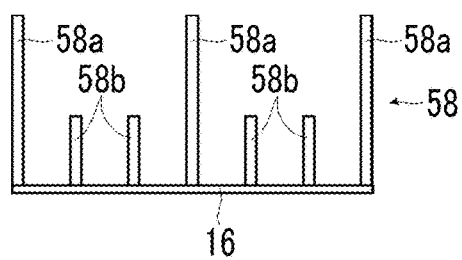
FIG. 59 is a schematic cross-sectional view taken along the arrow B-B of the soundproofing member illustrated in FIG. 58.
Figure 60:
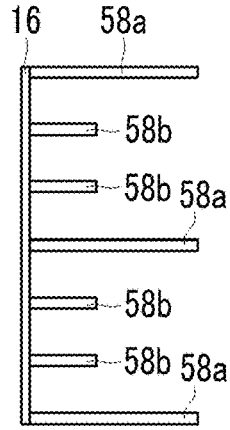
FIG. 60 is a schematic cross-sectional view taken along the arrow C-C of the soundproofing member illustrated in FIG. 58.

Moreover, as illustrated in FIGS. 58 to 60, the height of the frame is changed for each soundproofing cell 54 or the members are combined so that high rigidity can be ensured and the weight can be reduced. As in a case of the soundproofing member 52 having the soundproofing structure of the present invention illustrated in FIG. 58, the thickness of a frame material 58a on both outer sides and the central side of a frame body 58 formed of a plurality of frames 56 of thirty six soundproofing cells 54 is adjusted to be larger than the thickness of the frame material 58b in other portions as illustrated in FIG. 59 which is a schematic cross-sectional view in which the soundproofing member 52 illustrated in FIG. 58 is taken along line B-B. In the example illustrated in FIG. 59, the thickness thereof is increased at least twice the thickness of the frame material 58b in other portions. As illustrated in FIG. 60 which is a schematic cross-sectional view taken along line C-C orthogonal to the B-B line, similarly, the thickness of the frame material 58a on both outer sides and the central side of the frame body 58 is adjusted to be larger than the thickness of the frame material 58b in other portions. In the example illustrated in FIG. 59, the thickness thereof is increased at least twice the thickness of the frame material 58b in other portions.

In this manner, both of the high rigidity and the lightness can be achieved.

Further, in FIGS. 45 to 60, through-holes formed in each film 16 is not illustrated.

Figure 16:
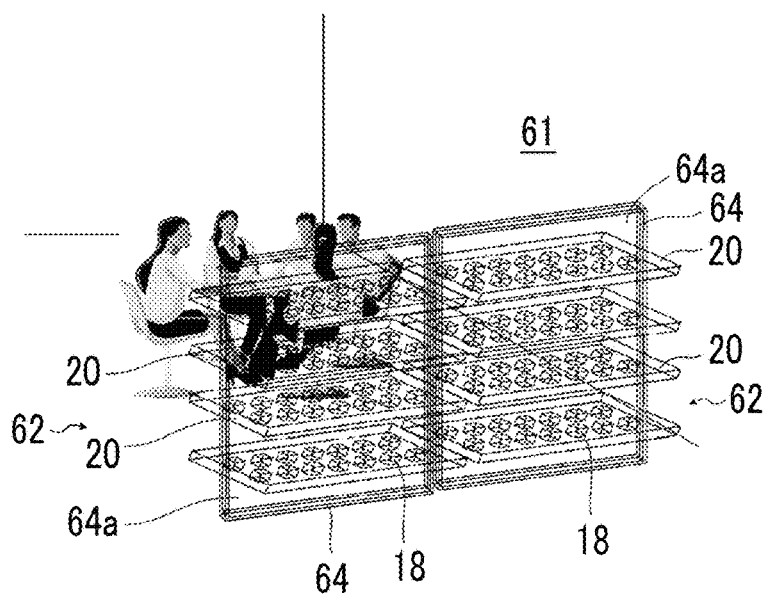
FIG. 16 is a perspective view schematically illustrating an example of a partition member obtained by using the soundproofing structure of the present invention.

Further, the soundproofing structure of the present invention can be used as a partition member having the soundproofing structure of the present invention illustrated in FIG. 16, for example, a soundproofing wall or a soundproofing partition 62 disposed in a space 61 of a room in a house, a building, or a factory. Here, the soundproofing wall or a soundproofing partition may be a fixed wall or a fixed partition fixed to the space 61, for example, the floor or a movable wall or a movable partition which can be moved in the space 61, for example, on the floor.

The soundproofing partition 62 illustrated in FIG. 16 is formed by arranging four soundproofing structures 20 in parallel with one another in an opening 64a of the frame body 64 of a partition which becomes an opening member.

In a case where the soundproofing structure is used as a partition member, the present invention is not limited to the configuration in which soundproofing structures are arranged in an opening of a frame body having an opening.

Figure 17:
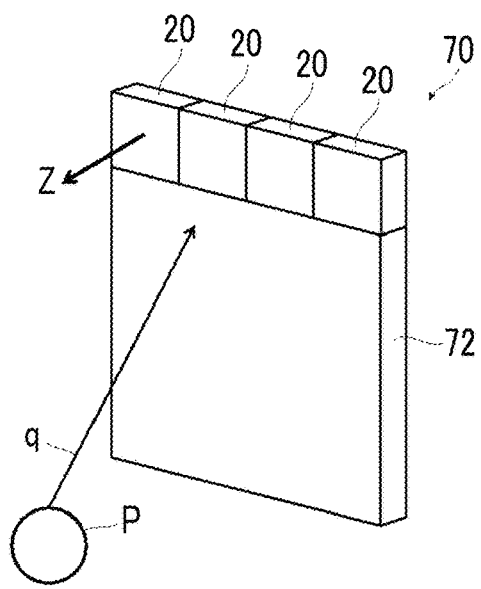
FIG. 17 is a perspective view schematically illustrating another example of a partition member obtained by using the soundproofing structure of the present invention.

For example, a soundproofing partition 70 illustrated in FIG. 17 has a configuration in which four soundproofing structures 20 are arranged in parallel with one another on the upper end side of a partition main body 72. Each soundproofing structure 20 is disposed such that the film surface is substantially flush with the maximum surface of the partition main body 72.

As described above, even in a case where the soundproofing structures 20 are arranged on the upper end side of the partition main body 72, the sound can be absorbed by disposing the soundproofing partition 70 such that the vertical direction z of the film surface of the film 16 of the soundproofing structure 20 is inclined with respect to the direction q of the sound source P.

The soundproofing structure of the present invention can be used as the following soundproofing members in addition to those described above.

Examples of the soundproofing members having the soundproofing structure of the present invention are as follows.

a soundproofing member for a building material: a soundproofing member used as a building material;

a soundproofing member for air conditioning equipment: a soundproofing member which is installed in a ventilation opening or a duct for air conditioning and prevents noise from the outside;

a soundproofing member for an external opening portion: a soundproofing member which is installed on a window in a room and prevents noise from the inside or outside the room;

a soundproofing member for a ceiling: a soundproofing member which is installed on a ceiling in a room and controls the acoustic sound in the room;

a soundproofing member for a floor: a soundproofing member which is installed on a floor and controls the acoustic sound in the room;

a soundproofing member for an internal opening portion: a soundproofing member which is installed on a door or bran in a room and prevents noise from each room;

a soundproofing member for a toilet: a soundproofing member which is installed in a toilet or on a door (inside and outside the room) and prevents noise from the toilet;

a soundproofing member for a balcony: a soundproofing member which is installed in a balcony and prevents noise from the balcony or other balconies adjacent thereto;

an indoor articulating member: a soundproofing member for controlling the acoustic sound in a room;

a simple soundproofing chamber member: a soundproofing member which can be easily assembled and is easy to carry;

a soundproofing chamber member for pets: a soundproofing member which surrounds a pet's room and prevents noise;

amusement facilities: a soundproofing member which is installed in a game center, a sports center, a concert hall, or a movie theater;

a soundproofing member for surrounding a construction site: a soundproofing member which surrounds a construction site and prevents leakage of the noise; and a soundproofing member for a tunnel: a soundproofing member which is installed in a tunnel and prevents leakage of the noise to the inside or outside the tunnel.

Hereinbefore, the soundproofing structure, the cylindrical structure, the window member, and the partition member of the present invention have been described based on various embodiments, but the present invention is not limited to these embodiments, and various improvements or modifications can be made within the range not departing from the gist of the present invention.

EXAMPLES

The present invention will be described in more detail based on the following examples. The materials, the amounts of use, the proportions, the treatment contents, and the treatment procedures described in the following examples can appropriately be changed within the range not departing from the gist of the present invention. Accordingly, the scope of the present invention should not be limitatively interpreted by the following examples.

Example 1

<Preparation of Film Having Through-Holes>

The treatments described below were performed on a surface of an aluminum substrate (JIS H-4160, alloy No.: 1N30-H, aluminum purity: 99.30%) having an average thickness of 20 μm and a size of 210 mm×297 mm (A4 size), thereby preparing a film 16 having a plurality of the through-holes 17.

(a1) Aluminum Hydroxide Film Forming Treatment (Film Forming Step)

The aluminum substrate was used as a cathode, and an electrolytic treatment was performed thereon for 20 seconds under a condition of a total electric quantity of 1000 C/dm$^2$ using an electrolytic solution (nitric acid concentration of 10 g/L, sulfuric acid concentration of 6 g/L, aluminum concentration of 4.5 g/L, flow rate of 0.3 m/s) whose temperature was kept to 50° C. to form an aluminum hydroxide film on the aluminum substrate. Further, the electrolytic treatment was performed using a DC power supply. The current density was 50 A/dm$^2$.

After formation of the aluminum hydroxide film, the film was washed with water using a spray.

(b1) Electrodissolution Treatment (Through-Hole Forming Step)

Next, the aluminum substrate was used as an anode, and an electrolytic treatment was performed thereon for 24 seconds under a condition of a total electric quantity of 600 C/dm$^2$ using an electrolytic solution (nitric acid concentration of 10 g/L, sulfuric acid concentration of 6 g/L, aluminum concentration of 4.5 g/L, flow rate of 0.3 m/s) whose temperature was kept to 50° C. to form through-holes in the aluminum substrate and the aluminum hydroxide film. Further, the electrolytic treatment was performed using a DC power supply. The current density was 25 A/dm$^2$.

After formation of the through-holes, the film was washed with water using a spray.

(c1) Aluminum Hydroxide Film Removing Treatment (Film Removing Step)

Next, the aluminum hydroxide film was dissolved and removed by immersing the aluminum substrate on which the electrodissolution treatment had been performed in an aqueous solution (liquid temperature of 35° C.) with a sodium hydroxide concentration of 50 g/L and an aluminum ion concentration of 3 g/L for 32 seconds and then immersing the aluminum substrate in an aqueous solution (liquid temperature of 50° C.) with a nitric acid concentration of 10 g/L and an aluminum ion concentration of 4.5 g/L for 40 seconds.

Thereafter, the resultant was washed with water using a spray and dried, thereby preparing a film 16 having a plurality of through-holes 17.

The average opening diameter and the average opening ratio of the through-holes in the prepared film were measured, and the average opening diameter was 24 μm and the average opening ratio was 5.3%.

Further, the surface shape of the inner wall surface of each through-hole in the prepared film was measured using an AFM (SPA300, manufactured by High-Tech Science Corporation). The measurement was carried out using OMCL-AC200TS as a cantilever in a dynamic force mode (DFM).

Figure 18:
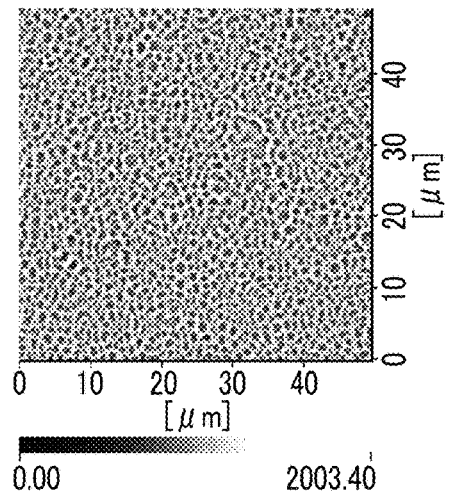
FIG. 18 is an image showing the results of AFM measurement performed on an inner wall surface of a through-hole.

The results are shown in FIG. 18.

Further, an SEM photo obtained by imaging the inner wall surface of each through-hole is shown in FIG. 19.

Based on FIGS. 18 and 19, it was found that the inner wall surface of the through-hole was roughened. Further, Ra was 0.18 (μm). The specific surface area in this case was 49.6%.

<Preparation of Frame>

An acrylic plate was processed to prepare a frame 14 having a cube shape with a size of 20 mm×20 mm×20 mm and including a frame hole portion 12 whose one side was formed in a square shape with a size of 16 mm. The frame hole portion 12 pass therethrough. In other words, the outer shape of the surface in which the frame hole portion 12 is formed has a size of 20 mm×20 mm, and the height of the frame 14 of the frame hole portion 12 in the penetration direction is 20 mm. The frame thickness of the frame 14 is 2 mm.

<Preparation of Soundproofing Cell>

The prepared film 16 was cut into a size of 20 mm×20 mm according to the size of the outer shape of the frame 14, and the film 16 was fixed to the frame 14 so as to cover one end surface of the frame hole portion 12 of the frame 14 using double-sided tape (manufactured by Nitto Denko Corporation), thereby preparing the soundproofing cell 18.

In the description below, the structure formed by fixing the film 16 to one end surface of the frame hole portion 12 is referred to as a soundproofing cell A.

<Preparation of Soundproofing Structure>

Three soundproofing cells A were directed toward the same direction such that the film 16 of each soundproofing cell A was on the same surface, and the frame 14 portion was fixed using tape to prepare a soundproofing structure of Example 1 formed of three soundproofing cells arranged in series.

[Evaluation]

<Acoustic characteristics>

The Acoustic Characteristics of the Prepared Soundproofing Structure were Measured according to a transfer function method using four microphones with a self-making acrylic acoustic tube. This technique is based on "ASTM E2611-09: Standard Test Method For Measurement of Normal Incidence Sound Transmission of Acoustical Material Based on the Transfer Matrix Method". This measurement method has the same measurement principles as those of the four microphone measurement method using WinZac (provided by Nihon Onkyo Engineering Co., Ltd.). According to this method, the acoustic transmission loss can be measured in a wide spectral band. Particularly, the absorbance of a sample was accurately measured by measuring the transmittance and the reflectivity at the same time and acquiring the absorbance using "1–(transmittance+reflectivity)". The acoustic transmission loss was measured in a frequency range of 100 Hz to 4000 Hz. The inner diameter of the acoustic tube was 40 mm so that the measurement was able to be performed up to a frequency of 4000 Hz or greater.

The soundproofing structure was disposed in the acoustic tube, and the vertical acoustic transmittance, the reflectivity, and the absorbance were measured. In the description below, the vertical acoustic transmittance, the reflectivity, and the absorbance are collectively referred to as acoustic characteristics. Further, the soundproofing structure was disposed such that the film surface was in parallel with the axial direction of the acoustic tube.

Figure 20:
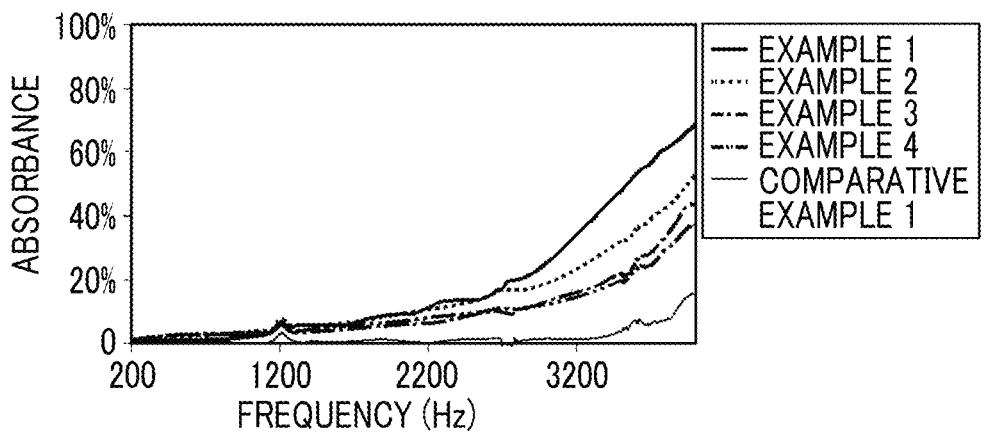
FIG. 20 is a graph showing the relationship between the frequency and the absorbance.

The measurement results are shown in FIG. 20. It was found that the percentage of the absorbance is increased along with an increase in the frequency and the value reaches 69% at 4000 Hz.

Since the area of the soundproofing structure on the cross section parallel to the opening surface of the acoustic tube when the soundproofing structure was inserted into the acoustic tube is 20×20 mm$^2$ and the inner diameter area of the acoustic tube is π×20×20 mm$^2$, the area ratio of the soundproofing structure to the inner diameter area of the acoustic tube is 31.8%. In other words, in a case where the acoustic tube is regarded as a pipe of a duct or the like, this structure is formed such that ventilation can occur because 68% or greater of this tube is opened.

Examples 2 to 4 and Comparative Example 1

With reference to WO2016/060037A and WO2016/017380A, soundproofing structures having films with different average opening diameters and different average opening ratios were prepared by changing the conditions for preparing the films in Example 1 in various manners.

A soundproofing structure of Comparative Example 1 is a structure which does not have a film and includes three soundproofing cells formed of only a frame having a frame hole portion.

The absorbance of each of the prepared soundproofing structures was measured in the same manner as in Example 1. The measurement results are shown in FIG. 20.

Further, the results obtained by measuring the average opening diameters, the average opening ratios, and the absorbances at a frequency of 4000 Hz of each example and each comparative example are listed in Table 1.

TABLE 1

|  | Average opening diameter μm | Average opening ratio % | Number of soundproofing cells | Absorbance (%) @ 4000 Hz |
|---|---|---|---|---|
| Example 1 | 24 | 5.3 | 3 | 68.6 |
| Example 2 | 31 | 9.1 | 3 | 52.8 |
| Example 3 | 38 | 12.7 | 3 | 43.9 |
| Example 4 | 51 | 18.6 | 3 | 37.8 |
| Example 7 | 15 | 3.7 | 3 | 84.2 |
| Comparative Example 1 | — | — | 3 | 15.7 |

As shown in FIG. 20 and Table 1, it was found that the absorbance is increased as the average opening diameter and the average opening ratio are decreased. Particularly in a high-frequency region, absorption occurs due to the effect of disturbing the sound by narrowing the inside of the acoustic tube even in a case of a single frame structure (Comparative Example 1) on which a film is not formed. Further, it was found that the sound absorption effect is further increased compared to the comparative example by disposing the soundproofing structure of the present invention, obtained by attaching a film having a plurality of through-holes to a frame having a frame hole portion, in the acoustic tube.

Examples 5 to 10

Each film having through-holes with an average opening diameter of 15 μm and an average opening ratio of 3.7% was prepared by changing the conditions for preparing the film, and the film was fixed to a frame, thereby preparing a soundproofing cell B.

One to six soundproofing cells B were respectively fixed in series to prepare a soundproofing structure.

Figure 21:
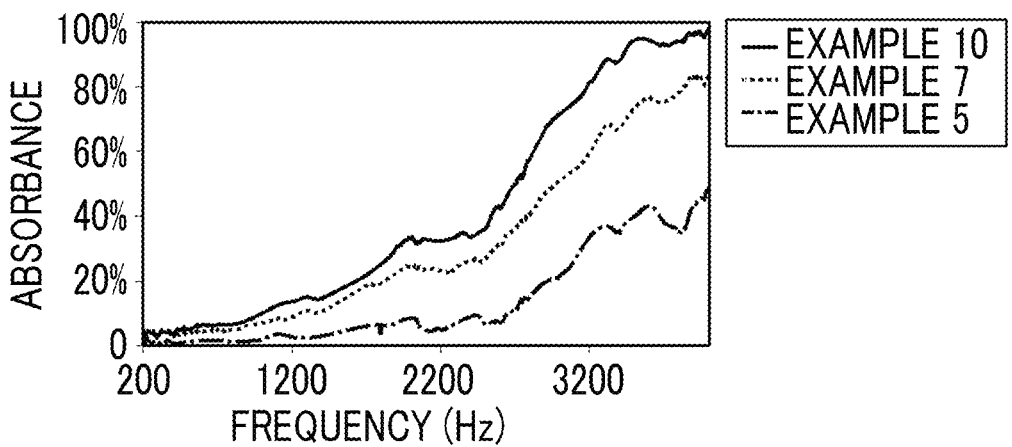
FIG. 21 is a graph showing the relationship between the frequency and the absorbance.

The absorbance of each of the prepared soundproofing structures was measured in the same manner as in Example 1. The measurement results of Examples 5, 7, and 10 are shown in FIG. 21. Further, the results obtained by measuring the average opening diameters, the average opening ratios, the number of soundproofing cells, and the absorbances at a frequency of 4000 Hz of each example are listed in Table 2.

TABLE 2

|  | Average opening diameter μm | Average opening ratio % | Number of soundproofing cells | Absorbance (%) @ 4000 Hz |
|---|---|---|---|---|
| Example 5 | 15 | 3.7 | 1 | 48.9 |
| Example 6 | 15 | 3.7 | 2 | 74.7 |
| Example 7 | 15 | 3.7 | 3 | 84.2 |
| Example 8 | 15 | 3.7 | 4 | 94.3 |
| Example 9 | 15 | 3.7 | 5 | 97.1 |
| Example 10 | 15 | 3.7 | 6 | 98.4 |

As shown in FIG. 21 and Table 2, it was found that the absorbance is increased by increasing the number of soundproofing cells. Further, as shown in FIG. 21, it was found that not only the absorbance in a high-frequency region but also the absorbance in a low-frequency region are increased as the number of soundproofing cells are increased.

Further, based on the comparison between Example 7 in which the number of soundproofing cells is three and Examples 1 to 4, it was found that the absorbance is increased as the average opening diameter and the average opening ratio are decreased.

Examples 11 and 12

Soundproofing structures were prepared respectively in the same manners as in Example 7 and 10 except that the height of the frame was changed to 10 mm.

The absorbance of each of the prepared soundproofing structures was measured in the same manner as in Example 1. Further, the results obtained by measuring the average opening diameters, the average opening ratios, the number of soundproofing cells, the heights of the frames, and the absorbances at a frequency of 4000 Hz of Examples 7 and 10 to 12 are listed in Table 3.

TABLE 3

|  | Average opening diameter μm | Average opening ratio % | Number of soundproofing cells | Height of frame mm | Absorbance (%) @ 4000 Hz |
|---|---|---|---|---|---|
| Example 7 | 15 | 3.7 | 3 | 20 | 84.2 |
| Example 10 | 15 | 3.7 | 6 | 20 | 98.4 |
| Example 11 | 15 | 3.7 | 3 | 10 | 20.4 |

TABLE 3-continued

|  | Average opening diameter μm | Average opening ratio % | Number of soundproofing cells | Height of frame mm | Absorbance (%) @ 4000 Hz |
|---|---|---|---|---|---|
| Example 12 | 15 | 3.7 | 6 | 10 | 38.8 |

As shown in Table 3, it was found that the absorbance is increased as the height of the frame is increased. In other words, it was found that the through-holes formed in the film and the height of the frame contribute to the sound absorption effect.

In a case where the thickness of the frame is 20 mm as in Example 7, a reciprocating phase shift of approximately 40 mm occurs until the sound diffracted by the frame wraps around and reaches the film surface. This phase shift is close to half the length of the wavelength of approximately 86 mm of the sound at a frequency of 4000 Hz, and the phase difference between both surfaces of the film becomes a difference of approximately ½ wavelength. Accordingly, it is considered that the sound effectively passes through the through-holes so that a pressure difference is generated. Meanwhile, in a case where the thickness of the frame is 10 mm as in Example 11, a phase difference generated by wrapping around due to diffraction is only ¼ wavelength. Therefore, it is considered that the sound does not efficiently pass through the through-holes and the absorbance is small compared to the case of Example 7.

Examples 13 and 14

A film having through-holes with an average opening diameter of 20 μm and an average opening ratio of 4.2% was prepared by changing the conditions for preparing a film.

In Example 13, this film was fixed to one surface of the frame to prepare soundproofing cells, and three soundproofing cells were fixed in series to prepare a soundproofing structure.

In Example 14, this film was fixed to one surface of the frame to prepare soundproofing cells, and three soundproofing cells were fixed in series to prepare a soundproofing structure.

Figure 22:
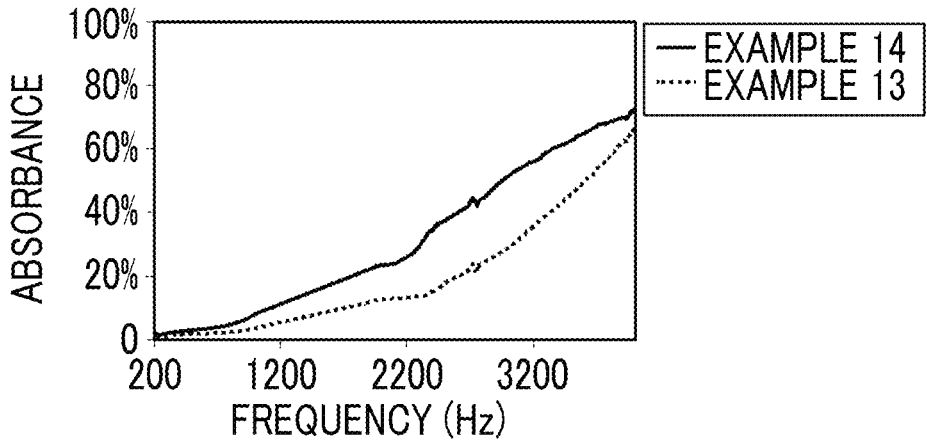
FIG. 22 is a graph showing the relationship between the frequency and the absorbance.

The absorbance of each of the prepared soundproofing structures was measured in the same manner as in Example 1. The measurement results are shown in FIG. 22. Further, the results obtained by measuring the average opening diameters, the average opening ratios, the number of soundproofing cells, the thicknesses of the frame, the film disposition, and the absorbances at a frequency of 4000 Hz of each example are listed in Table 4.

TABLE 4

|  | Average opening diameter μm | Average opening ratio % | Number of soundproofing cells | Height of frame mm | Film disposition | Absorbance (%) @ 4000 Hz |
|---|---|---|---|---|---|---|
| Example 13 | 20 | 4.2 | 3 | 20 | One surface | 71.0 |
| Example 14 | 20 | 4.2 | 3 | 20 | Both surfaces | 78.3 |

As shown in FIG. 22, it was found that the absorbance increases over a broadband in a case of the configuration in which the film was fixed to both surfaces of the frame rather than the configuration in which the film was fixed to one surface of the frame.

Examples 15 to 17

In Example 15, a configuration in which the size of the frame hole portion of the frame was set to 20 mm×20 mm, the height of the frame was set to 12 mm, and the same film as in Example 5 was fixed to one surface of the frame was employed to prepare soundproofing cells, and six soundproofing cells were connected in series to prepare a soundproofing structure.

In Example 16, a soundproofing structure was prepared in the same manner as in Example 15 except that a configuration in which the film was fixed to both surfaces of the frame was employed.

In Example 17, a soundproofing structure was prepared in the same manner as in Example 16 except that the height of the frame was set to 18 mm.

Figure 23:
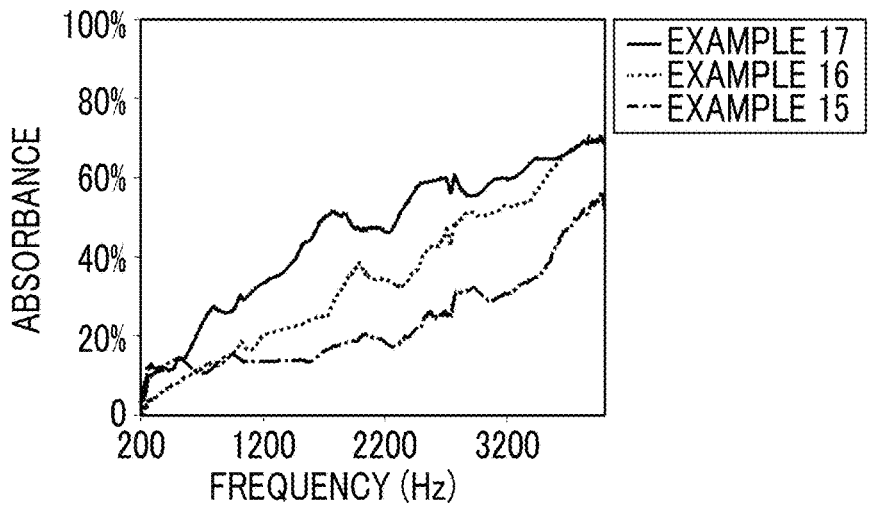
FIG. 23 is a graph showing the relationship between the frequency and the absorbance.

The absorbance of each of the prepared soundproofing structures was measured in the same manner as in Example 1. The measurement results are shown in FIG. 23. Further, the results obtained by measuring the average opening diameters, the average opening ratios, the number of soundproofing cells, the size of the frame hole portion, the heights of the frame, the film disposition, and the absorbances at a frequency of 4000 Hz of each example are listed in Table 5.

TABLE 5

|  | Average opening diameter μm | Average opening ratio % | Number of soundproofing cells | Size of frame hole portion mm | Height of frame mm | Film disposition | Absorbance (%) @ 4000 Hz |
|---|---|---|---|---|---|---|---|
| Example 15 | 15 | 3.7 | 6 | 20 × 20 | 12 | One surface | 54.0 |
| Example 16 | 15 | 3.7 | 6 | 20 × 20 | 12 | Both surfaces | 68.8 |
| Example 17 | 15 | 3.7 | 6 | 20 × 20 | 18 | Both surfaces | 69.0 |

As shown in FIG. 23 and Table 5, it was found that the absorption is increased as in a case of a high-frequency region by increasing the size of the frame hole portion. Further, it was found that the absorbance is increased over a broadband in a case where the configuration in which the film is fixed to both surfaces of the frame is employed rather than the configuration in which the film is fixed to one surface of the frame. Further, it was found that the absorbance is increased in a case where the height of the frame is large.

Comparative Examples 2 and 3

In Comparative Example 2, a soundproofing structure was prepared in the same manner as in Example 7 except that an aluminum substrate having a thickness of 20 μm, in which through-holes were not formed, was used as the film.

In Comparative Example 3, a soundproofing structure was prepared in the same manner as in Example 7 except that through-holes having a diameter of 3.5 mm were formed in substantially the center of an aluminum substrate having a thickness of 20 μm with a hollow punch was used as the film.

Figure 24:
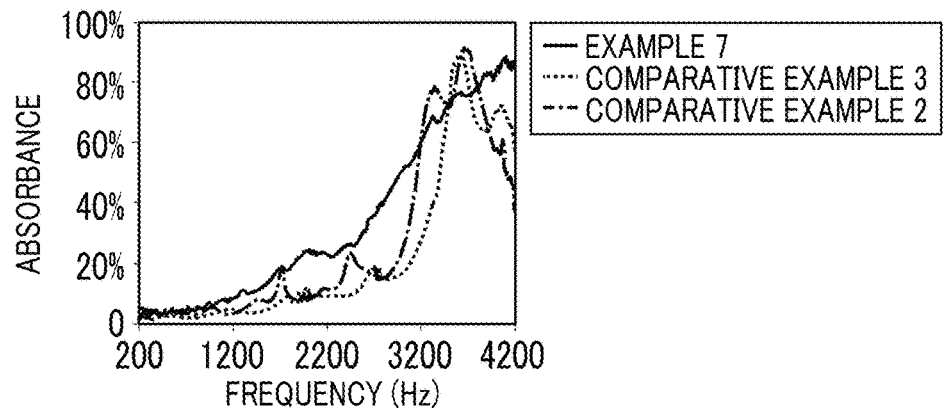
FIG. 24 is a graph showing the relationship between the frequency and the absorbance.

The absorbance of each of the prepared soundproofing structures was measured in the same manner as in Example 1. The measurement results are shown in FIG. 24. Further, the results obtained by measuring the average opening diameters, the average opening ratios, the number of soundproofing cells, the size of the frame hole portion, the heights of the frame, and the film disposition of each example and each comparative example are listed in Table 6.

TABLE 6

|  | Average opening diameter μm | Average opening ratio % | Number of soundproofing cells | Size of frame hole portion mm | Height of frame mm | Film disposition |
|---|---|---|---|---|---|---|
| Example 7 | 15 | 3.7 | 3 | 16 × 16 | 20 | One surface |
| Comparative Example 2 | — | — | 3 | 16 × 16 | 20 | One surface |
| Comparative Example 3 | 35000 | 3.7 | 3 | 16 × 16 | 20 | One surface |

As shown in FIG. 24, it was found that the sound absorption characteristics are exhibited even in a case of the film in which through-holes are not formed. This is a phenomenon occurring because the film strongly vibrates and this energy is changed into heat when the membrane vibration is generated due to the fixation of the film to the frame hole portion of the frame and resonance of this membrane vibration occurs. Accordingly, in Comparative Example 2, the absorbance is increased at specific frequencies and the absorbance is decreased even on a lower frequency side and on a higher frequency side than the frequency at which the absorbance is maximized. Further, it was found that the absorption due to resonance becomes dominant even in Comparative Example 3 in which large through-holes are formed in the film, the absorbance is increased at specific frequencies, and the absorbance is decreased in other frequencies. This indicates that the frictional heat caused by sound waves passing through through-holes does not contribute to sound absorption much even in a case where a small number of large through-holes are formed, and the absorption due to resonance of the membrane vibration similar to the film configured that through-holes are not provided becomes dominant.

On the contrary, in Example 7, it was found that sound absorption occurs in a broadband compared to the comparative examples. As the reason for this, a sound absorption phenomenon occurring due to the friction at the time of a sound passing through fine through-holes has become more dominant than the membrane vibration as the sound absorption principle of the soundproofing structure of the present invention, and the sound absorption phenomenon in which a sound passes through fine through-holes may occur in a broadband because a resonance phenomenon is not used for this sound absorption phenomenon.

Examples 18 to 20

In Example 18 as illustrated in FIG. 9, a soundproofing structure was prepared in the same manner as in Example 6 except that a configuration in which two soundproofing cells, each of which includes one depression having a diameter of 5 mm passing through one side surface of a frame and a projection having a diameter of 5 mm and a height of 2 mm formed on the other side surface of the frame were fitted to each other so as to be connected was employed.

In Example 19, a soundproofing structure was prepared in the same manner as in Example 6 except that an acrylic plate was processed to prepare a frame having a cube shape with a size of 40 mm×20 mm×20 mm and including two frame hole portions whose one side was formed in a square shape with a size of 16 mm and a film was fixed so as to cover each of two frame hole portions. In other words, a frame obtained by integrally forming two frames was used.

In Example 20, a soundproofing structure was prepared in the same manner as in Example 6 except that aluminum was used as the material for forming a frame.

The absorbances of each of the prepared soundproofing structures were measured in the same manner as in Example 1. As the results of the measurement, all results were the same as that of Example 6.

Example 20-2

Here, the relationship between the absorbance and the inclination of the vertical direction of the film surface with respect to the direction of the noise source was investigated.

An aluminum film having a thickness of 20 μm, in which through-holes having an average opening diameter of 20 μm and an average opening ratio of 3.7% were formed, was prepared by changing the conditions for preparing a film in Example 1.

A soundproofing structure having one soundproofing cell formed by attaching the prepared film to the same frame (the frame having a hole portion with a size of 16 mm×16 mm and a height of 20 mm) as in Example 1 such that the periphery of the film was fixed was prepared. The film was attached to one side of the frame.

Figure 25A:
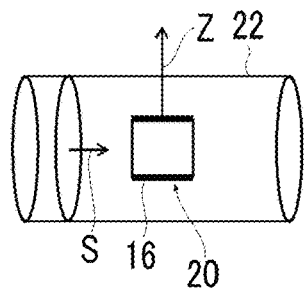
FIG. 25A is a schematic view for describing an arrangement angle of a soundproofing structure in an opening member.
Figure 25B:
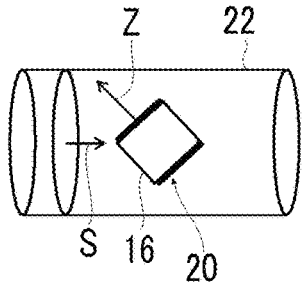
FIG. 25B is a schematic view for describing the arrangement angle of the soundproofing structure in the opening member.
Figure 25C:
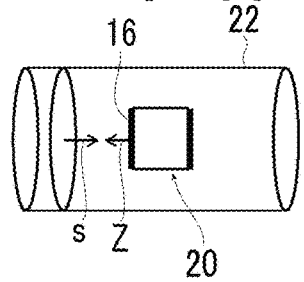
FIG. 25C is a schematic view for describing the arrangement angle of the soundproofing structure in the opening member.

The absorbance of the prepared soundproofing structure was measured by changing the angle of the vertical direction of the film surface in the acoustic tube in various manners. A direction of the noise source, in other words, the angle of the vertical direction of the film surface with respect to the direction perpendicular to the opening cross section of the acoustic tube was changed to 90 degrees, 75 degrees, 60 degrees, 45 degrees, 30 degrees, and 15 degrees. Further, measurement was also performed by assuming the angle as 0 degrees as a reference example. The schematic views in cases of 90 degrees, 45 degrees, and 0 degrees are respectively shown in FIGS. 25A to 25C. The angle in the examples above was set as 90 degrees.

Figure 26:
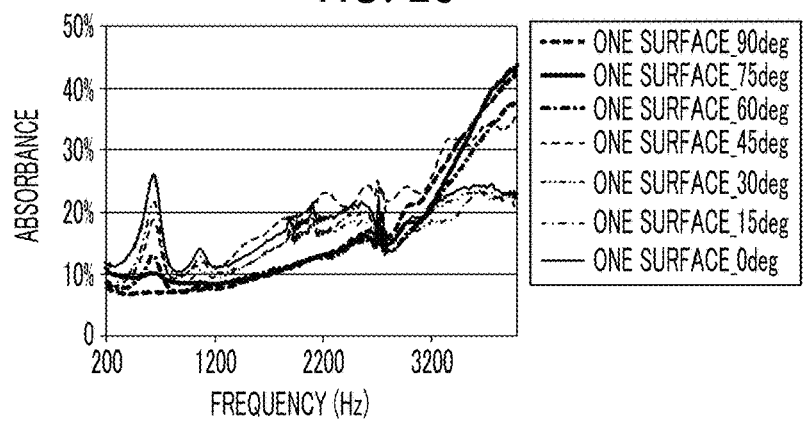
FIG. 26 is a graph showing the relationship between the frequency and the absorbance.

The measurement results are shown in FIG. 26.

As shown in FIG. 26, it was found that the total absorbance was lager in a case where the angle of the vertical direction of the film surface with respect to the direction perpendicular to the opening cross section of the acoustic tube was in a range of 90 degrees to 45 degrees, between the case where the angle thereof was in a range of 90 degrees to 45 degrees and a case where the angle thereof was 30 degrees or less. Particularly, in a high-frequency region close to 4000 Hz, there is a large difference in absorbance.

Meanwhile, the absorbance is increased at frequencies close to 620 Hz as the angle is decreased. It can be speculated that the absorbance is increased not because of the absorption effect due to the through-holes but because of the resonant absorption due to the membrane vibration of the film. In other words, the membrane vibration is considered to easily occur due to a large sound pressure in a case where disposition is made such that the sound pressure is applied from the front surface of the film. In this case, the absorption largely occurs only at the vicinity of a specific frequency, and thus the absorbance in other frequency regions is decreased.

On the contrary, in the case where the angle of the vertical direction of the film surface with respect to the direction perpendicular to the opening cross section of the acoustic tube is set to be in a range of 90 degrees to 45 degrees, since the film is unlikely to vibrate and the friction in the through-holes by the wraparound easily occurs, the absorbance in a broad frequency band is increased. Therefore, inclined disposition including orthogonal disposition at an angle of 45 degrees to 90 degrees is desirable for sound absorption in a broadband.

Example 20-3

Next, a soundproofing structure having one soundproofing cell obtained by fixing the same film as described above to both surfaces of the frame was prepared.

The prepared soundproofing structure was disposed in an acoustic tube by changing the angle of the vertical direction of the film surface with respect to the direction perpendicular to the opening cross section of the acoustic tube in the same manner as described above, and then the absorbance was measured.

Figure 27:
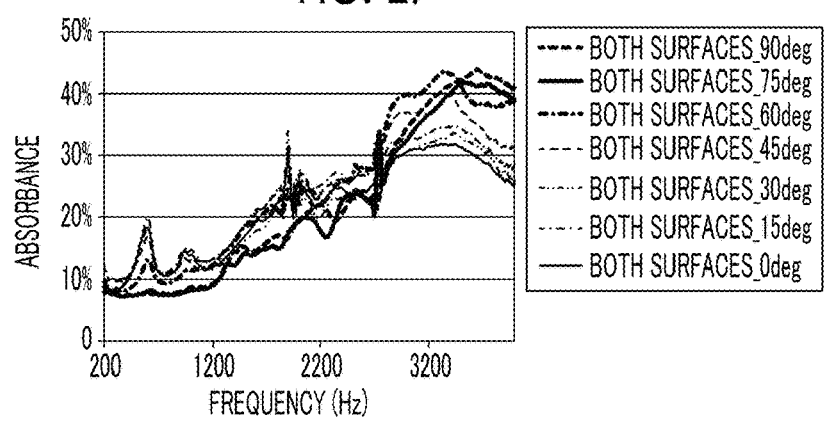
FIG. 27 is a graph showing the relationship between the frequency and the absorbance.

The results are shown in FIG. 27.

As shown in FIG. 27, similar to the soundproofing structure obtained by fixing the film to one surface of the frame, it was found that the absorbance is further increased in a broadband and in a high-frequency region in the case where the angle of the vertical direction of the film surface with respect to the direction perpendicular to the opening cross section of the acoustic tube is set to be in a range of 45 degrees to 90 degrees than the case where the angle of inclination is less than 45 degrees.

Examples 21 and 22

In Example 21, as shown in FIG. 12, a soundproofing structure was prepared in the same manner as in Example 6 except that soundproofing cells were connected such that the surfaces to which the film was fixed were set as the surfaces on the opposite side.

In Example 22, as shown in FIG. 13, a soundproofing structure was prepared in the same manner as in Example 6 except that soundproofing cells were connected such that the surfaces to which the film was fixed were different by 90°.

Figure 28:
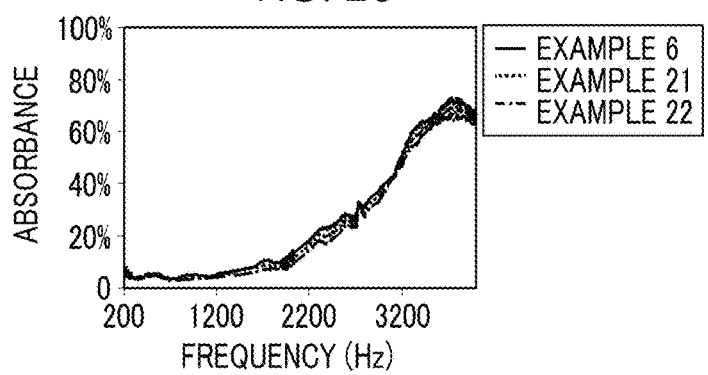
FIG. 28 is a graph showing the relationship between the frequency and the absorbance.

The absorbance of each of the prepared soundproofing structures was measured in the same manner as in Example 1. The measurement results are shown in FIG. 28. Based on these measurement results, it was found that the results obtained by measuring the absorbances in Examples 6, 21, and 22 almost match to each other. In other words, it was found that the films of respective soundproofing cells at the time of being connected may not be provided on the same plane and may be directed to an optional direction.

Examples 23 to 26

In Examples 23 to 26, two soundproofing cells of Example 6 were disposed in an acoustic tube without being connected to each other in a state in which these soundproofing cells were separated from each other by a distance of 10 mm, 20 mm, 30 mm, or 40 mm.

The absorbance of each of the prepared soundproofing structures was measured in the same manner as in Example 1. The measurement results are shown in FIGS. 29 and 30.

Figure 29:
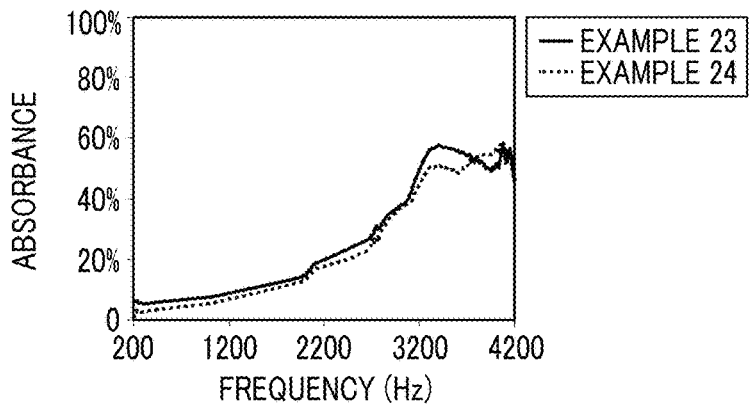
FIG. 29 is a graph showing the relationship between the frequency and the absorbance.
Figure 30:
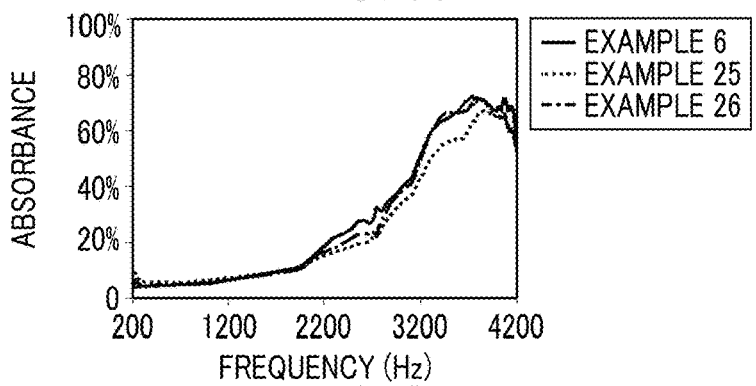
FIG. 30 is a graph showing the relationship between the frequency and the absorbance.

As shown in FIGS. 29 and 30, it was understood that the absorbance in Examples 23 to 25 in which the distance between the soundproofing cells is 10 mm to 30 mm is lower than the absorbance in Example 6 in which the soundproofing cells are connected, as a whole. It was found that the absorbance in Example 26 in which the distance between the soundproofing cells is 40 mm is almost the same as the absorbance in Example 6 in which the soundproofing cells are connected. In other words, it is preferable that the soundproofing cells are separated from each other by a distance at least twice the width of the frame in a case where the soundproofing cells are disposed by being separated from each other.

Example 27 and Comparative Example 4

In the examples described above, the absorption characteristics resulting from the plane wave incidence were measured using an acoustic tube. In a case of using a soundproofing material for an actual duct or the like, there is a problem of higher frequencies, and thus it is necessary to soundproof noise without limiting to plane waves depending on the duct size.

Figure 31:
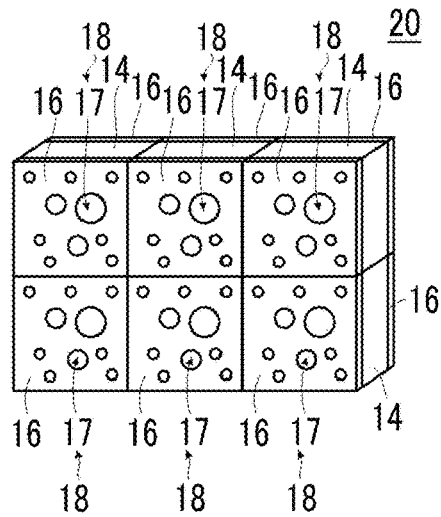
FIG. 31 is a schematic perspective view illustrating another example of a soundproofing structure.

In order to simulate this, two soundproofing structures 20 illustrated in FIG. 31 were disposed in a large simulated duct (a rectangular duct in which the inside of the cylinder has a cross-sectional shape with a size of 150 mm×53 mm) 100, and the measurement was performed at frequencies from 2000 Hz to 6500 Hz. Further, since the measurement is not performed using an acoustic tube, the transmission loss was measured by measuring the volume of the sound coming out of the simulated duct using a microphone without measuring the absorbance. A noise source 102 disposed on an end portion of the duct has a structure in which the opposite side of the simulated duct of the noise source is blocked. The microphone was fixed to a position separated from the end portion of the simulated duct on the opposite side of the noise source by a distance of 200 mm.

The soundproofing structure illustrated in FIG. 31 has a configuration in which two rows and three columns of soundproofing cells, in other words, the total of six soundproofing cells of Example 14 were connected to one another.

Figure 32:
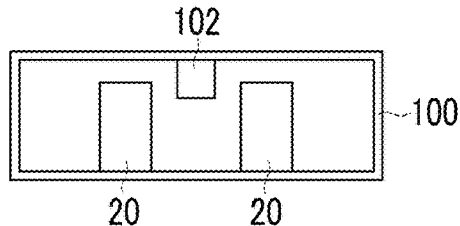
FIG. 32 is a schematic cross-sectional view for describing the arrangement position of the soundproofing structure in an example.
Figure 69:
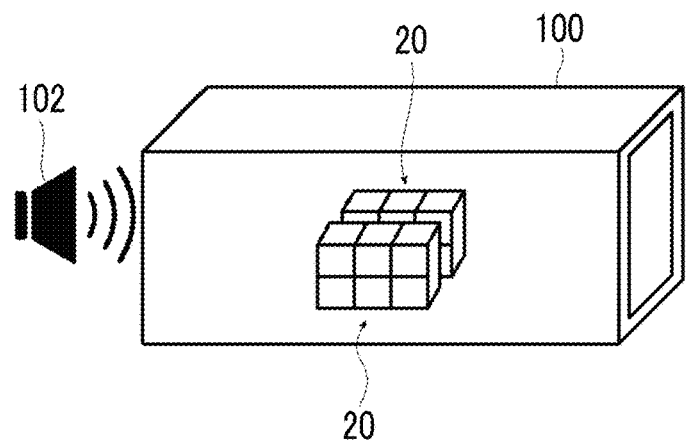
FIG. 69 is a schematic side view for describing the arrangement position of the soundproofing structure in an example.

In Example 27, as illustrated in FIGS. 32 and 69, two soundproofing structures were disposed in a simulated duct by being separated from each other by a distance of 60 mm. FIG. 32 is a schematic view illustrating the cross section cut in a direction perpendicular to the opening direction of the simulated duct in which two soundproofing structures are disposed, and FIG. 69 is a perspective view schematically illustrating a simulated duct in which two soundproofing structures are disposed. Further, for description, the soundproofing structures disposed in the simulated duct are indicated by solid lines in FIG. 69. Further, through-holes are not illustrated.

In Comparative Example 4, two acrylic plates respectively having the same size as that of the soundproofing structure were disposed in a simulated duct in place of the soundproofing structures.

Figure 33:
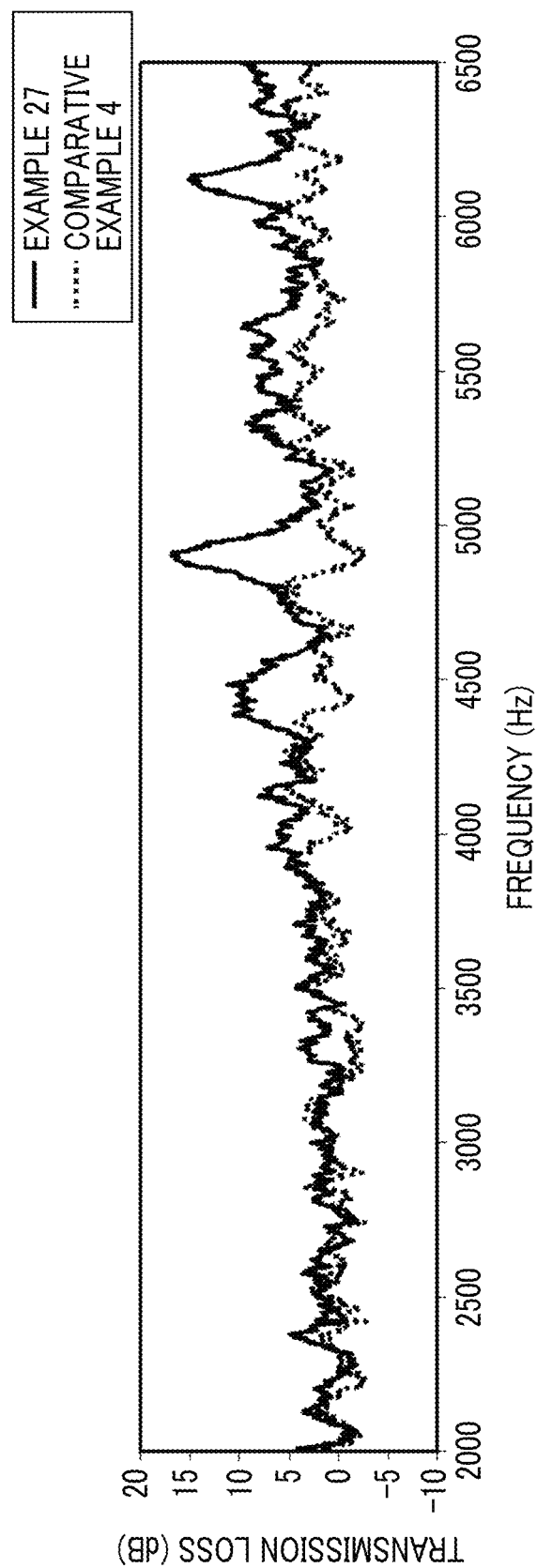
FIG. 33 is a graph showing the relationship between the frequency and transmission loss.

FIG. 33 shows the results obtained by measuring the transmission loss. Further, the transmission loss in the present measurement is a value that is normalized with the sound coming out of a simulated duct which does not include any structures therein, and a reduction amount of the sound due to the disposition of the soundproofing structures therein is displayed using a unit of dB. In other words, 0 dB indicates a pressure of the sound coming out of the simulated duct in which soundproofing structures are not disposed.

In Example 27, silencing can be made over an extremely broad frequency band from 2000 Hz to 6500 Hz, and silencing up to a maximum of 15 dB or greater can be achieved. Based on the comparison between Example 27 and Comparative Example 4, it was found that the sound absorption effect is exerted more than the effect of a simple obstacle that reduces the opening ratio of a duct, because of the configuration in which the film having fine through-holes to the frame. As the result, it was found that the soundproofing structure of the present invention absorbs sounds in a broadband and is effective not only for normal noise from an actual duct or the like but also for the measurement using an acoustic tube.

Examples 28 and 29

Figure 34:
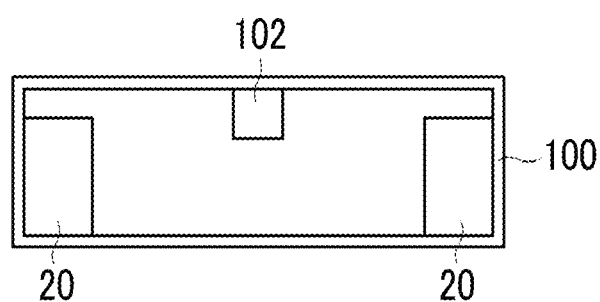
FIG. 34 is a schematic cross-sectional view for describing the arrangement position of the soundproofing structure in an example.

In Example 28, as shown in FIG. 34, a soundproofing structure was prepared in the same manner as in Example 27 except that one film surface side of each of two soundproofing structures was disposed so as to be in contact with the inner wall surface of a simulated duct.

Figure 35:
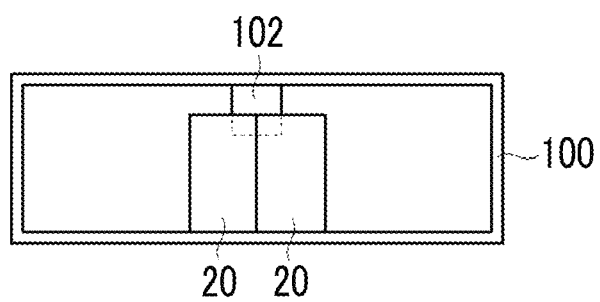
FIG. 35 is a schematic cross-sectional view for describing the arrangement position of the soundproofing structure in an example.

In Example 29, as shown in FIG. 35, a soundproofing structure was prepared in the same manner as in Example 27 except that one film surface side of each of two soundproofing structures came into close contact with the other and was disposed in the center.

The transmission loss of each of the prepared soundproofing structures was measured in the same manner as in Example 27. The measurement results are shown in FIG. 36.

Figure 36:
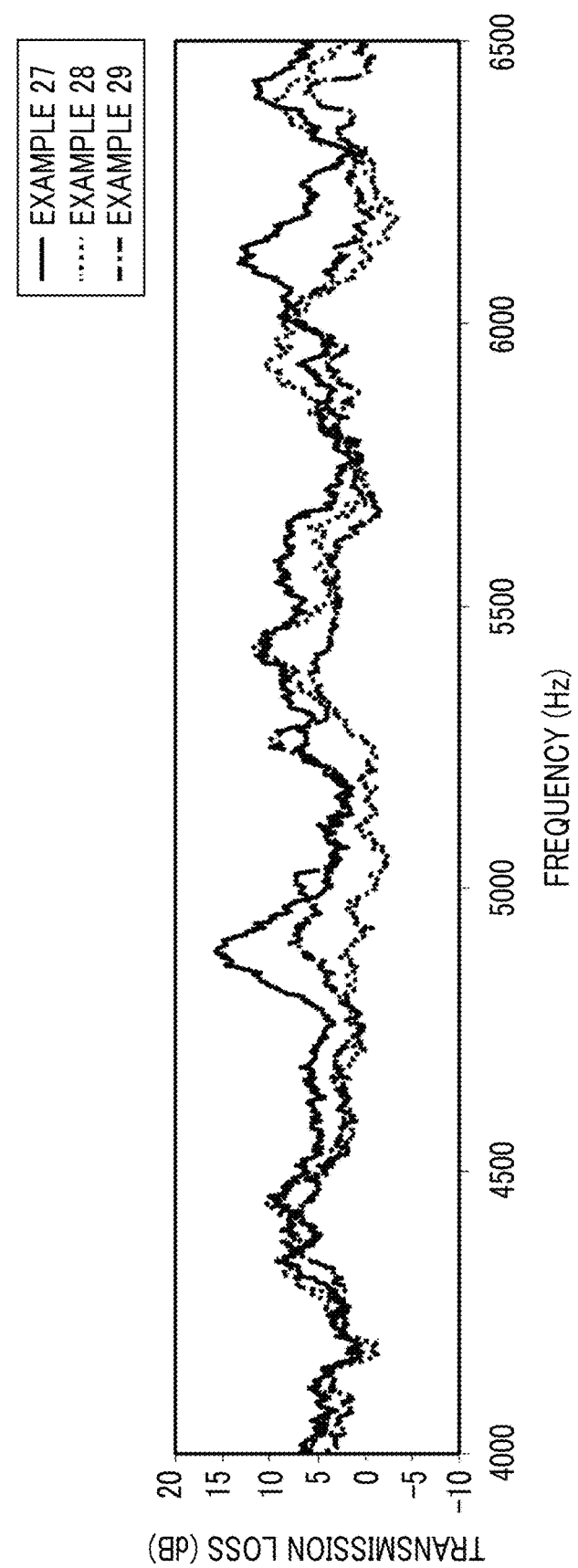
FIG. 36 is a graph showing the relationship between the frequency and the transmission loss.

As shown in FIG. 36, the silencing effect was maximized in a case of the disposition of Example 27 and a plurality of strong transmission loss peaks were shown. Therefore, it was found that the silencing effect is greater in a case of the disposition in which the film surfaces of the soundproofing structures were separated from one another than the disposition in which the film surfaces of the soundproofing structures were bonded to the wall or bonded to one another.

Example 30

Figure 37:
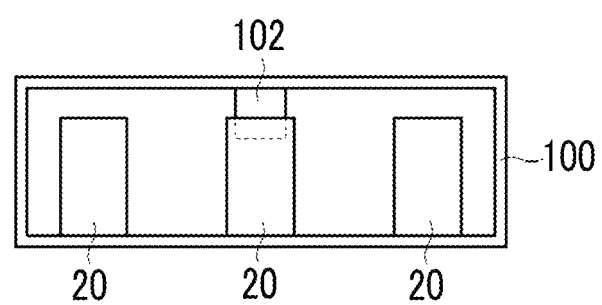
FIG. 37 is a schematic cross-sectional view for describing the arrangement position of the soundproofing structure in an example.

As shown in FIG. 37, a soundproofing structure was prepared in the same manner as in Example 27 except that three soundproofing structures were disposed. The interval between the soundproofing structures was set to 30 mm.

Figure 38:
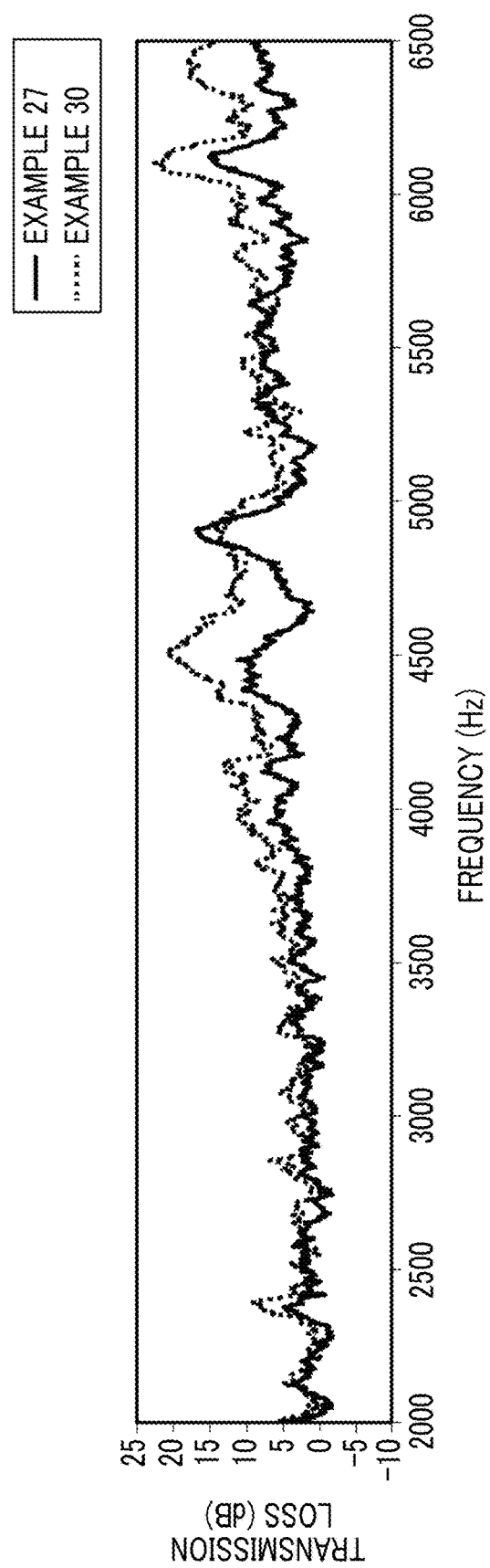
FIG. 38 is a graph showing the relationship between the frequency and the transmission loss.

The transmission loss of the prepared soundproofing structure was measured in the same manner as in Example 27. The measurement results are shown in FIG. 38. It was found that the silencing effect is increased by increasing the number of soundproofing structures and a maximum transmission loss of 20 dB or greater and the broadband silencing effect are obtained.

Examples 31 and 32

In Example 31, a soundproofing structure was prepared in the same manner as in Example 1 except that a film having through-holes with an average opening diameter of 46.5 μm and an average opening ratio of 7.3% was used and the height of the frame was set to 25 mm by changing the conditions for preparing a film.

Further, in Example 32, as illustrated in FIG. 62, a soundproofing structure was prepared in the same manner as in Example 31 except that a sound absorbing material was disposed in a frame hole portion as illustrated in FIG. 62.

The absorbance of each of the prepared soundproofing structures was measured in the same manner as in Example 1. The measurement results are shown in FIG. 64.

In addition, as the sound absorbing material of Example 32, soft urethane foam U0016 (manufactured by Fuji Gomu Co., Ltd.) was used. Further, the size of the sound absorbing material was set to 16 mm×16 mm×20 mm according to the size of the frame hole portion and the sound absorbing material was disposed so as to be separated from the film by a distance of 5 mm.

Further, the frame was prepared using a 3D printer (manufactured by XYZprinting, Inc.) made of an ABS resin (acrylonitrile, butadiene, and a styrene copolymerized synthetic resin).

Figure 64:
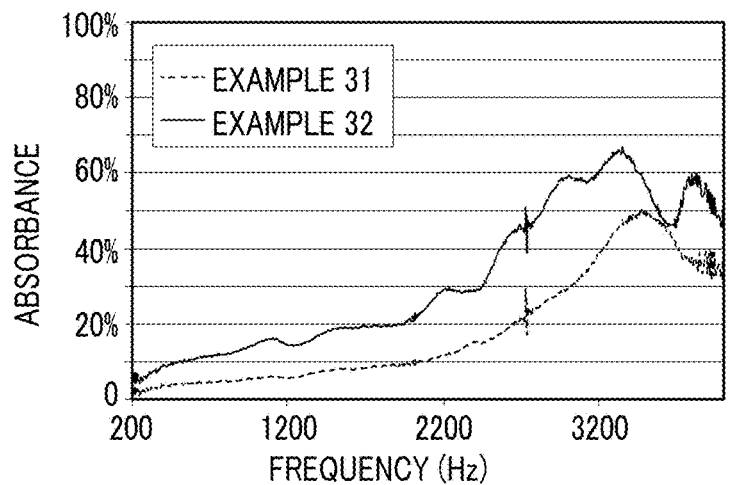
FIG. 64 is a graph showing the relationship between the frequency and the absorbance.

As shown in FIG. 64, it was found that the absorbance was increased in a broad frequency band by disposing the sound absorbing material in the frame hole portion. Further, the disposition of the sound absorbing material in the frame hole portion was examined by changing the distance from the film to 5 mm, 4 mm, and 3 mm, but the difference in absorbance was not large and an effect of increasing the absorbance was seen at any position.

Examples 33 and 34

In Example 33, a soundproofing structure was prepared in the same manner as in Example 31 except that the film was fixed to both end surfaces of the frame.

Further, in Example 34, a soundproofing structure was prepared in the same manner as in Example 32 except that the film was fixed to both end surfaces of the frame.

The absorbance of each of the prepared soundproofing structures was measured in the same manner as in Example 1. The measurement results are shown in FIG. 65.

Figure 65:
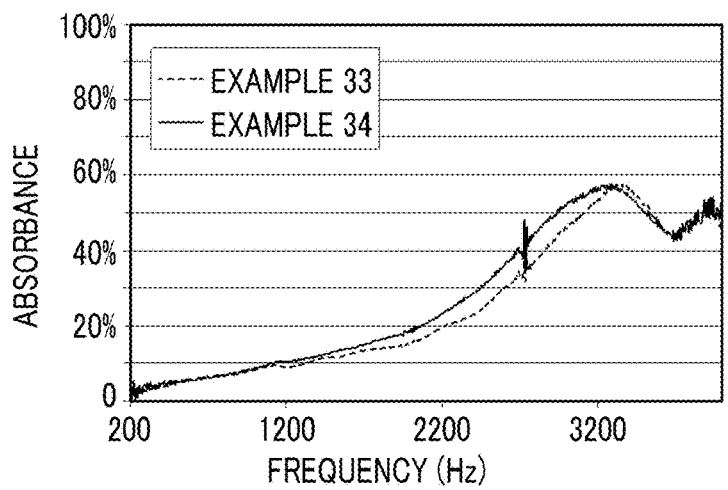
FIG. 65 is a graph showing the relationship between the frequency and the absorbance.

As shown in FIG. 65, it was found that the absorbance was increased in a broad frequency band by disposing the sound absorbing material in the frame hole portion even in a case where the film was disposed in both end surfaces of the frame. Further, in a case where a difference between Examples 31 and 32 was compared to a difference between Examples 33 and 34, the difference between Examples 31 and 32 is large. In other words, it was found that the effect of disposing the sound absorbing material in the frame hole portion is high in the configuration in which the film is disposed on one end surface of the frame. The reason for this, the effect of the sound absorbing material is considered to be high since the sound easily reaches the sound absorbing material from the end surface on a side where the end is opened in the configuration in which the film is disposed on one end surface of the frame while the sound is difficult to reach the sound absorbing material in the frame hole portion in the configuration in which the film is disposed on both end surfaces of the frame.

Examples 35 and 36

In Example 35, a soundproofing structure was prepared in the same manner as in Example 31 except that a film having through-holes with an average opening diameter of 16.4 µm and an average opening ratio of 2.8% was used by changing the conditions for preparing a film.

Further, in Example 36, a soundproofing structure was prepared in the same manner as in Example 35 except that a sound absorbing material was disposed in a frame hole portion. The sound absorbing material is the same sound absorbing material as in Example 32.

The absorbance of each of the prepared soundproofing structures was measured in the same manner as in Example 1. The measurement results are shown in FIG. 66.

Figure 66:
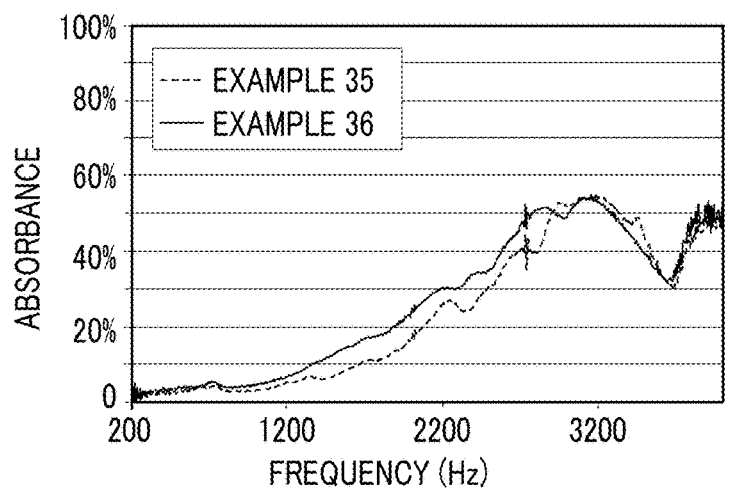
FIG. 66 is a graph showing the relationship between the frequency and the absorbance.

As shown in FIG. 66, it was found that the absorbance was increased in a broad frequency band by disposing the sound absorbing material in the frame hole portion.

Examples 37 to 39

In Example 37, a soundproofing structure was prepared in the same manner as in Example 31 except that nickel was used as the material of a film and a film having through-holes with an average opening diameter of 19.5 µm and an average opening ratio of 6.2% was used.

In Example 38, a soundproofing structure was prepared in the same manner as in Example 37 except that the film was fixed to both end surfaces of the frame.

Further, in Example 39, a soundproofing structure was prepared in the same manner as in Example 37 except that the sound absorbing material was disposed in the frame hole portion. The sound absorbing material is the same as the sound absorbing material in Example 32.

Further, a method of forming fine through-holes in a case where nickel was used as the material of the film is as follows.

First, a plurality of projections respectively having a columnar shape with a diameter of 19.5 µm were formed on the surface of a silicon substrate in a predetermined arrangement pattern according to an etching method using photolithography. The distance between the centers of projections adjacent to each other was set to 70 µm, and the arrangement pattern was set as a square grid arrangement. At this time, the area ratio of the projections was approximately 6%.

Next, nickel was allowed to be electrodeposited on the silicon substrate using this silicon substrate on which projections had been formed as a prototype according to a nickel electroforming method to form a nickel film having a thickness of 20 µm. Next, the nickel film was peeled off from the silicon substrate and the surface was polished. In this manner, a film made of nickel, in which a plurality of through-holes had been formed in a square grid arrangement, was prepared.

The prepared film was evaluated using an SEM, and the average opening diameter was 19.5 µm, the average opening ratio was 6.2 µm, and the thickness was 20 µm. Further, complete penetration of through-holes through the film in the thickness direction was also confirmed.

The absorbance of the prepared soundproofing structure was measured in the same manner as in Example 1. The measurement results are shown in FIGS. 67 and 68.

Figure 67:
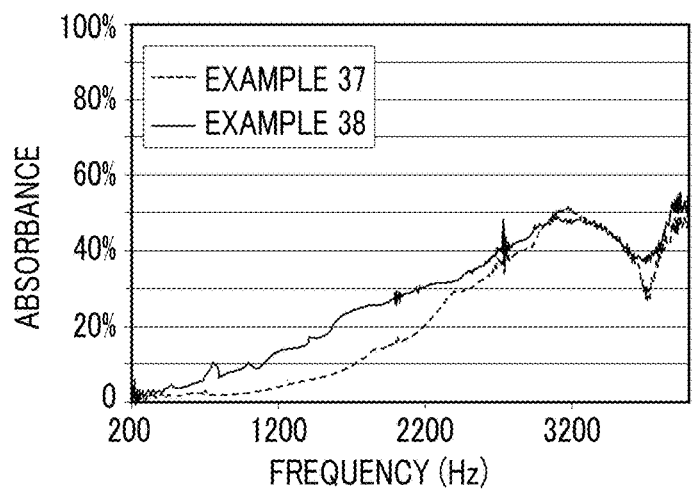
FIG. 67 is a graph showing the relationship between the frequency and the absorbance.
Figure 68:
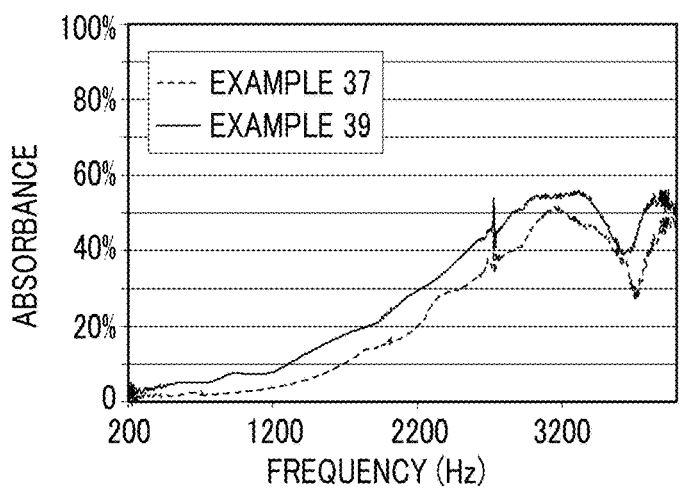
FIG. 68 is a graph showing the relationship between the frequency and the absorbance.

As shown in FIGS. 67 and 68, it was found that the sound absorption performance can be exhibited even in a case where nickel was used as the material for the film. The effect can be exhibited regardless of the material for the film because the soundproofing structure of the present invention functions by forming a plurality of fine through-holes in the film.

Further, as shown in FIG. 68, it was found that the absorbance is increased in a wide frequency band by disposing the sound absorbing material in the frame hole portion.

[Evaluation 2]
<Visibility>

Next, the visibility of through-holes formed in the aluminum film prepared in Example 1 and the visibility of through-holes formed in the nickel film prepared in Example 37 were evaluated.

Figure 70:
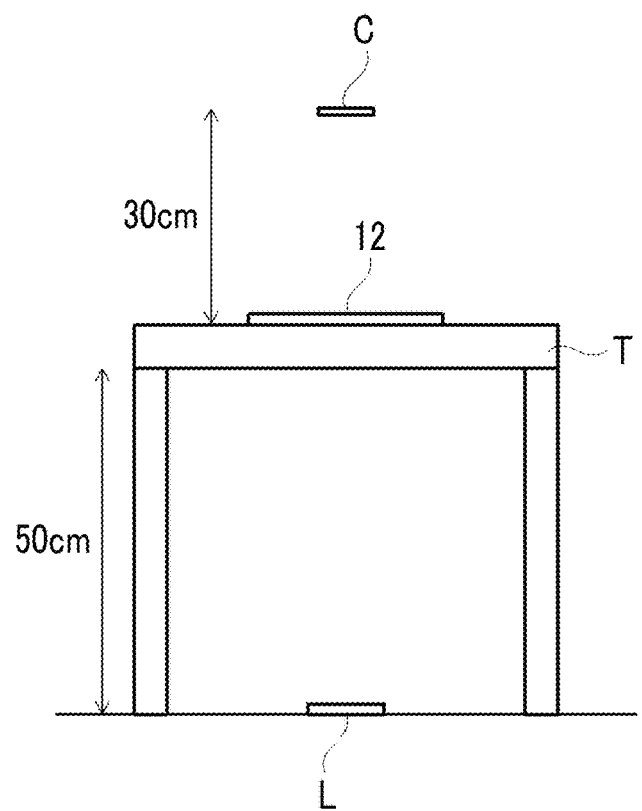
FIG. 70 is a schematic view for describing a method of measuring the visibility.

Specifically, as shown in FIG. 70, the plate-like member 12 was placed on an acrylic plate T having a thickness of 5 mm, and a point light source L (white light of Nexus 5 (manufactured by LG Electronics Incorporated)) was disposed at a position vertically separated from the principal surface of the acrylic plate T by a distance of 50 cm in a direction opposite to the plate-like member 12. Further, a camera C (iPhone 5s (manufactured by Apple Inc.)) was disposed at a position vertically separated from the principal surface of the plate-like member 12 by a distance of 30 cm.

The point light source was turned on and the light transmitted through the through-holes of the plate-like member 12 was visually evaluated from the position of the camera.

Next, transmitted light was imaged with a camera. It was confirmed that the imaged results are the same as those in a case of visual observation.

Figure 71:
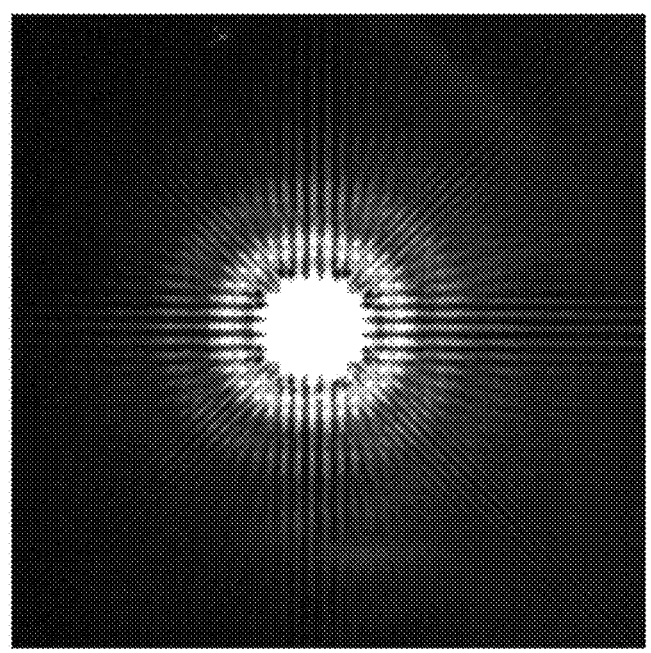
FIG. 71 is an image obtained by imaging the result of measuring the visibility.
Figure 72:
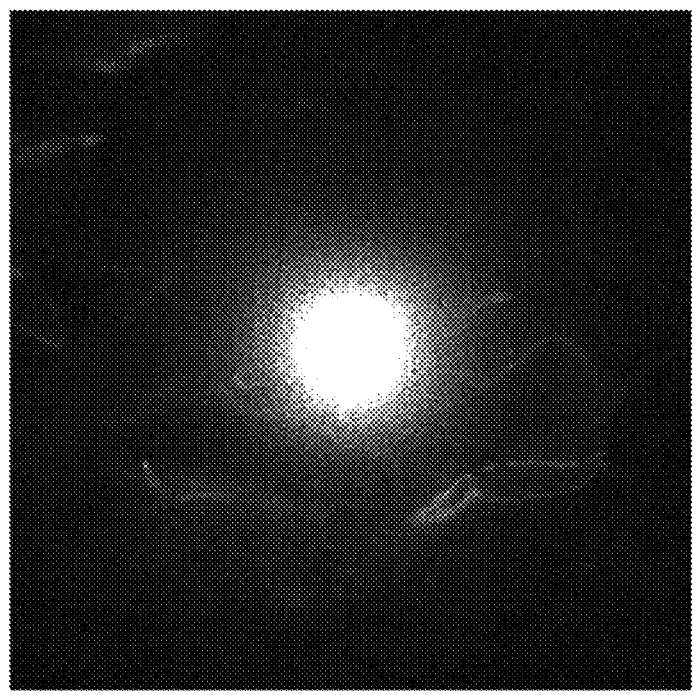
FIG. 72 is an image obtained by imaging the result of measuring the visibility.

FIG. 71 shows the results obtained by imaging a nickel film and FIG. 72 shows results obtained by imaging an aluminum film.

As described above, the nickel film prepared in Example 37 has through-holes which are regularly arranged. Accordingly, as shown in FIG. 71, the light is diffracted to spread out and is seen as a rainbow. Further, in the aluminum film prepared in Example 1, the through-holes are randomly arranged. Therefore, as shown in FIG. 72, a white light source is seen as it is without diffraction of light.

[Simulation]

As described above, the present inventors speculated that the principle of sound absorption of the soundproofing structure of the present invention is based on the friction generated from a sound passing through fine through-holes.

Accordingly, it is important to optimally design the average opening diameter and the average opening ratio of the fine through-holes of the film such that the friction is increased in order to increase the absorbance. For this reason, it is considered that the influence from the attachment of the film to the frame member is not high and the sound is absorbed using the sound absorption characteristics of the through-holes and the film because membrane vibration is reduced in a particularly high-frequency region.

Accordingly, the simulation for the frictional heat using fine through-holes was performed.

Specifically, designing was performed using an acoustic module of COMSOL ver. 5.1 (manufactured by COMSOL Inc.) serving as analysis software of a finite element method. By using a thermoacoustic model in the acoustic module, sound absorption can be calculated based on the friction between the wall and sound waves passing through a fluid (including the air).

First, the absorbance as the film was measured by loosely fixing a single film having through-holes which was used in Example 1 for comparison with the experiment to the acoustic tube used in Example 1. In other words, the film was evaluated by reducing the influence of the fixed end as much as possible without attaching the film to the frame. The results obtained by measuring the absorbance was shown in FIG. 39 as the reference example.

In the simulation, the inside of through-holes was calculated with a thermoacoustic module using the values of the library of COMSOL as the physical property values of aluminum, and sound absorption due to the membrane vibration and the friction inside through-holes was calculated. In the simulation, the system of a single film was reproduced by fixing an end portion of the film to a roller so that the film was able to freely move in a direction perpendicular to the plane of the film. The results are shown as the simulation in FIG. 39.

Figure 39:
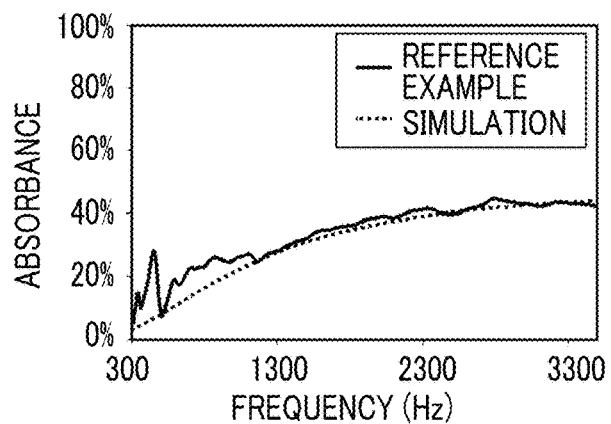
FIG. 39 is a graph showing the relationship between the frequency and the absorbance.

As shown in FIG. 39, it was found that the simulation precisely reproduces the experiment in a case where the absorbance of the experiment is compared to the absorbance of the simulation. A spike-like change on a low-frequency side in the experiment indicates that the effect of membrane vibration due to the fixed end is slightly exerted even in a case where an end portion of the film is loosely fixed. Since the influence of the membrane vibration is reduced as the frequency is higher, the results of the experiment matched to the results of the simulation carried out for evaluating the performance of a single film.

Based on these results, it is possible to ensure that the simulation reproduces the results of the experiment.

Next, in order to optimize the friction characteristics of the through-holes, the behavior of absorption was investigated by performing the simulation for fixing and restricting the film portion and allowing a sound passing through the through-holes was performed, and changing the thickness of the film, the average opening diameter and the average opening ratio of the through-holes. The frequency for the following calculation was 3000 Hz.

Figure 40:
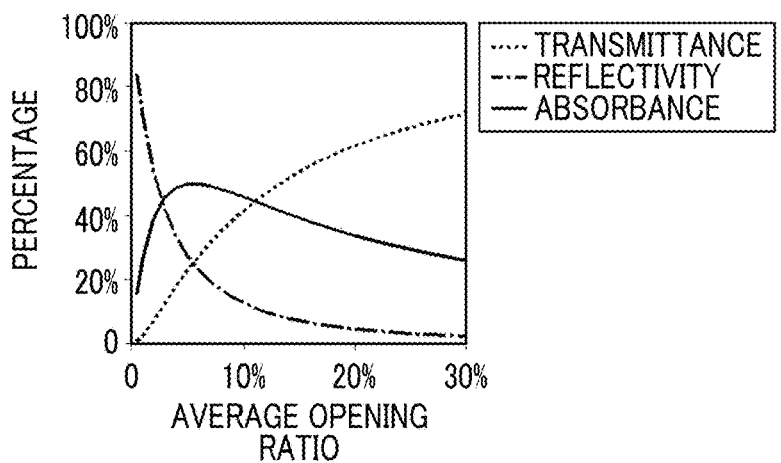
FIG. 40 is a graph showing the relationship between the average opening ratio and acoustic characteristics.

For example, in a case where the thickness of the film was 20 μm and the average opening diameter of through-holes was 20 μm, the results obtained by calculating a change in a transmittance T, a reflectivity R, and an absorbance A at the time of changing the average opening ratio are shown in FIG. 40. It was found that the absorbance is changed by changing the average opening ratio when focusing on the absorbance. Accordingly, it was found that a maximum value at which the absorbance is maximized is present. In this case, it was found that the absorption is maximized at an opening ratio of 6%. At this time, the transmittance becomes approximately the same as the reflectivity. This does not mean that the average opening ratio is preferably small in a case where the average opening diameter is small. It is necessary to adjust the value to the optimum value.

Further, it was found that a range of the average opening ratio where the absorbance increases gradually spreads about the optimum average opening ratio.

Figure 41:
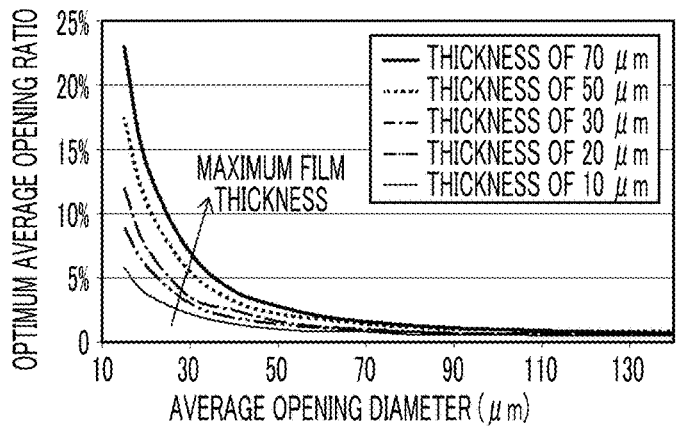
FIG. 41 is a graph showing the relationship between the average opening diameter and the optimum average opening ratio.

In order to determine the optimum average opening ratio, the average opening ratio in which the absorbance is maximized and the absorbance at this time are calculated under respective conditions by changing the average opening diameter of through-holes within a range of 15 μm to 140 μm in each of the thicknesses of the film of 10 μm, 20 μm, 30 μm, 50 μm, and 70 μm. The results are shown in FIG. 41.

The optimum average opening ratio varies depending on the thickness of the film in a case where the average opening diameter of through-holes is small. However, the optimum average opening ratio is in a range of 0.5% to 1.0%, which is extremely small, in a case where the average opening diameter of through-holes is approximately 100 μm or greater.

Figure 42:
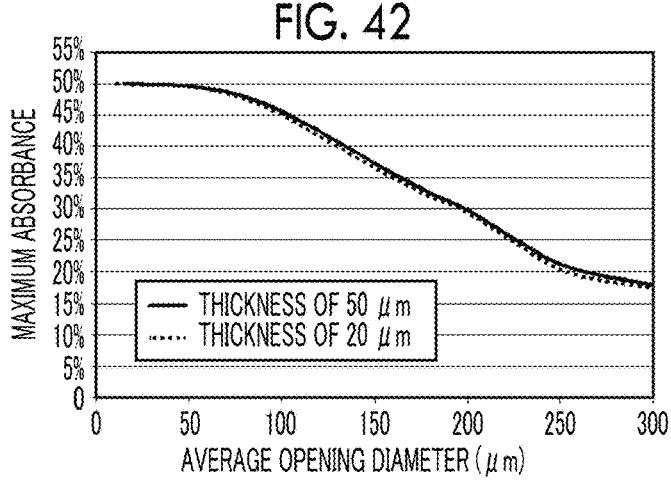
FIG. 42 is a graph showing the relationship between the average opening diameter and the maximum absorbance.

The maximum absorbance at which the average opening ratio is optimized with respect to the average opening diameter of each through-hole is shown in FIG. 42. FIG. 42 shows two cases, which are a case where the thickness of the film is 20 μm and a case where the thickness of the film is 50 μm. It was found that the maximum absorbance is determined by the average opening diameter of through-holes regardless of the thickness of the film. Further, it was found that the maximum absorbance is 50% in a case where the average opening diameter is 50 μm or less and the absorbance is decreased in a case where the average opening diameter is greater than 50 μm. The absorbance is decreased such that the absorbance is 45% in a case where the average opening diameter is 100 μm, the absorbance is 30% in a case where the average opening diameter is 200 μm, and the absorbance is 20% in a case where the average opening diameter is 250 μm. Accordingly, it was clarified that the average opening diameter is desirably small.

In the present invention, since it is desirable that the absorbance is large, an average opening diameter of 250 μm or less is required in a case where the upper limit of the absorbance is 20%, an average opening diameter of 100 μm or less is desirable in a case where the upper limit of the absorbance is 45%, and an average opening diameter of 50 μm or less is most desirable in a case where the upper limit of the absorbance is 50%.

Figure 43:
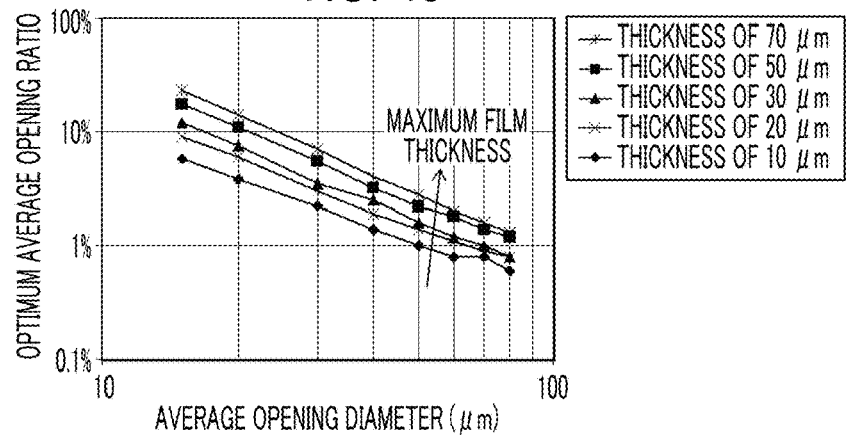
FIG. 43 is a graph showing the relationship between the average opening diameter and the optimum average opening ratio.

Hereinbefore, the optimum average opening ratio with respect to the average opening diameter of through-holes was calculated in a case where the average opening diameter was 100 μm or less. In each of the thicknesses of the plate-like member of 10 μm, 20 μm, 30 μm, 50 μm, and 70 μm, the results showing the optimum average opening ratio for each average opening diameter of through-holes are shown in FIG. 43 by a double-logarithmic graph. Based on the graph of FIG. 43, it was found that the optimum average opening ratio is changed by a power of −1.6 with respect to the average opening diameter of through-holes.

More specifically, in a case where the optimum average opening ratio is set as rho_center, the average opening diameter of through-holes is set as phi (μm), and the thickness of the film is set as t (μm), it was clarified that the optimum average opening ratio rho_center is determined as rho_center=a×phi$^{-1.6}$ (a=2+0.25×t).

In this manner, it was clarified that the optimum average opening ratio is determined by the thickness of the film and the average opening diameter of the through-holes particularly in a case where the average opening diameter of through-holes is small.

Figure 44:
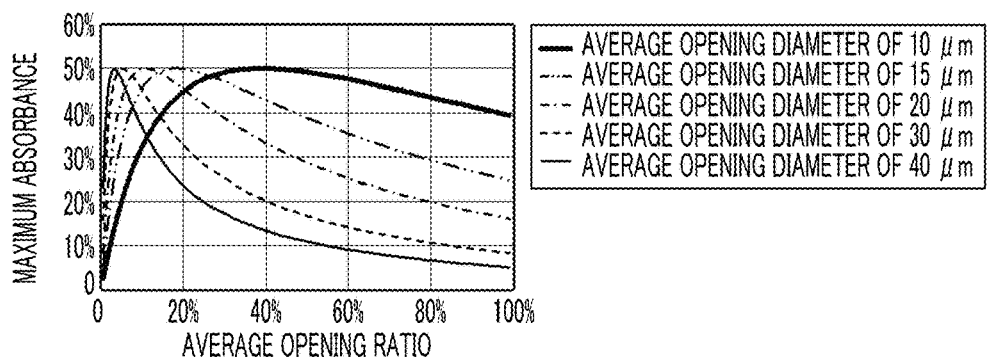
FIG. 44 is a graph showing the relationship between the average opening ratio and the maximum absorbance.

As described above, a region where the absorbance is large gradually spreads about the optimum average opening ratio. For detailed analysis, the results obtained by changing the average opening ratio in the simulation of the film having a thickness of 50 μm are shown in FIG. 44. The average opening ratio was changed from 0.5% to 99% by setting each of the average opening diameters of through-holes to 10 μm, 15 μm, 20 μm, 30 μm, and 40 μm.

In all average opening diameters, the range of the average opening ratio spreads around the optimum average opening ratio where the absorbance is maximized. Characteristically, in a case where the average opening diameter of through-holes is small, the range of the average opening ratio where the absorbance is increased expands. Further, the range where the absorbance is increased becomes larger in a case where the average opening ratio is higher than the optimum average opening ratio.

Since the maximum value of the absorbance is approximately 50% in an average opening diameter, the lower limits of the average opening ratio and the upper limits of the average opening ratio in which the absorbance is 30%, 40%, and 45% are listed in Table 7. Further, the range of each absorbance from the optimum average opening ratio is listed in Table 8.

For example, the optimum average opening ratio is 11% in a case where the average opening diameter of through-holes is 20 μm, and the lower limit of the average opening ratio in which the absorbance is 40% or greater is 4.5% and the upper limit thereof is 28%. At this time, since the range of the average opening ratio in which the absorbance is 40% with respect to the optimum average opening ratio is "(4.5%−11.0%)=−6.5% to (28.0%−11.0%)=17.0%", the range of −6.5% to 17.0% is listed in Table 8.

TABLE 8

| Average opening diameter | Range from optimum average opening ratio | | |
|---|---|---|---|
| | Within range of 45% | Within range of 40% | Within range of 30% |
| 10 μm | −18.5% to 34% | −24.0% to 57.0% | −30.0% to |
| 15 μm | −8.0% to 16.5% | −10.5% to 29.5% | −13.0% to 59.5% |
| 20 μm | −5.0 to 9.5% | −6.5% to 17.0% | −8.5% to 35.0% |
| 30 μm | −2.5% to 4.5% | −3.0% to 8.0% | −4.0% to 17.5% |
| 40 μm | −1.0% to 3.0% | −1.5% to 5.0% | −2.0% to 11.0% |

As listed in Table 8, the widths of the absorbances for each average opening diameter of through-holes are compared. As the result, in a case where the average opening diameter of through-holes is set as phi (μm), the width of the absorbance is changed by a ratio of approximately 100×phi$^{-2}$. Accordingly, an appropriate range for each average opening diameter of each through-hole with respect to each of the absorbances of 30%, 40%, and 45% can be determined.

In other words, the range of the absorbance of 30% is determined using the above-described optimum average opening ratio rho_center and the range in a case where the average opening diameter of the through-holes is 20 μm as a reference. Accordingly, it is necessary that the absorbance falls in a range where rho_center−0.085×(phi/20)$^{-2}$ is the lower limit of the average opening ratio and rho_center+0.35×(phi/20)$^{-2}$ is the upper limit of the average opening ratio. In this case, the range of the average opening ratio is limited to be greater than 0 and less than 1 (100%).

The range of the absorbance of 40% is desirable. It is desirable that the absorbance falls in a range where rho_center−0.24×(phi/10)$^{-2}$ is the lower limit of the average opening ratio and rho_center+0.57×(phi/10)$^{-2}$ is the upper limit of the average opening ratio. Here, in order to minimize the error as much as possible, the reference of the average opening diameter of each through-hole is set as 10 μm.

The range of the absorbance of 45% is more desirable. It is more desirable that the absorbance falls in a range where rho_center−0.185×(phi/10)$^{-2}$ is the lower limit of the average opening ratio and rho_center+0.34×(phi/10)$^{-2}$ is the upper limit of the average opening ratio.

As described above, the characteristics of the sound absorption phenomenon occurring due to the friction in the through-holes are clarified using the simulation.

EXPLANATION OF REFERENCES

10: cylindrical structure
12: frame hole portion
14, 46, 50, 56: frame
14*a*: projection
14*b*: depression
16: film

TABLE 7

| Average opening diameter | Optimum average opening ratio | Within range of 30% Lower limit | Within range of 40% Lower limit | Within range of 45% Lower limit | Within range of 45% Upper limit | Within range of 40% Upper limit | Within range of 30% Upper limit |
|---|---|---|---|---|---|---|---|
| 10 μm | 39.0% | 9.0% | 15.0% | 20.5% | 73.0% | 96.0% | Greater than 99% |
| 15 μm | 17.5% | 4.5% | 7.0% | 9.5% | 34.0% | 47.0% | 77.0% |
| 20 μm | 11.0% | 2.5% | 4.5% | 6.0% | 20.5% | 28.0% | 46.0% |
| 30 μm | 5.5% | 1.5% | 2.5% | 3.0% | 10.0% | 13.5% | 23.0% |
| 40 μm | 3.0% | 1.0% | 1.5% | 2.0% | 6.0% | 8.0% | 14.0% |

17: through-hole
18, 31a to 31e, 44, 48, 54: soundproofing cell
20: soundproofing structure
22: cylindrical member
22a, 64a: opening
24: sound absorbing material
30a to 30h, 52: soundproofing member
32: cover
34: wind prevention frame
35: rectification mechanism
40: desorption mechanism
42a: projection
42b: depression
58: frame body
58a: frame material on both outer sides and central side
58b: frame material in other portions
61: space
62, 70: soundproofing partition
64: frame body
100 simulated duct
72: partition main body
102: opening (noise source)

What is claimed is:

1. A soundproofing structure comprising:
a soundproofing cell which includes a frame having a frame hole portion passing therethrough and at least one film that covers the frame hole portion and is fixed to the frame,
wherein the film has a plurality of through-holes passing therethrough in a thickness direction,
an average opening diameter of the through-holes is in a range of 0.1 μm to 250 μm, and
a vertical direction of a film surface of the film is disposed so as to be inclined with respect to a direction of a sound source to be soundproofed,
wherein the soundproofing structure is entirely disposed in a space which has an opening, and
wherein the sound source, the opening of the space and the soundproofing structure are arranged in order of the sound source, the opening of the space and the soundproofing structure, along a direction of the sound source.

2. The soundproofing structure according to claim 1, wherein an inclination of the vertical direction of the film surface of the film with respect to the direction of the sound source to be soundproofed is 45° or greater.

3. The soundproofing structure according to claim 1, wherein a size of the frame hole portion of the frame is smaller than a wavelength of a sound which has the maximum length among sounds to be soundproofed.

4. The soundproofing structure according to claim 1, wherein the film is fixed to the inside of the frame hole portion of the frame.

5. The soundproofing structure according to claim 4, wherein distances from the film to both end surfaces of the frame are different from each other.

6. The soundproofing structure according to claim 1, wherein two or more sheets of the films are fixed to the frame.

7. The soundproofing structure according to claim 1, wherein the film is fixed to both end surfaces of the frame hole portion of the frame.

8. The soundproofing structure according to claim 1, wherein the film is fixed to one end surface of the frame hole portion of the frame.

9. The soundproofing structure according to claim 8, wherein the film is fixed to one end surface of the frame hole portion of the frame and the other end surface of the frame hole portion is open.

10. The soundproofing structure according to claim 1, wherein a surface roughness Ra of an inner wall surface of the through-hole is in a range of 0.1 μm to 10.0 μm.

11. The soundproofing structure according to claim 1, wherein an inner wall surface of the through-hole is formed in a shape of a plurality of particles, and an average particle diameter of projections formed on the inner wall surface is in a range of 0.1 μm to 10.0 μm.

12. The soundproofing structure according to claim 1, wherein a material of forming the film is a metal.

13. The soundproofing structure according to claim 1, wherein a material of forming the film is aluminum.

14. The soundproofing structure according to claim 1, wherein a plurality of the soundproofing cells are provided.

15. The soundproofing structure according to claim 14, wherein the plurality of soundproofing cells are connected to one another.

16. The soundproofing structure according to claim 15, wherein the plurality of soundproofing cells are attachably and detachably connected to one another.

17. The soundproofing structure according to claim 1, wherein the average opening diameter of the through-holes is in a range of 0.1 μm to 50 μm.

18. The soundproofing structure according to claim 1, wherein at least some of the through-holes have a shape having a maximum diameter inside the through-holes.

19. A window member comprising:
the soundproofing structure according to claim 1.

20. A partition member comprising:
the soundproofing structure according to claim 1.

21. An opening structure comprising:
a soundproofing structure; and
an opening member which has an opening,
wherein the soundproofing structure having:
a soundproofing cell which includes a frame having a frame hole portion passing therethrough and at least one film that covers the frame hole portion and is fixed to the frame,
wherein the film has a plurality of through-holes passing therethrough in a thickness direction,
an average opening diameter of the through-holes is in a range of 0.1 μm to 250 μm, and
a vertical direction of a film surface of the film is disposed so as to be inclined with respect to a direction of a sound source to be soundproofed,
wherein the soundproofing structure is entirely disposed in the opening of the opening member such that a vertical direction of a film surface of the film intersects with a direction perpendicular to an opening cross section of the opening member, and
a region serving as a vent hole through which gas passes is provided in the opening member.

22. The opening structure according to claim 21, wherein the soundproofing structure is disposed within an opening end correction distance from an opening end of the opening member.

23. A cylindrical structure comprising:
a soundproofing structure; and
a cylindrical member which has an opening,
wherein the soundproofing structure having:
a soundproofing cell which includes a frame having a frame hole portion passing therethrough and at least one film that covers the frame hole portion and is fixed to the frame,
wherein the film has a plurality of through-holes passing therethrough in a thickness direction,
an average opening diameter of the through-holes is in a range of 0.1 μm to 250 μm, and
a vertical direction of a film surface of the film is disposed so as to be inclined with respect to a direction of a sound source to be soundproofed,
wherein the soundproofing structure is entirely disposed in the opening of the cylindrical member such that a vertical direction of a film surface of the film intersects with a direction perpendicular to an opening cross section of the cylindrical member, and
a region serving as a vent hole through which gas passes is provided in the cylindrical member.

24. The cylindrical structure according to claim 23, wherein the soundproofing structure is disposed within an opening end correction distance from an opening end of the cylindrical member.

25. The cylindrical structure according to claim 23, wherein two or more of the soundproofing structures are provided in the opening of the cylindrical member.

26. The cylindrical structure according to claim 25, wherein two or more of the soundproofing structures are disposed by being separated from one another, and
at least some of distances between the soundproofing structures adjacent to each other are at least twice the width of the frame in an arrangement direction of two or more of the soundproofing structures.

* * * * *